United States Patent [19]
Takahashi et al.

[11] Patent Number: 5,680,246
[45] Date of Patent: Oct. 21, 1997

[54] OPTICAL AMPLIFIER AND OPTICAL TRANSMISSION APPARATUS

[75] Inventors: Tsukasa Takahashi; Hiroyuki Itou; Yuji Tamura, all of Sapporo; Michikazu Shima, Kawasaki; Kazuo Yamane, Kawasaki; Yumiko Kawasaki, Kawasaki; Keisuke Imai, Oyama; Yoshinori Ohkuma, Kawasaki; Kazuhiro Suzuki, Oyama; Yasunori Nagakubo; Takashi Tsuda, both of Kawasaki; Yuji Miyaki, Oyama, all of Japan

[73] Assignee: Fujitsu Limited, Kanagawa, Japan

[21] Appl. No.: 412,290

[22] Filed: Mar. 28, 1995

[30] Foreign Application Priority Data

| May 20, 1994 | [JP] | Japan | 6-107168 |
| Feb. 13, 1995 | [JP] | Japan | 7-023640 |

[51] Int. Cl.⁶ ............................................. H01S 13/00
[52] U.S. Cl. ........................... 359/341; 359/160; 359/177
[58] Field of Search .......................... 359/341, 177, 359/160

[56] References Cited

U.S. PATENT DOCUMENTS

| 5,268,786 | 12/1993 | Matsushita et al. | 359/341 |
| 5,374,973 | 12/1994 | Maxham et al. | 359/341 |
| 5,379,195 | 1/1995 | Epstein . | |
| 5,428,471 | 6/1995 | McDermott | 359/177 |
| 5,442,479 | 8/1995 | Bülow et al. | 359/341 |
| 5,502,810 | 3/1996 | Watanabe | 359/177 |
| 5,517,351 | 5/1996 | Hatakeyama | 359/341 |
| 5,521,752 | 5/1996 | Heidemann et al. | 359/341 |

FOREIGN PATENT DOCUMENTS

| 0 395 277 | 10/1990 | European Pat. Off. . |
| 0 506 163 | 9/1992 | European Pat. Off. . |
| 59-117285 | 7/1984 | Japan . |
| 60-223180 | 11/1985 | Japan . |
| 5-129701 | 5/1993 | Japan . |
| 5-235445 | 9/1993 | Japan . |
| 5-241290 | 9/1993 | Japan . |
| 5-291667 | 11/1993 | Japan . |
| 6-268602 | 9/1994 | Japan . |
| 7-15055 | 1/1995 | Japan . |

*Primary Examiner*—Mark Hellner
*Attorney, Agent, or Firm*—Helfgott & Karas, P.C.

[57] ABSTRACT

The optical amplifier includes a doped fiber doped with a rare earth element, a pumping light source, means for introducing signal light and pumping light into the doped fiber, detection means for detecting whether or not amplified signal light is included in light outputted from the doped fiber, and means for decreasing the intensity of the pumping light when it is detected that amplified signal light is not included. It can be possible to eliminate an influence of an optical surge arising from a characteristic of the doped fiber.

18 Claims, 60 Drawing Sheets

FIG. 28A  V$_{T1}$
FIG. 28B  V$_{T2}$
FIG. 28C  IDLING ELECTRIC CURRENT CONTROL VOLTAGE
FIG. 28D  ALC CONTROL VOLTAGE
FIG. 28E  LD DRIVER CONTROL VOLTAGE
FIG. 28F  PUMPING LIGHT OUTPUT
FIG. 28G  EDFA OUTPUT
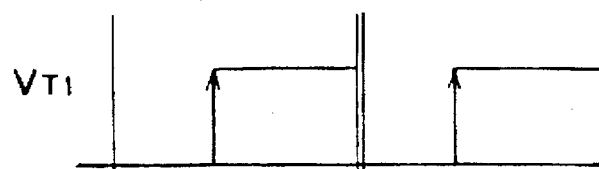
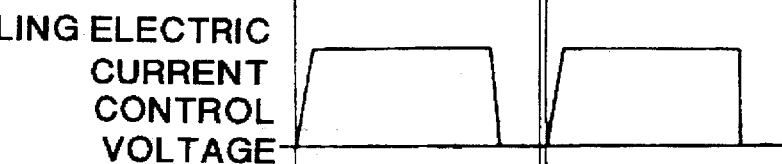
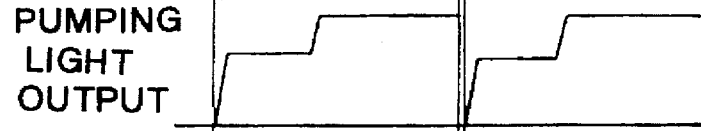
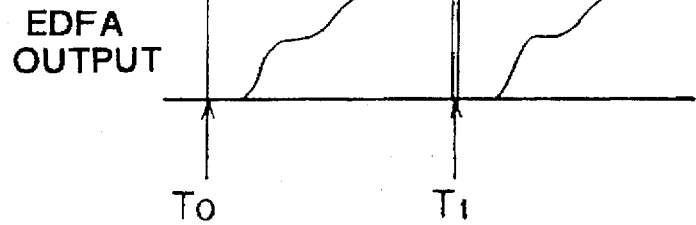
T$_0$  T$_1$

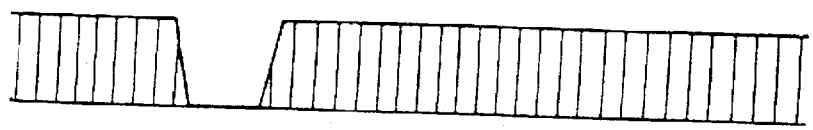
FIG. 50A P11
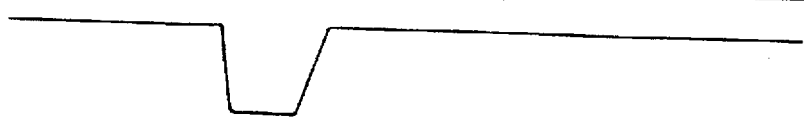
FIG. 50B P12
FIG. 50C P13
FIG. 50D P14
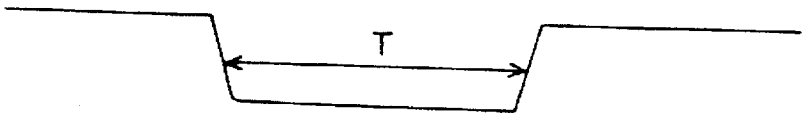
FIG. 50E P15
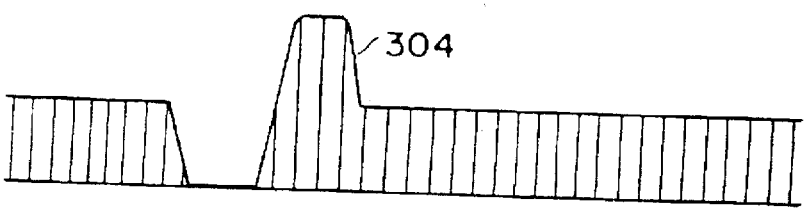
FIG. 50F P16

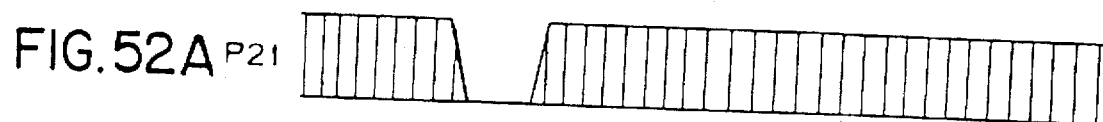
FIG.52A P21
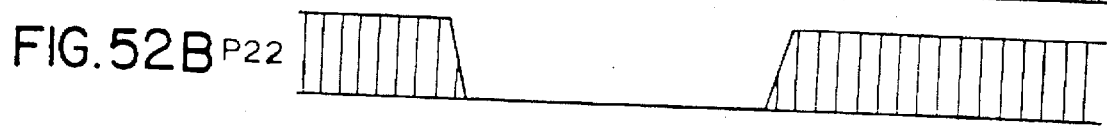
FIG.52B P22
FIG.52C P23
FIG.52D P24
FIG.52E P25
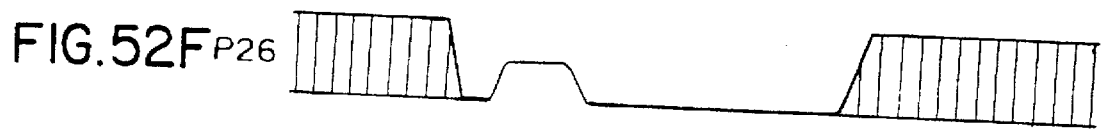
FIG.52F P26
FIG.52G P27  308

P31 (DATA)

P32 (INPUT DATA DETECTION)

P33 (SHUTTING DOWN SIGNAL)

P34 (LD OUTPUT)

P35 (OPTICAL OUTPUT ALARM)

P36 (MONOSTABLE MULTIVIBRATOR OUTPUT)

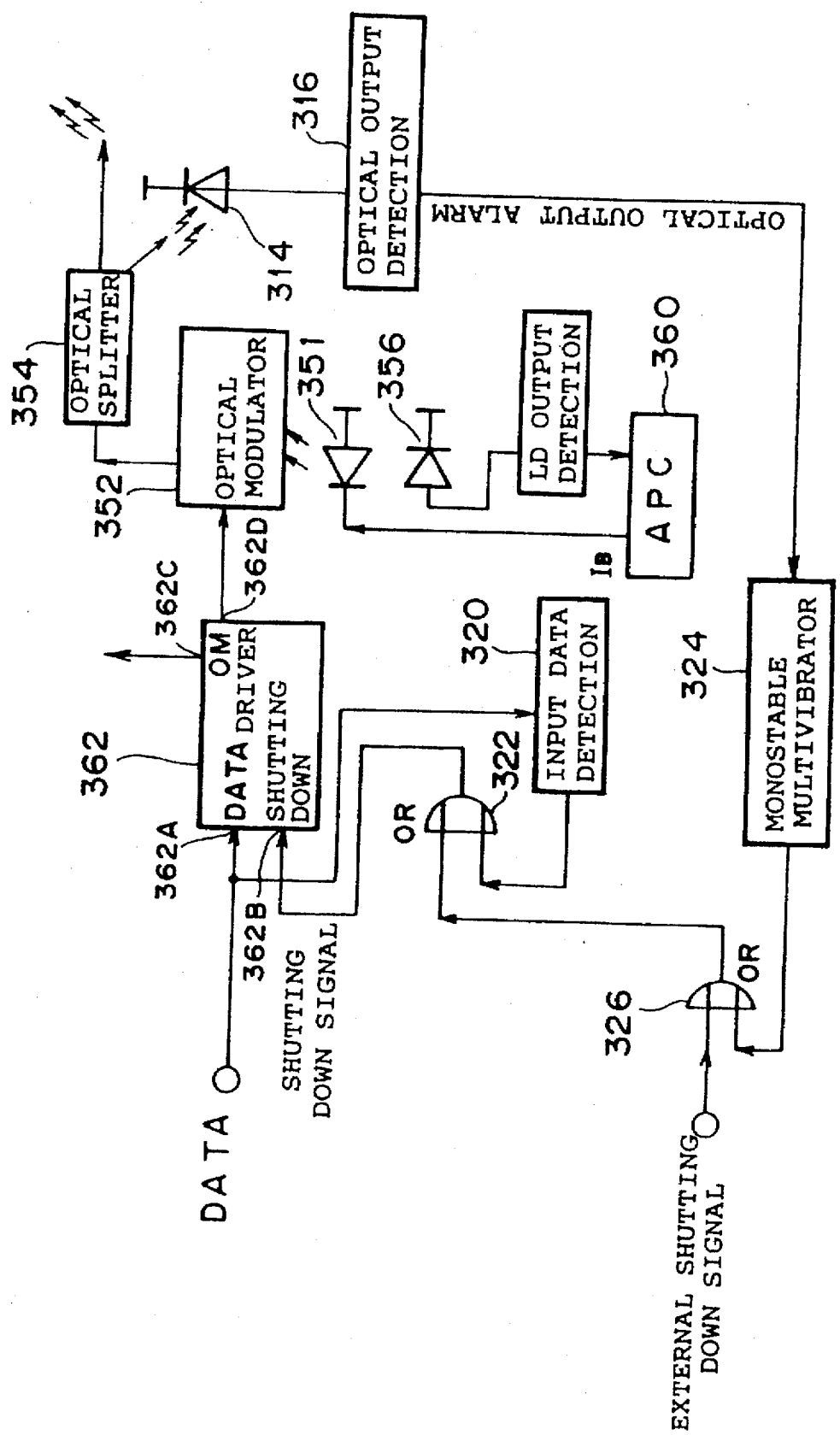

OPTICAL AMPLIFIER AND OPTICAL TRANSMISSION APPARATUS

BACKGROUND OF THE INVENTION

1. Field of the Invention

This invention relates to an optical amplifier and an optical transmission apparatus.

2. Description of the Related Art

In recent years, optical amplifiers which employ a waveguide structure (referred to as "doped fiber" in the present application) doped with a rare earth element including an EDF (erbium-doped fiber) have been developed, and construction of systems which include a large number of optical repeaters including such optical amplifiers interposed in an optical transmission line has been proposed. In order to put optical amplifiers of the type just mentioned into practical use, it is essentially required to adopt a controlling technique which conforms to characteristics of a doped fiber, and various control systems have been proposed. For example, optical amplifiers of the type mentioned have a problem in that an optical surge is likely produced, for example, due to the presence of a delay time after signal light and pumping light are introduced into a doped fiber until stimulated emission occurs, and countermeasures against the problem are demanded for optical amplifiers and optical transmitters.

When pumping light having a predetermined wavelength is introduced from a first end toward a second end or from the second end toward the first end of a doped fiber which is doped with a rare earth element suitable for a wavelength of signal light to be amplified while signal light is introduced from the first end toward the second end of the doped fiber, stimulated emission occurs in the doped fiber so that the signal light is amplified. The wavelength of the pumping light depends upon the wavelength of the signal light and the doped element. A laser diode is normally used as a pumping light source for outputting pumping light. Since the amplification factor relies upon the intensity of pumping light, it is advantageous for construction of various control systems to employ as a pumping light source a laser diode which exhibits a variable output level.

For example, when an optical amplifier which is based on the principle of stimulated emission described above is applied to an optical communication system, it is demanded to keep fixed the output level of the optical amplifier from the necessity of system designing. Therefore, in an optical amplifier which employs a doped fiber, automatic level control (ALC) is usually applied so that the output level of the optical amplifier may be fixed. In order to perform ALC, light outputted from the doped fiber is split into two beams of light. The first split light is sent out into an optical transmission line while the second split light is converted into a photoelectric current by a photo-detector. The photoelectric current is converted by current/voltage conversion and then compared with a reference voltage, and the bias electric current to a laser diode serving as a pumping light source is controlled so that the difference obtained by the comparison may be zero or fixed.

If the input of signal light in the optical amplifier in which ALC is proceeding is intercepted, then the pumping light is increased as a result of the ALC. If inputting of signal light is restored in this condition, then a surge is outputted from the optical amplifier from the reason that there is a delay of several ms before stimulated emission in the doped fiber. If the optical surge reaches a receiver, then there is the possibility that this may make an excessive input to a photoelectric converter (photo-detector) of the receiver and destroy a component of the receiver. Therefore, an optical amplifier used as an optical repeater, particularly an optical amplifier applied to multi-stage repeating, can desirably detect that the optical signal has been intercepted.

Where an optical amplifier is used as a preamplifier on the receive side, the power of signal light inputted is so low that, if it is tried to split the inputted signal light and detect interception of the signal light based on the thus split light, the power of the inputted signal light may be lower than a detection limit of the photo-detector. Meanwhile, if it is tried to split signal light inputted to an optical amplifier and detect interception of the signal light, then the NF (noise figure) of the optical amplifier is deteriorated by an amount by which the power of the signal light supplied to the doped fiber is decreased.

SUMMARY OF THE INVENTION

Accordingly, it is an object of the present invention to make it possible to detect interception of signal light inputted to an optical amplifier readily.

It is another object of the present invention to prevent deterioration of the NF of an optical amplifier which arises from detection of interception of signal light.

It is a further object of the present invention to eliminate an influence of an optical surge arising from a characteristic of a doped fiber.

According to the present invention, there is provided an optical amplifier, comprising a doped fiber doped with a rare earth element and having a first end and a second end for guiding signal light from the first end toward the second end thereof, a pumping light source for outputting pumping light, optical coupling means optically connected to the doped fiber and the pumping light source for introducing the pumping light into the doped fiber, detection means for receiving light outputted from the second end of the doped fiber and detecting whether or not amplified signal light is included in the received light, and control means for controlling the pumping light source to lower the intensity of the pumping light when it is detected by the detection means that amplified signal light is not included in the light outputted from the doped fiber.

In the optical amplifier of the present invention, the detection means receives output light of the doped fiber and detects whether or not amplified signal light is included in the received light. Accordingly, interception of inputting of the signal light takes place on the downstream side of the doped fiber. Accordingly, the NF of the optical amplifier is not deteriorated at all. Further, even where the power of signal light inputted is very low in such a case as where the optical amplifier is used as a pre-amplifier on the receive side or the like, since detection of the signal light is performed after the signal light is amplified, interception of inputting of the signal light can be detected readily. Further, since the intensity of the pumping light is lowered when it is detected that amplified signal light is not included in light outputted from the doped fiber, when inputting of signal light is restored, production of an optical surge is prevented.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 28 is a time chart upon changing over from idling to ALC based on setting of a time constant;

FIG. 50 is a time chart illustrating operation of the EDFA of FIG. 49;

FIG. 52 is a time chart illustrating operation of the EDFA of FIG. 51;

FIG. 60 is a block diagram showing a sixth embodiment of an optical transmission apparatus to which the present invention is applied.

DESCRIPTION OF THE PREFERRED EMBODIMENTS

Embodiments of the present invention will be described in detail below with reference to the accompanying drawings.

Figure 1:
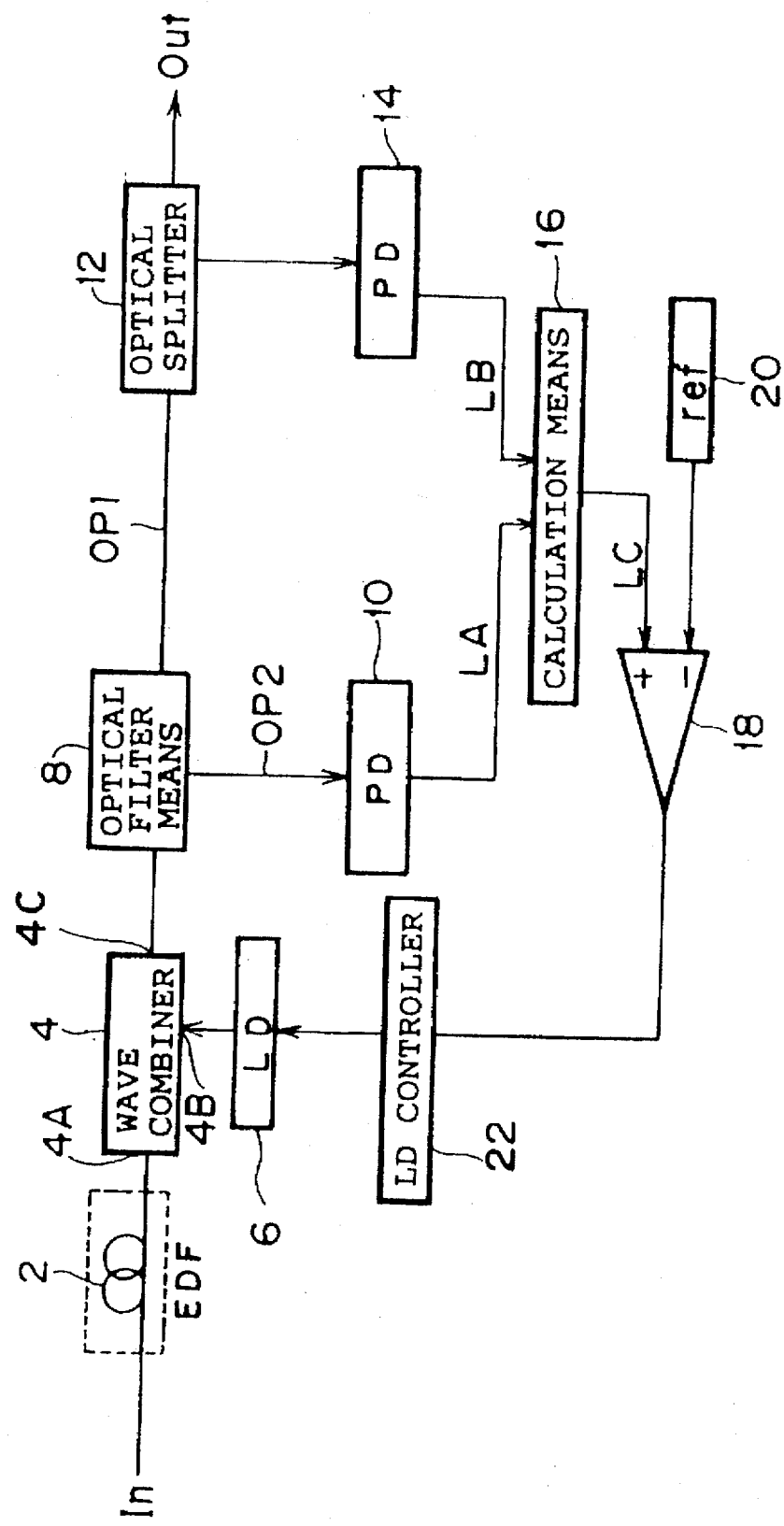
FIG. 1 is a block diagram showing a first embodiment of an EDFA to which the present invention is applied.

FIG. 1 is a block diagram showing a first embodiment of an EDFA (erbium-doped fiber amplifier) to which the present invention is applied. The present EDFA includes a doped fiber 2 doped at least at the core thereof with erbium (Er). Signal light to be amplified is supplied to a first end of the doped fiber 2, and a second end of the doped fiber 2 is optically connected to a port 4A of a wave combiner 4. A doped fiber doped with erbium (EDF; erbium-doped fiber) is suitable for amplification of signal light of a wavelength of a 1.55 μm band. A laser diode 6 serving as a pumping light source is optically connected to a port 4B of the wave combiner 4, and pumping light from the LD 6 passes the ports 4B and 4A of the wave combiner 4 in this order and is supplied from the second end of the doped fiber 2 to the doped fiber 2. The construction wherein the advancing directions in a doped fiber of signal light to be amplified and pumping light are opposite to each other in this manner is called backward pumping type. Also the construction of forward pumping type wherein the advancing directions of signal light and pumping light are same can be adopted. When it is tried to amplify signal light of a wavelength of the 1.55 μm band using an EDF, 0.98 μm or 1.41 μm is selected as the wavelength of pumping light.

If signal light is supplied to the doped fiber 2 in a condition wherein pumping light is introduced into the doped fiber 2, the doping element (in this instance, Er) in the doped fiber 2 is excited by the pumping light to cause stimulation emission, and as a result, amplification of the signal light takes place. The signal light amplified in the doped fiber 2 passes the ports 4A and 4C of the wave combiner 4 in this order and is then supplied to optical filter means 8. Also spontaneous emission light generated in the doped fiber 2 is inputted to the optical filter means 8 by way of the same route as the amplified signal light.

The optical filter means 8 separates the light supplied thereto from the doped fiber 2 into a first optical output OP1 which corresponds to amplified signal light and a second optical output OP2 which corresponds to spontaneous emission light, and outputs them from different ports. The second optical output OP2 which corresponds to spontaneous emission light is converted by photo-electric conversion by a photo-detector 10. The first optical output OP1 which corresponds to amplified signal light is split into two beams of light by an optical splitter 12. One of the thus split two beams of light is sent out as an output of the present optical amplifier into an optical transmission line not shown, and the other split beam of light is converted by photo-electric conversion by a photo-detector 14. Outputs of the photo-detectors 10 and 14 are supplied to input ports of calculation means 16. The calculation means 16 calculates the level difference between the input signals by subtraction or division and outputs a result of the calculation.

Figure 2:
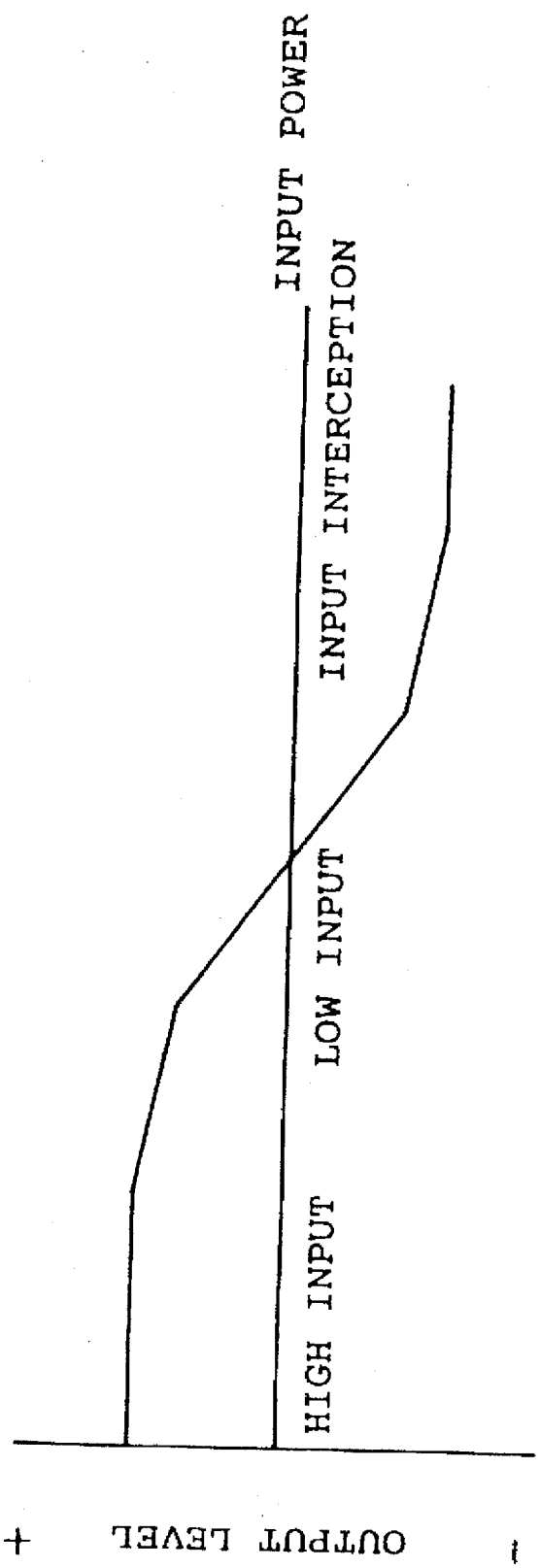
FIG. 2 is a diagram illustrating a characteristic of calculation means of FIG. 1.

Now, the signal level inputted from the photo-detector 10 to the calculation means 16 in accordance with the intensity level of spontaneous emission light is represented by LA; the signal level inputted from the photo-detector 14 to the calculation means 16 in accordance with amplified signal light is represented by LB; and the output level of the calculation means 16 when the contents of calculation of the calculation means 16 are subtraction is represented by LC. The relationship between the output level LC of the calculation means 16 and the input power to the optical amplifier is illustrated in FIG. 2. Meanwhile, the spectrum of the output light of the doped fiber 2 is shown in FIG. 3.

Figure 3:
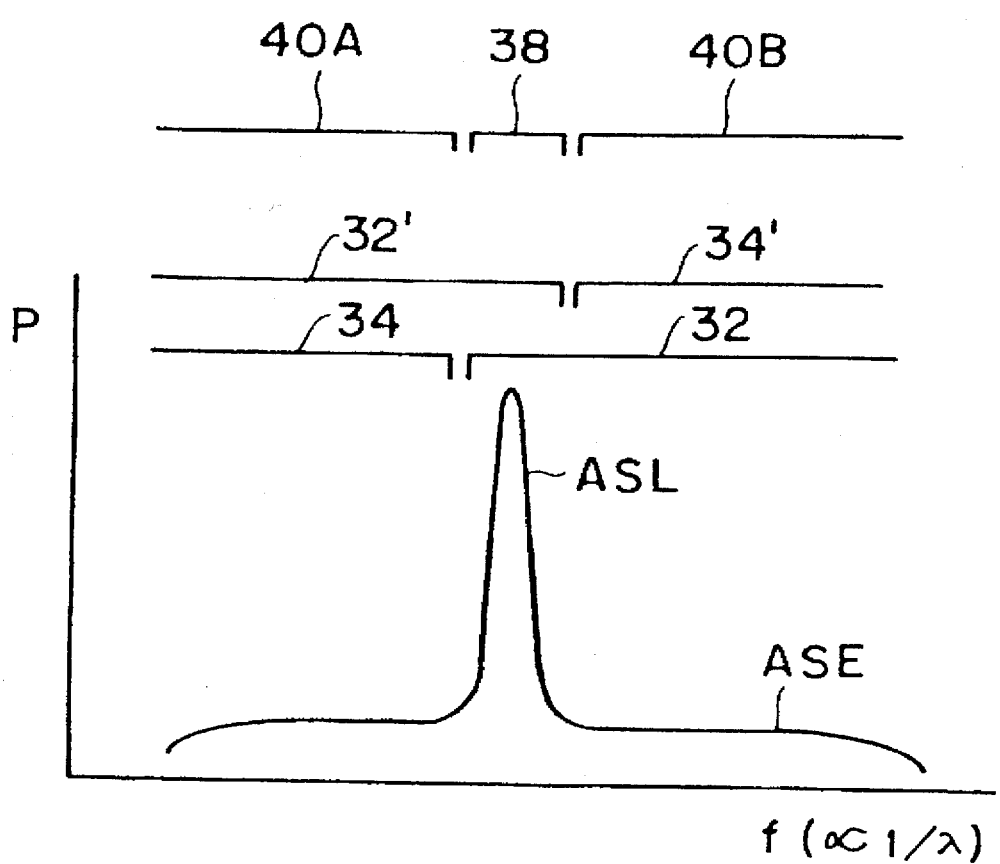
FIG. 3 is a diagram showing a spectrum of output light of an EDF.

In FIG. 3, the axis of ordinate indicates the light intensity (or electric power density), and the axis of abscissa indicates the frequency f which increases in inverse proportion to the wavelength. Referring to FIG. 3, reference character ASL denotes a spectrum of a comparatively narrow bandwidth of amplified signal light, and reference character ASE denotes a spectrum of spontaneous emission light of a wide bandwidth near to white noise.

In FIG. 2, the axis of ordinate denotes the output level LC of the calculation means 16, and the axis of abscissa denotes the input power of signal light. Where the input power of signal light is sufficiently high corresponding to a left side portion of the axis of abscissa of FIG. 2, the output level LC of the calculation means 16 assumes a positive value. As the input power of signal light decreases, the output level LC of the calculation means 16 decreases in a direction toward the negative. In particular, if the input level of the signal light becomes comparatively low corresponding to a substantially central portion of the axis of abscissa of FIG. 2, then the output level LC of the calculation means 16 becomes equal to zero or a negative value, and if the input of signal light is intercepted corresponding to a right side portion of the axis of abscissa of FIG. 2, the output level LC of the calculation means 16 assumes a negative value. It is to be noted that, since the positive or negative sign of the output level on the axis of ordinate of FIG. 2 depends upon the splitting ratio of the optical splitter 12 and so forth, it is not absolute but relative.

As described above, interception or restoration of inputting of signal light can be detected from the output level LC of the calculation means 16. To this end, in the present embodiment, a comparator 18 and a reference voltage source 20 are used. The output level of the calculation means 16 is supplied as a voltage signal to one of a pair of input ports of the comparator 18 while a reference voltage from the reference voltage source 20 is supplied to the other input port. The output of the comparator 18 is supplied to an LD controller 22, and the laser diode 6 is driven by a control signal from the LD controller 22.

A signal supplied from the comparator 18 to the LD controller 22 includes information (input interception information) indicating that inputting of signal light has been intercepted and information (restoration information) indicating that inputting of signal light has been restored. The LD controller 22 controls, when it receives such input interception information, the LD 6 so that the intensity of pumping light is lowered. One of the reasons is that, if the power of the pumping light is lowered fully to zero, then the excitation condition of the doped fiber 2 is canceled, and then when inputting of signal light is restored, this cannot be detected with the construction described above. Another reason is that production of an optical surge when inputting of signal light is restored is prevented by lowering the intensity of pumping light in a stand-by condition until inputting of signal light is restored after inputting of signal light is intercepted. Based on the second reason, the upper limit to the intensity of pumping light in a stand-by condition is set so that the peak of an optical surge which may possibly be produced may remain within an allowable range of a photo-detector in a receiver or the like. Meanwhile, the lower limit to the intensity of pumping light in a stand-by condition is set, from the first reason described above, so that it can be detected by the comparator 18 that inputting of signal light has been restored.

Restoration information indicating that inputting of signal light has been restored is obtained when the output level of the calculation means 16 exceeds the reference voltage. If such restoration information is inputted from the comparator 18 to the LD controller 22, the LD controller 22 controls the laser diode 6 so that the intensity of pumping light having been lowered once may be restored. Such restoration operation may be triggered by production of an optical surge on the output side of the optical amplifier. This will be described in detail below.

Figure 4:
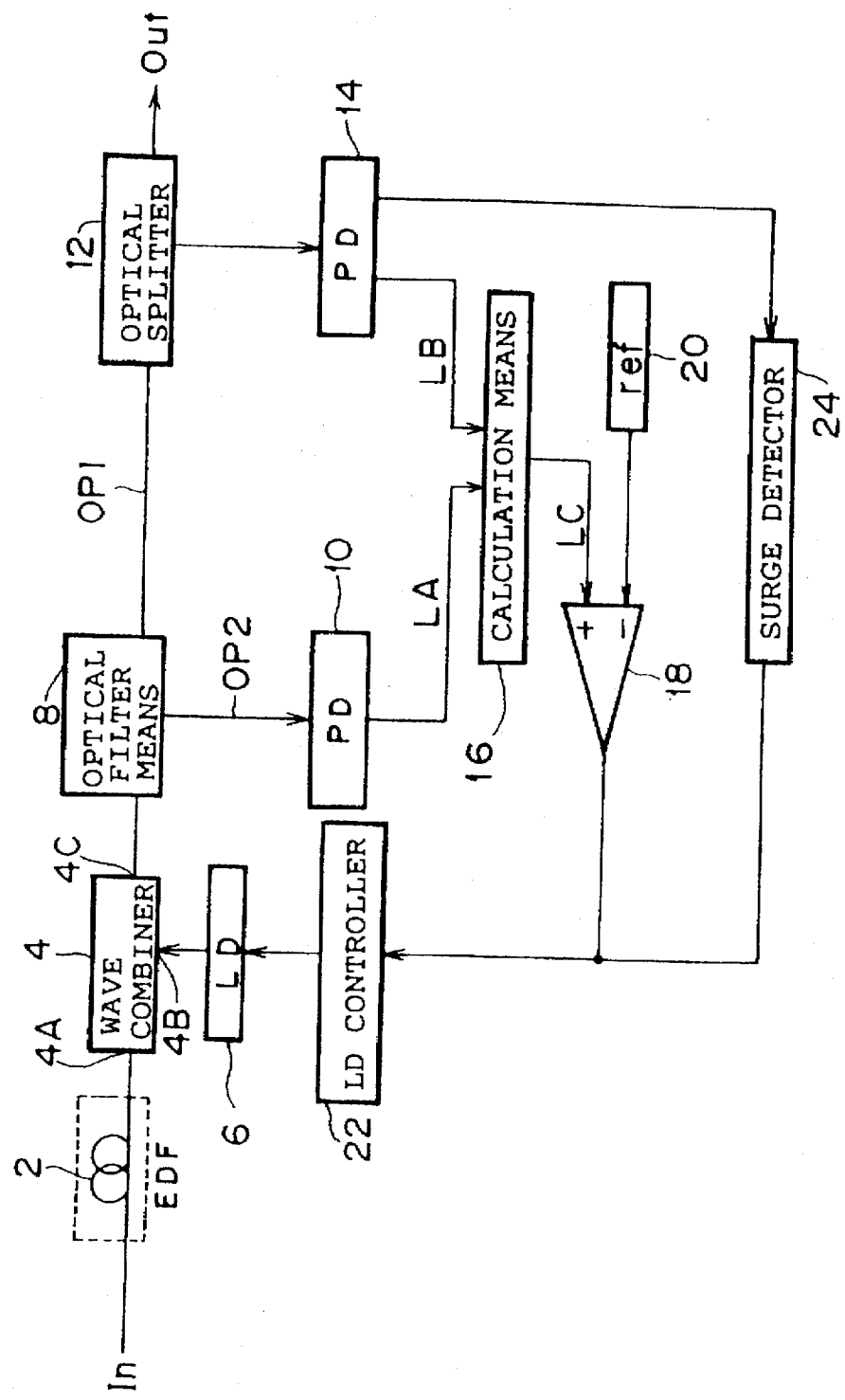
FIG. 4 is a block diagram showing a second embodiment of an EDFA to which the present invention is applied.

FIG. 4 is a block diagram showing a second embodiment of an EDFA to which the present invention is applied. The present EDFA is characterized in that it additionally includes a surge detector 24 in contrast with the construction of FIG. 1. An output signal of the photo-detector 14 is supplied to the surge detector 24. Accordingly, when an optical surge is produced on amplified signal light, the surge detector 24 can detect this. If the surge detector 24 detects production of an optical surge, then restoration information is sent from the surge detector 24 to the LD controller 22, and consequently, the laser diode 6 is controlled so that the intensity of pumping light having been lowered once may be restored.

Several embodiments described below are provided to describe examples of detailed constructions of the optical filter means 8.

Figure 5:
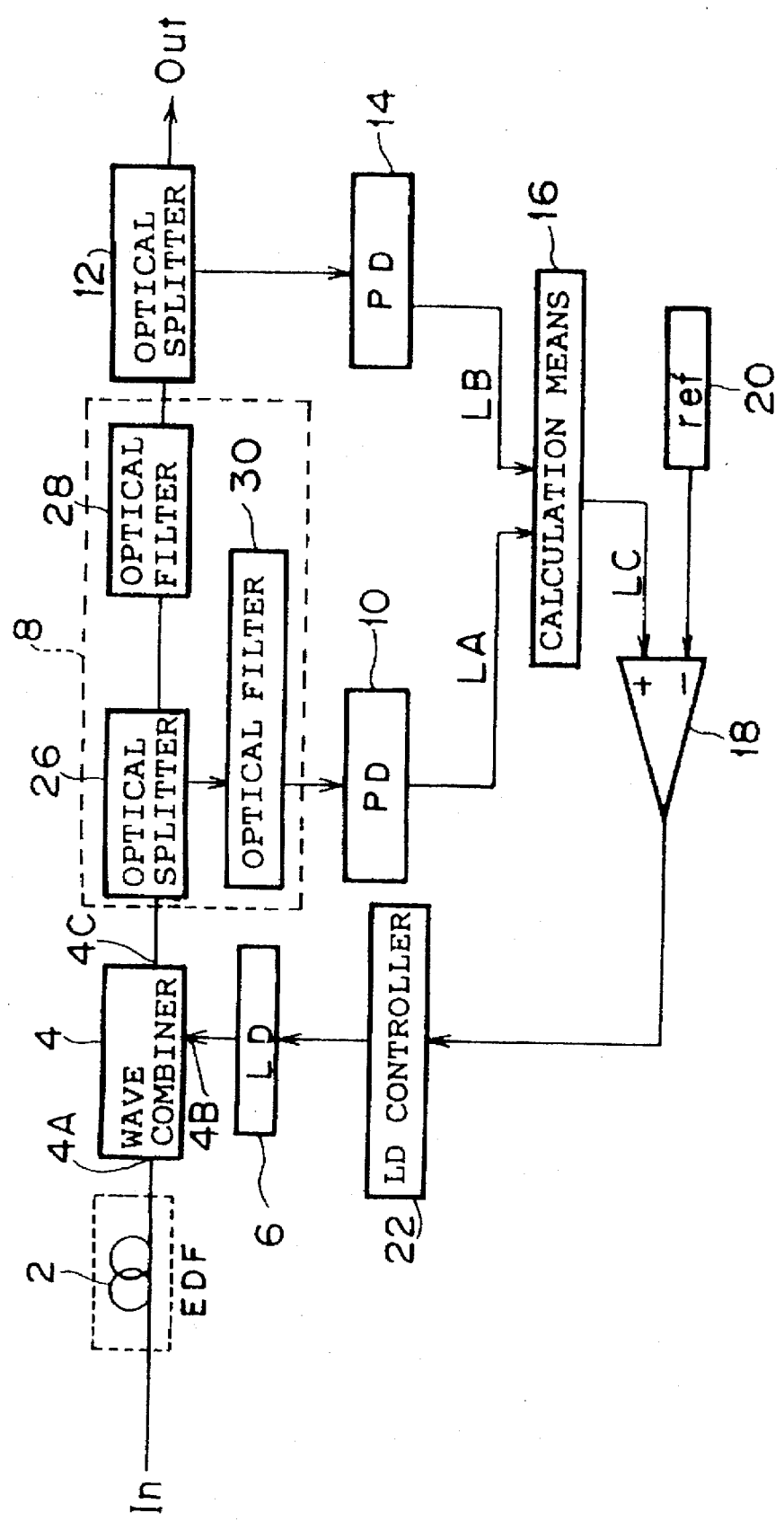
FIG. 5 is a block diagram showing a third embodiment of an EDFA to which the present invention is applied.

FIG. 5 is a block diagram showing a third embodiment of an EDFA to which the present invention is applied. The optical filter means 8 includes an optical splitter 26 for splitting light supplied thereto from the doped fiber 2 by way of the wave combiner 4 into first split light and second split light, an optical filter 28 for receiving the first split light and passing signal light therethrough, and an optical filter 30 for receiving the second split light and passing spontaneous emission light therethrough. Output light of the optical filter 30 is supplied to the photo-detector 10. Output light of the optical filter 28 is split into two beams of light by the optical splitter 12. One of the two split beams of light is sent out into the optical transmission line not shown, and the other split beam of light is inputted to the photo-detector 14.

Same reference characters are applied to substantially same elements through all of the figures, and in order to avoid overlapping description, description of operations and effects of same elements will be omitted.

Figure 6:
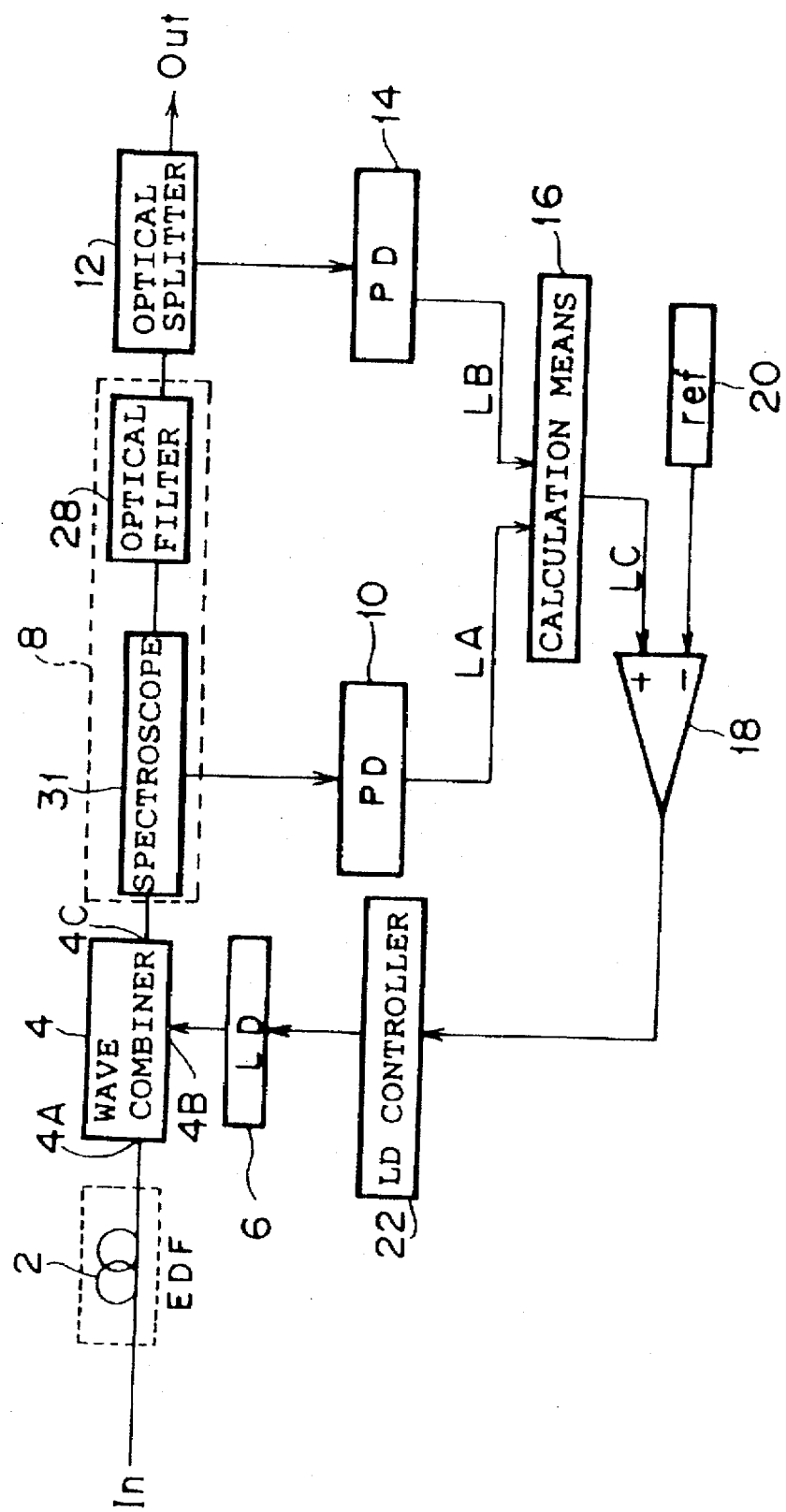
FIG. 6 is a block diagram showing a fourth embodiment of an EDFA to which the present invention is applied.

FIG. 6 is a block diagram showing a fourth embodiment of an EDFA to which the present invention is applied. The optical filter means 8 includes a spectroscope 31 for spectrally diffracting light supplied thereto from the doped fiber 2 by way of the wave combiner 4 into light of a first wavelength region including the wavelength of amplified signal light and light of a second wavelength region which does not include the wavelength of amplified signal light, and an optical filter 28 for receiving light of the first wavelength region and passing amplified signal light therethrough. The amplified signal light having passed the optical filter 28 is split into two beams of light by the optical splitter 12, and one of the two split beams of light is sent out to the optical transmission line not shown. The other split beam of light is supplied to the photo-detector 14. Light of the second wavelength region outputted from the spectroscope 31 is supplied to the photo-detector 10. An example of the first and second wavelength regions is indicated by reference characters 32 and 34, respectively, in FIG. 3. In the present example, the first wavelength region 32 including the wavelength of amplified signal light is set to the high frequency side while the second wavelength region 34 which does not include the wavelength of amplified signal light is set to the low frequency side. Alternatively, the first wavelength region 32' may be set to the low frequency side while the second wavelength region 34' is set to the high frequency side conversely.

Figure 7:
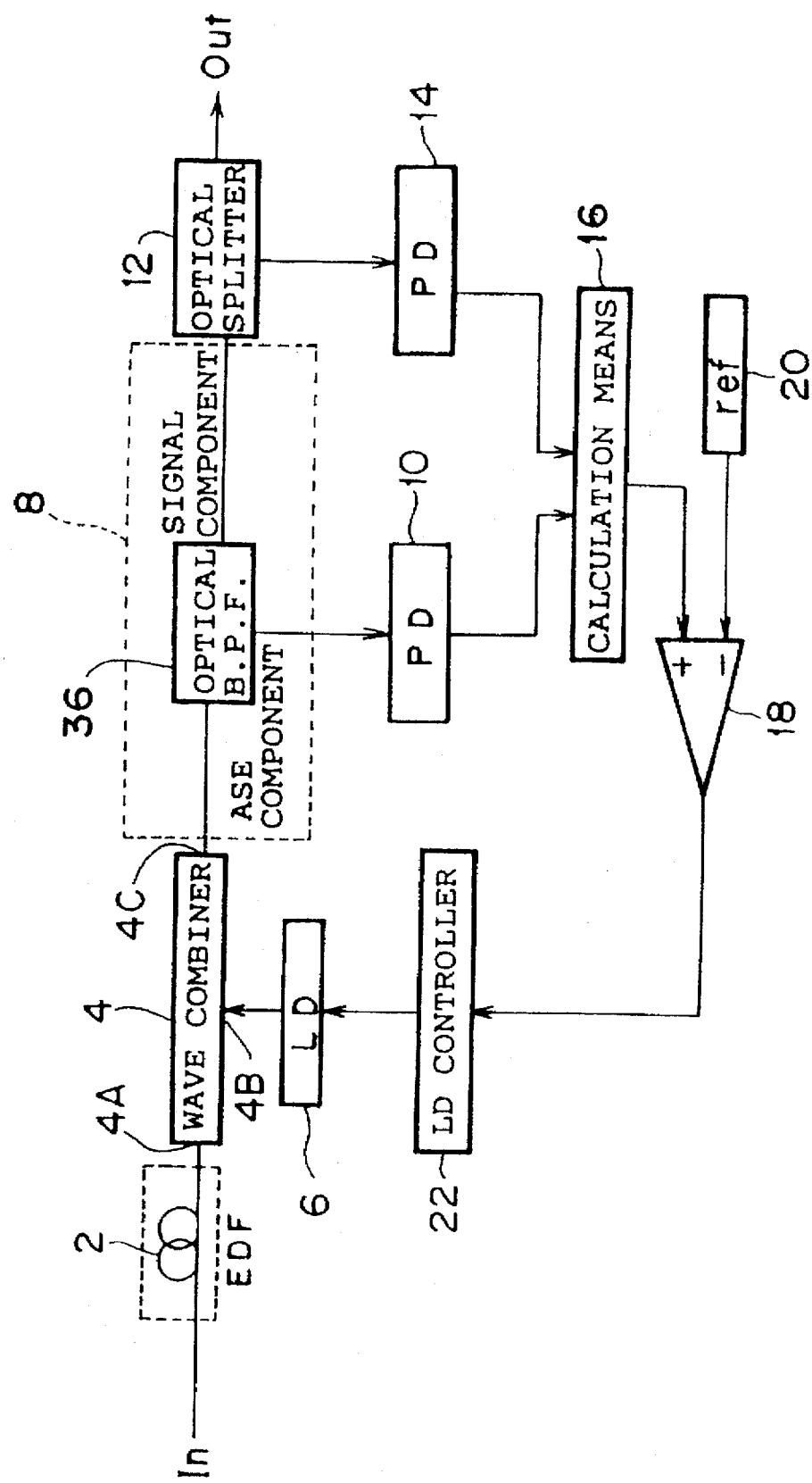
FIG. 7 is a block diagram showing a fifth embodiment of an EDFA to which the present invention is applied.

FIG. 7 is a block diagram showing a fifth embodiment of an EDFA to which the present invention is applied. The optical filter means 8 includes an optical band-pass filter 36 for separating light supplied thereto from the doped fiber 2 by way of the wave combiner 4 into a first component of a narrow band including the wavelength of amplified signal light and a second component outside the band. The first component is split into two beams of light by the optical splitter 12, and one of the two split beams of light is sent out into the optical transmission line not shown while the other split beam of light is supplied to the photo-detector 14. The second component outputted from the optical filter means 8 is supplied to the photo-detector 10. In FIG. 3, the band of the first component is denoted by reference numeral 38, and the band of the second component is denoted by reference numerals 40A and 40B.

Figure 8:
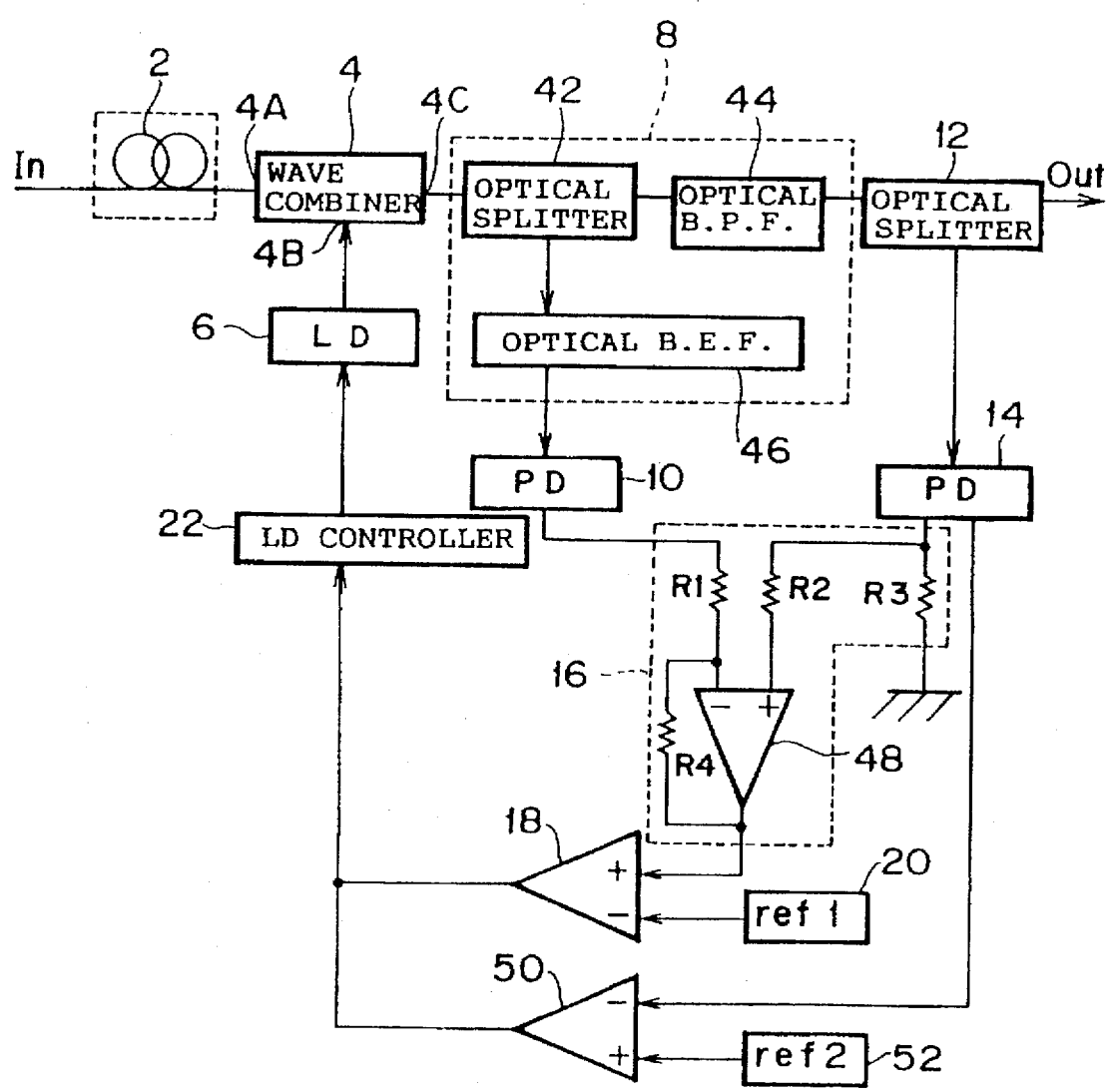
FIG. 8 is a block diagram showing a sixth embodiment of an EDFA to which the present invention is applied.

FIG. 8 is a block diagram showing a sixth embodiment of an EDFA to which the present invention is applied. The optical filter means 8 includes an optical splitter 42 for splitting light supplied thereto from the doped fiber 2 by way of the wave combiner 4 into first split light and second split light, an optical band-pass filter 44 for receiving the first split light and passing light of a narrow band including the wavelength of amplified signal light therethrough, and an optical band eliminating filter 46 for receiving the second split light and eliminating light of the narrow band including the wavelength of amplified signal light but passing light outside the band therethrough. Output light of the optical band blocking filter 46 is supplied to the photo-detector 10. Output light of the optical band-pass filter 44 is split into two beams of light by the optical splitter 12, and one of the two split beams of light is sent out into the optical transmission line not shown while the other split beam of light is supplied to the photo-detector 14.

In order to perform such subtraction as described above, the calculation means 16 includes an operational amplifier 48. An output signal of the photo-detector 10 is inputted to one of a pair of input ports of the operational amplifier 48 by way of a resistor R1, and an output signal of the photo-detector 14 is inputted to the other input port by way of another resistor R2. Meanwhile, the photo-detector 14 is grounded by way of a further resistor R3. The input port of the operational amplifier 48 to which the resistor R1 is connected is connected to the output port by way of a still further resistor R4. And, an output signal of the operational amplifier 48 is supplied to the comparator 18. In the present embodiment, restoration information is obtained by detection of an optical surge similarly as in the embodiment of FIG. 4. In particular, a comparator 50 is used as a surge detector, and the output signal of the photo-detector 14 is supplied to one of a pair of input ports of the comparator 50 while a reference voltage from the reference voltage source is supplied to the other input port. A signal from the comparator 50 including restoration information is supplied to the LD controller 22.

Figure 9:
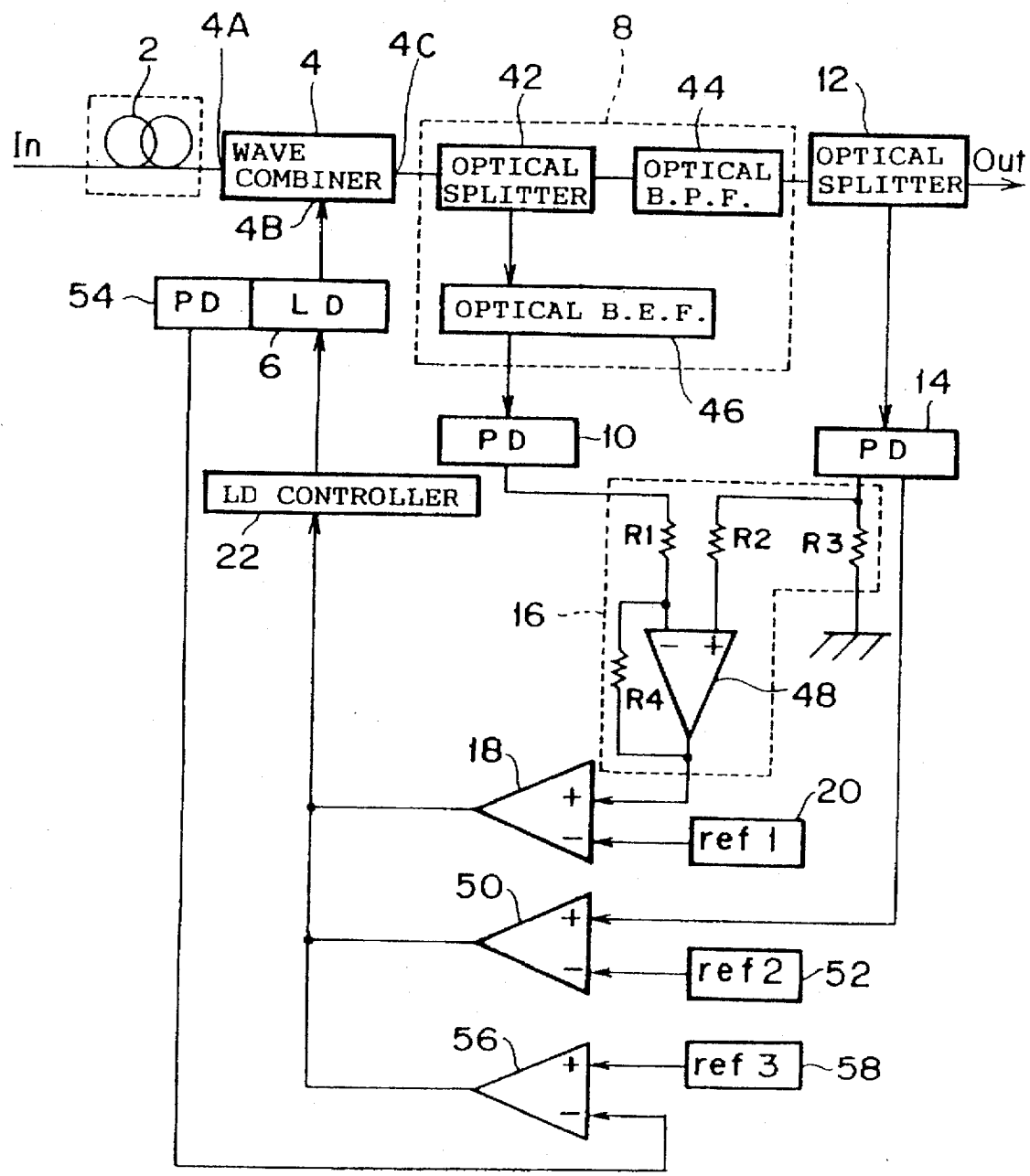
FIG. 9 is a block diagram showing a seventh embodiment of an EDFA to which the present invention is applied.

FIG. 9 is a block diagram showing a seventh embodiment of an EDFA to which the present invention is applied. The present EDFA is characterized in that it includes, in addition to the construction of FIG. 8, a circuit for performing APC (automatic power control) of the pumping power source. A photo-diode 54 receives backward light of the laser diode 6 serving as a pumping light source, and outputs an electric signal corresponding to the intensity of the backward light. This signal is supplied to one of a pair of input ports of a comparator 56 for APC. A reference voltage from a reference voltage source 58 is supplied to the other input port of the comparator 56. And, an output signal of the comparator 56 is supplied to the LD controller 22.

Figure 10:
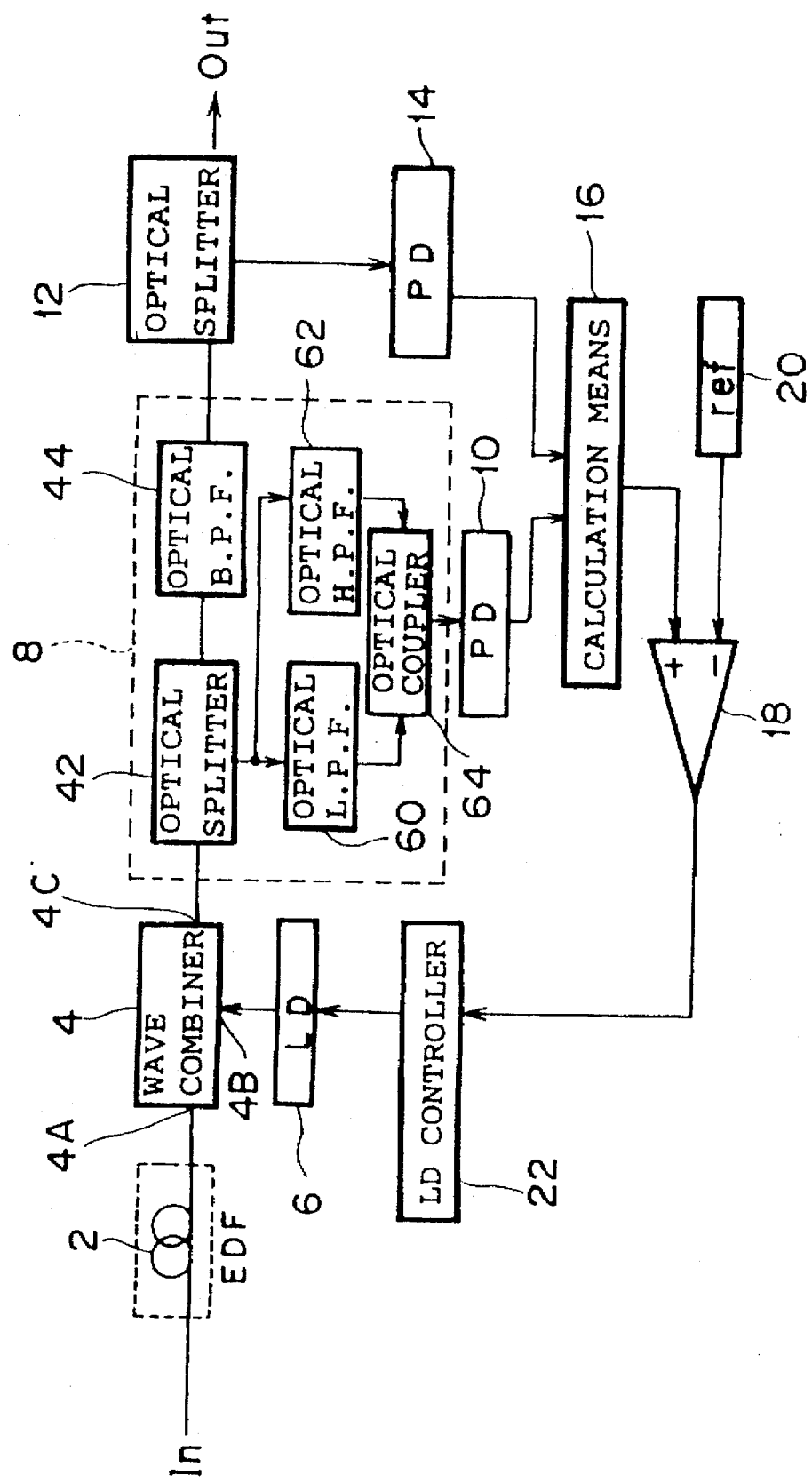
FIG. 10 is a block diagram showing an eighth embodiment of an EDFA to which the present invention is applied.

FIG. 10 is a block diagram showing an eighth embodiment of an EDFA to which the present invention is applied. The present EDFA includes optical filter means having a little modified construction of the optical filter means 8 of FIG. 9, and the other portions thereof are same as those of FIG. 7.

In the present embodiment, in order to actually obtain the function of the optical band eliminating filter 46 of FIG. 9, an optical low-pass filter 60 for passing light on the longer wavelength side than the wavelength of amplified signal light therethrough and an optical high-pass filter 62 for passing light on the shorter wavelength side than the wavelength of amplified signal light therethrough are employed. Light from the optical splitter 42 is supplied to the optical low-pass filter 60 and the optical high-pass filter 62, and optical outputs of them are added to each other by an optical coupler 64 and then supplied to the photo-detector 10.

As described above, according to the first to eighth embodiments of the present invention, even when the power of input signal light is low, interception and restoration of the input signal light can be detected readily. Further, since splitting means for use for detection of interception of inputting is not required for the input side of the optical amplifier, there is no possibility that the NF of the optical amplifier may be deteriorated. Further, since the intensity of pumping light is lowered upon interception of input signal light, production of an optical surge is prevented.

Figure 11:
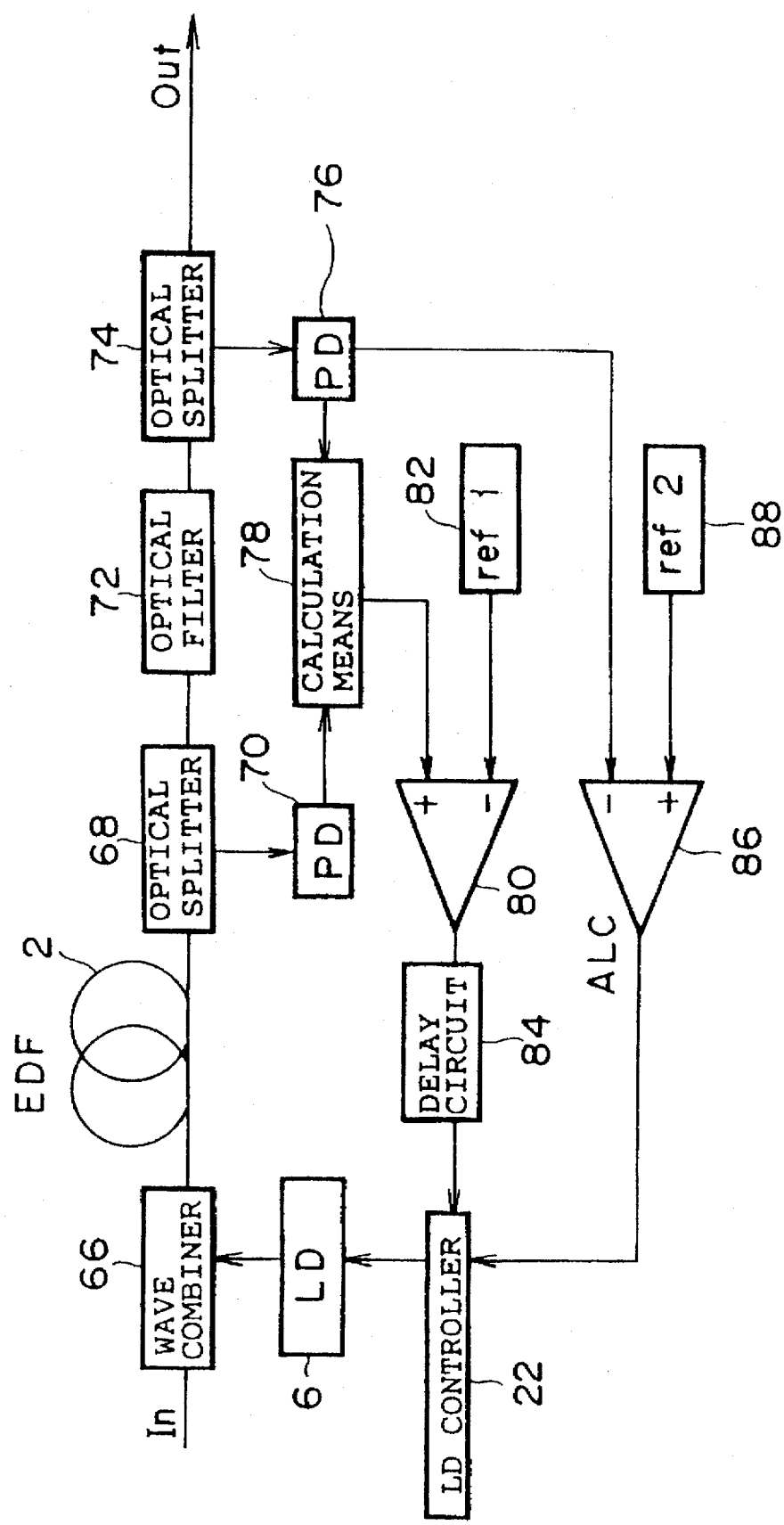
FIG. 11 is a block diagram showing a ninth embodiment of an EDFA to which the present invention is applied.

FIG. 11 is a block diagram showing a ninth embodiment of an EDFA to which the present invention is applied. The EDFA is forward excitation type. In particular, a wave combiner 66 serving as optical coupling means is provided on the upstream side in the propagation direction of signal light with respect to the doped fiber 2, and pumping light from the laser diode 6 is inputted to the doped fiber 2 in the same direction as signal light by way of the wave combiner 66. Output light of the doped fiber 2 is split into two beams of light by an optical splitter 68. One of the two split beams of light is converted by photo-electric conversion by a photo-detector 70. The other split beam of light of the optical splitter 68 is supplied to an optical filter 72, and output light of the optical filter 72 is split into two beams of light by an optical splitter 74. One of the two split beams of light of the optical splitter 74 is converted by photo-electric conversion by a photo-detector 76 while the other split beam of light is sent out to the optical transmission line not shown.

For the optical filter 72, for example, an optical band-pass filter for removing an ASE (Amplified Spontaneous Emission) component from output light of the doped fiber 2 can be employed. Output signals of the photo-detectors 70 and 76 are supplied to calculation means 78, and an output signal of the calculation means 78 is supplied to one of a pair of input ports of a comparator 80. A reference voltage from a reference voltage source 82 is supplied to the other input port of the comparator 80. For the calculation means 78, a subtracter or a divider can be employed, and properties of it will be hereinafter described. The comparator 80 is provided to detect that inputting of signal light has been intercepted or restored, and an output signal of the comparator 80 is supplied to the LD controller 22 by way of a delay circuit 84. An output signal of the photo-detector 76 is supplied to one of a pair of input ports of a comparator 86 for ALC, and a reference voltage from a reference voltage source 88 is supplied to the other input port. An output signal of the comparator 86 is supplied to the LD controller 22. The delay circuit 84 is a circuit for providing a protection time in order to prevent a malfunction which occurs, for example, when the input power to the EDFA fluctuates instantaneously.

Now, the signal level supplied from the photo-detector 70 to the calculation means 78 is represented by A; the signal level supplied from the photo-detector 76 to the calculation means 78 is represented by B; and the output level of the calculation means 78 is represented by C. In the present embodiment, since ALC is proceeding, if the optical input signal power is within a saturation gain region of the doped fiber 2, then the pumping power is low compared with a non-saturation gain region, and the value of A is low. Further, since ALC is proceeding, the value of B is fixed. As the optical input signal power decreases, also the output power of the EDFA decreases, but control is performed so as to raise the intensity of pumping light so that the output is kept fixed. If the input power further decreases, the pumping power increases, but either it is limited by a limiter or APC is entered. The value of A then is a high value compared with that when the input power is high. The value of B decreases as the input signal power decreases.

Figure 12:
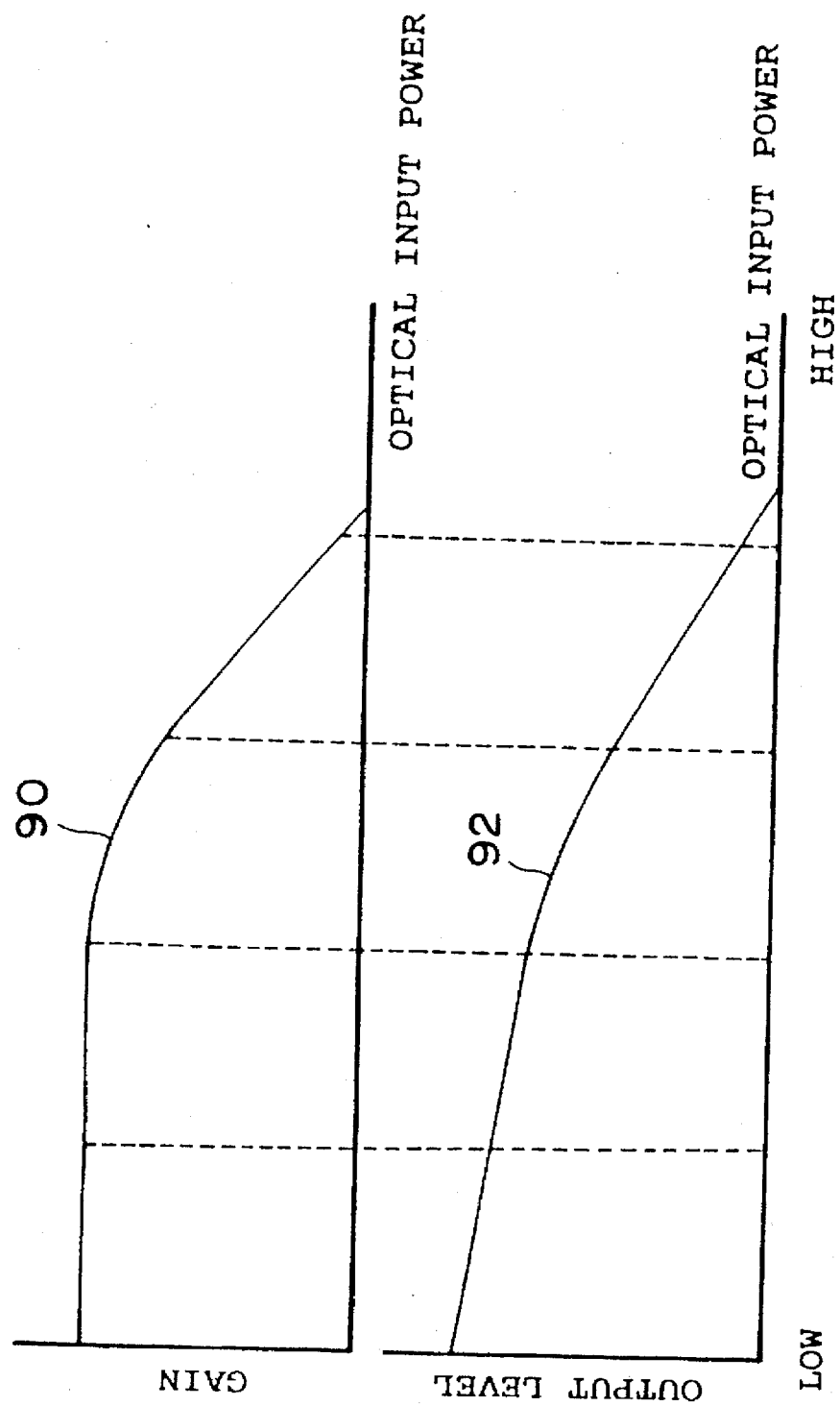
FIG. 12 is a diagram illustrating a characteristic of calculation means of FIG. 11.

The input/output characteristic of the calculation means 78 is illustrated in FIG. 12 together with the gain characteristic of the EDFA. Reference numeral 90 denotes the relationship between the potential of the EDFA and the optical input power, and reference numeral 92 denotes the relationship between the output level of the calculation means 78 and the optical input power. If the optical input power varies from a high value to a low value or interception of optical inputting occurs, the value of C increases as the optical input power decreases. Accordingly, interception information and restoration information can be obtained by comparison of the output level of the calculation means 78 with the reference voltage from the reference voltage source 82. It is to be noted that, since operations of the LD controller 22 based on interception information and restoration information are similar to those in the foregoing embodiments, description thereof will be omitted. In the present embodiment, in order to prevent a malfunction caused by a fluctuation of the input power, the delay circuit 84 is provided between the comparator 80 and the LD controller 22.

Figure 13:
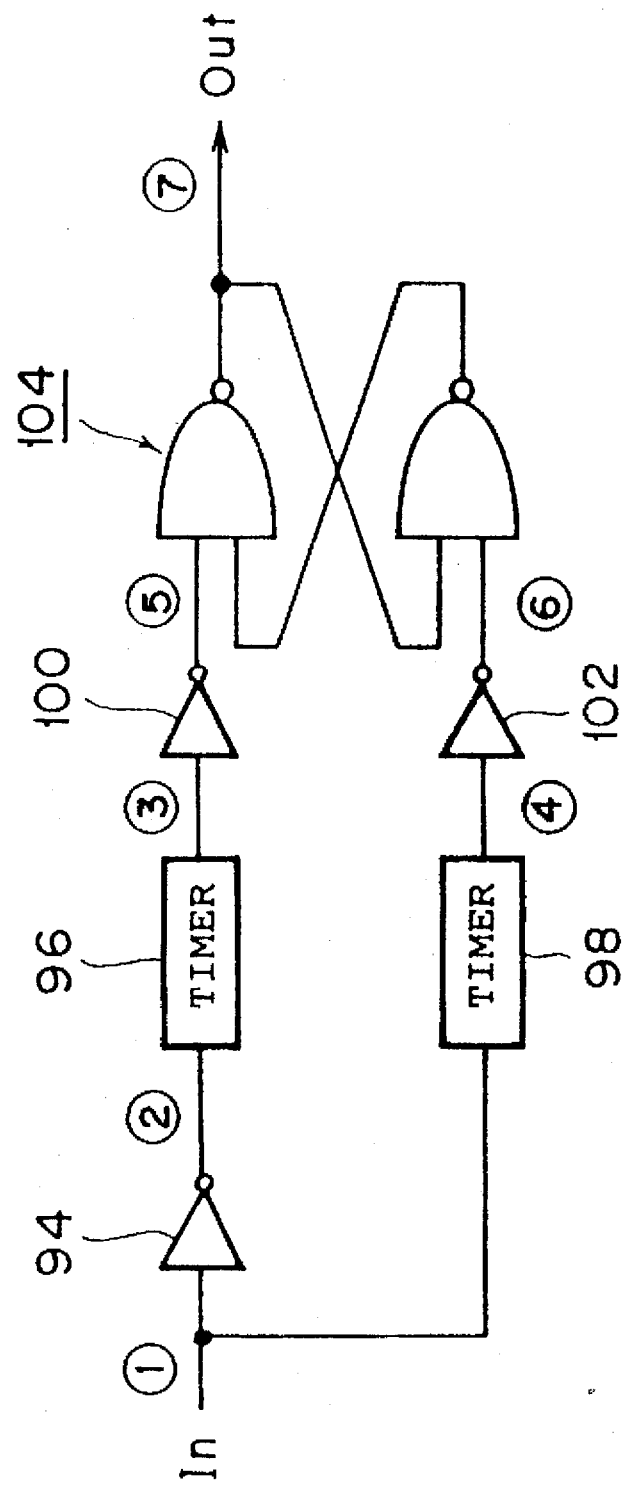
FIG. 13 is a block diagram of a delay circuit of FIG. 11.

FIG. 13 is a block diagram showing an example of a construction of the delay circuit 84. An input signal is split into two signals, and one of the two signals is supplied to a timer 96 by way of an invertor 94. The other is supplied directly to another timer 98. Output signals of the timers 96 and 98 pass invertors 100 and 102, respectively, and are supplied to a flip-flop 104. And, an output of the flip-flop 104 makes an output of the present delay circuit. The potential at the input port of the delay circuit is represented by (1); the potential at an input port of the timer 96 is represented by (2); the potentials at input ports of the invertors 100 and 102 are represented by (3) and (4), respectively; the potentials at the two input ports of the flip-flop 104 are represented by (5) and (6), respectively; and the potential at the output port of the delay circuit is represented by (7).

Figure 14:
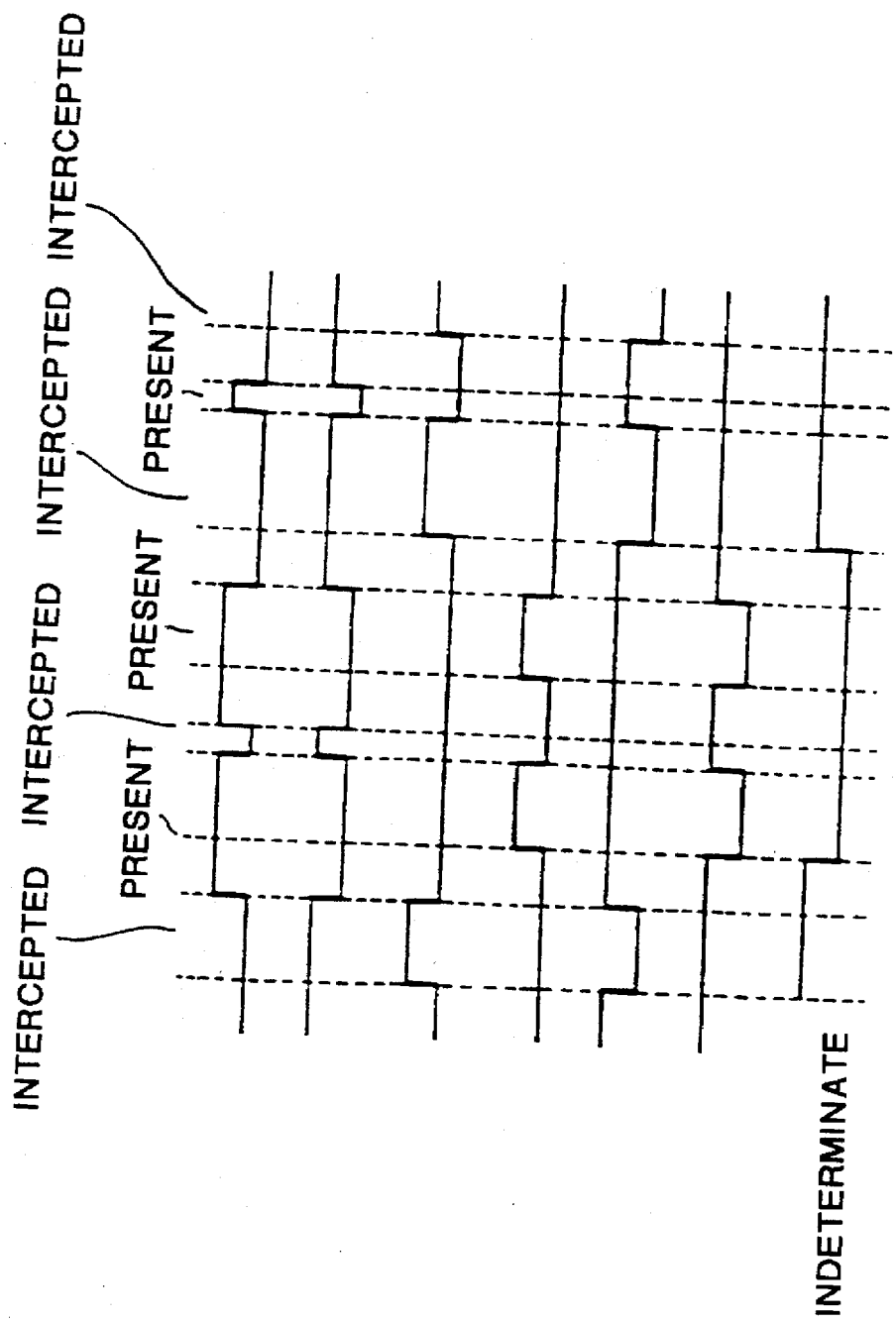
FIG. 14 is a time chart illustrating operation of the delay circuit of FIG. 13.

FIG. 14 is a time chart illustrating operation of the delay circuit shown in FIG. 13. The potentials (1) to (7) are shown in the form of binary information. When the optical input is intercepted, the potential (1) changes to "low", but when there is an optical input, the potential (1) exhibits a "high" level. The potential (7) corresponding to a signal supplied to the LD controller 22 in order to control pumping light exhibits a "high" level when the input is intercepted, but exhibits a "low" level when there is an input. It is to be noted that, in FIG. 13, the timer 96 is a protection timer when the input is intercepted, and the output thereof changes to a "high" level after it is detected for a fixed period of time that the input is intercepted. Meanwhile, the timer 98 is a protection timer when the input is restored, and outputs a "high" level after lapse of a fixed period of time after restoration is detected. By delaying it for the fixed period of time to determine that the input has been intercepted or the like using such a delay circuit as described above, when instantaneous interception of the input or instantaneous restoration of the input occurs, a malfunction based on such instantaneous interception or restoration can be prevented. It is to be noted that, as an IC for realizing such a delay circuit as described above, MB3771 by Fujitsu can be employed. With this IC, the delay time can be set arbitrarily by the capacitance of a capacitor to be connected externally.

Figure 15:
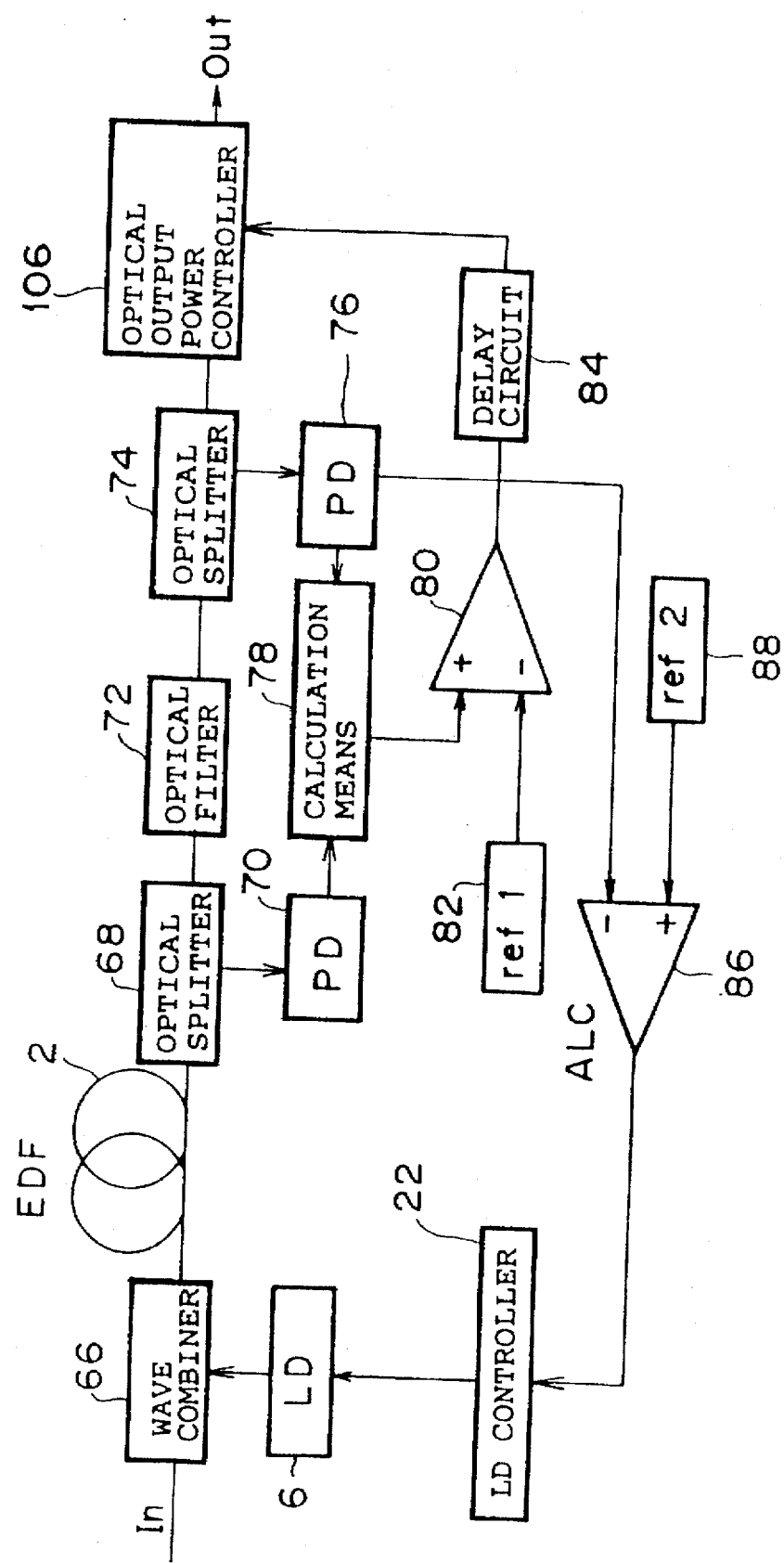
FIG. 15 is a block diagram showing a tenth embodiment of an EDFA to which the present invention is applied.

FIG. 15 is a block diagram showing a tenth embodiment of an EDFA to which the present invention is applied. The present EDFA is characterized in that, in contrast with the construction of FIG. 11, an optical output power controller 106 is provided on the output side of the optical splitter 74. For the optical output power controller 106, an optical shutter or an optical attenuator can be employed. And, an output signal of the comparator 80 which is outputted by way of the delay circuit 84 is supplied to the optical output power controller so that the optical output of the EDFA is turned on or off in response to interception information or restoration information. The optical output power controller 106 operates in response to input interception information so that the optical output of the EDFA is attenuated or intercepted, and operates in response to restoration information so that the optical output of the EDFA is restored. It is to be noted that, also in the present embodiment which employs the optical output power controller 106, the intensity of pumping light may be lowered in response to input interception information.

In this manner, according to another aspect of the present invention, there is provided an optical amplifier, comprising a doped fiber doped with a rare earth element and having a first end and a second end for guiding signal light from the first end toward the second end thereof, a pumping light source for outputting pumping light, optical coupling means optically connected to the doped fiber and the pumping light source for introducing the pumping light into the doped fiber, detection means for receiving light outputted from the second end of the doped fiber and detecting whether or not amplified signal light is included in the received light, and an optical output power controller for temporarily attenuating or intercepting amplified signal light to be outputted when it is detected by the detection means that amplified signal light is not included in the light outputted from the doped fiber. Accordingly, the optical output power controller described with reference to FIG. 15 can be applied also to the other embodiments.

Figure 16:
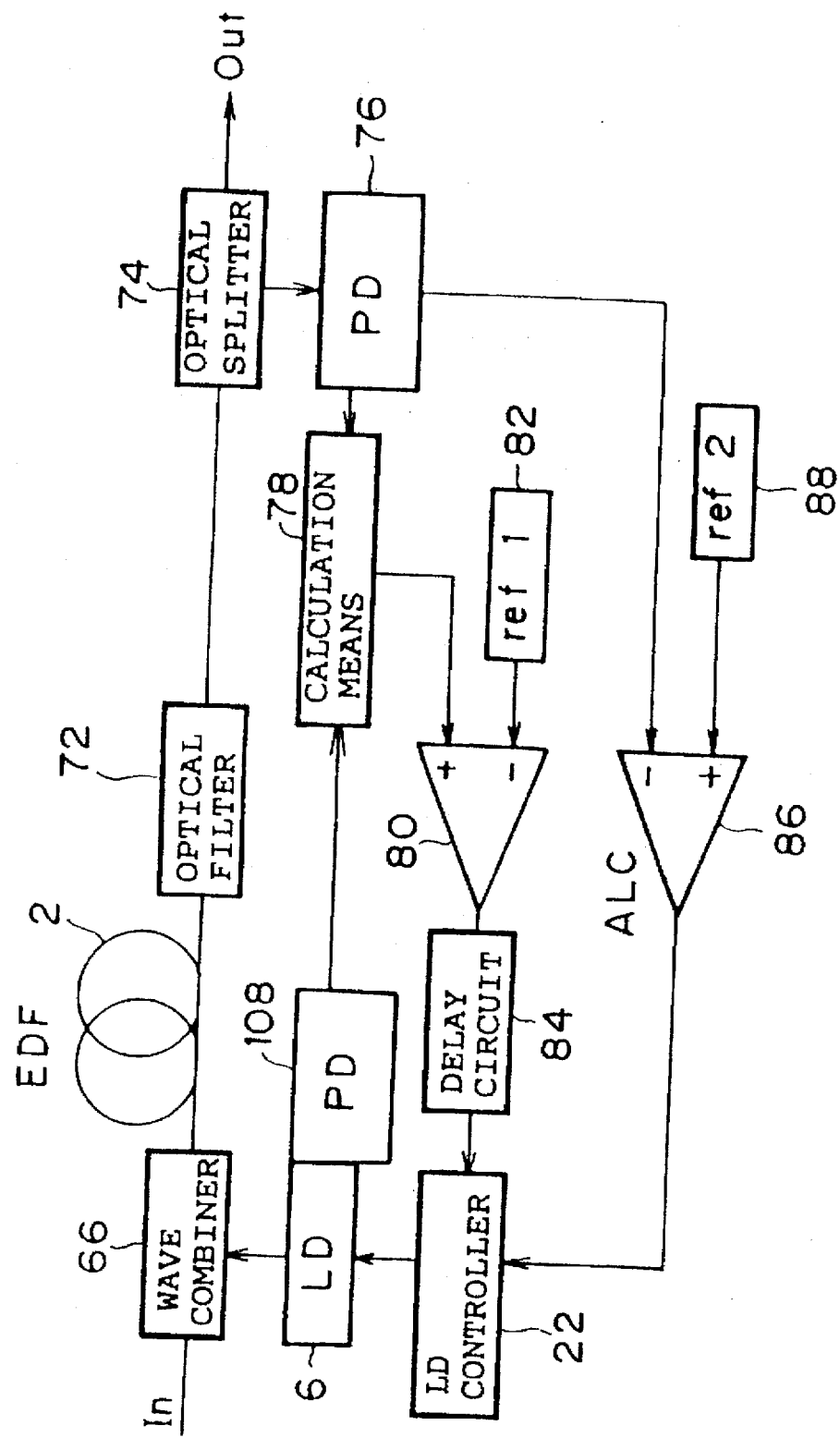
FIG. 16 is a block diagram showing an eleventh embodiment of an EDFA to which the present invention is applied.

FIG. 16 is a block diagram showing an eleventh embodiment of an EDFA to which the present invention is applied. The present EDFA is characterized in that a photo-detector 108 for detecting backward light of the laser diode 6 serving as a pumping light source is used and an output signal of the photo-detector 108 is supplied to the calculation means 78. In the EDFA of FIG. 11, light inputted to the photo-detector 70 is amplified signal light, ASE light and residual pumping light. Of them, the residual pumping light takes a most part, and accordingly, the photo-detector 70 in FIG. 11 is omitted whereas the intensity of pumping light is detected directly by the photo-detector 108 and this is inputted to the calculation means 78.

Figure 17:
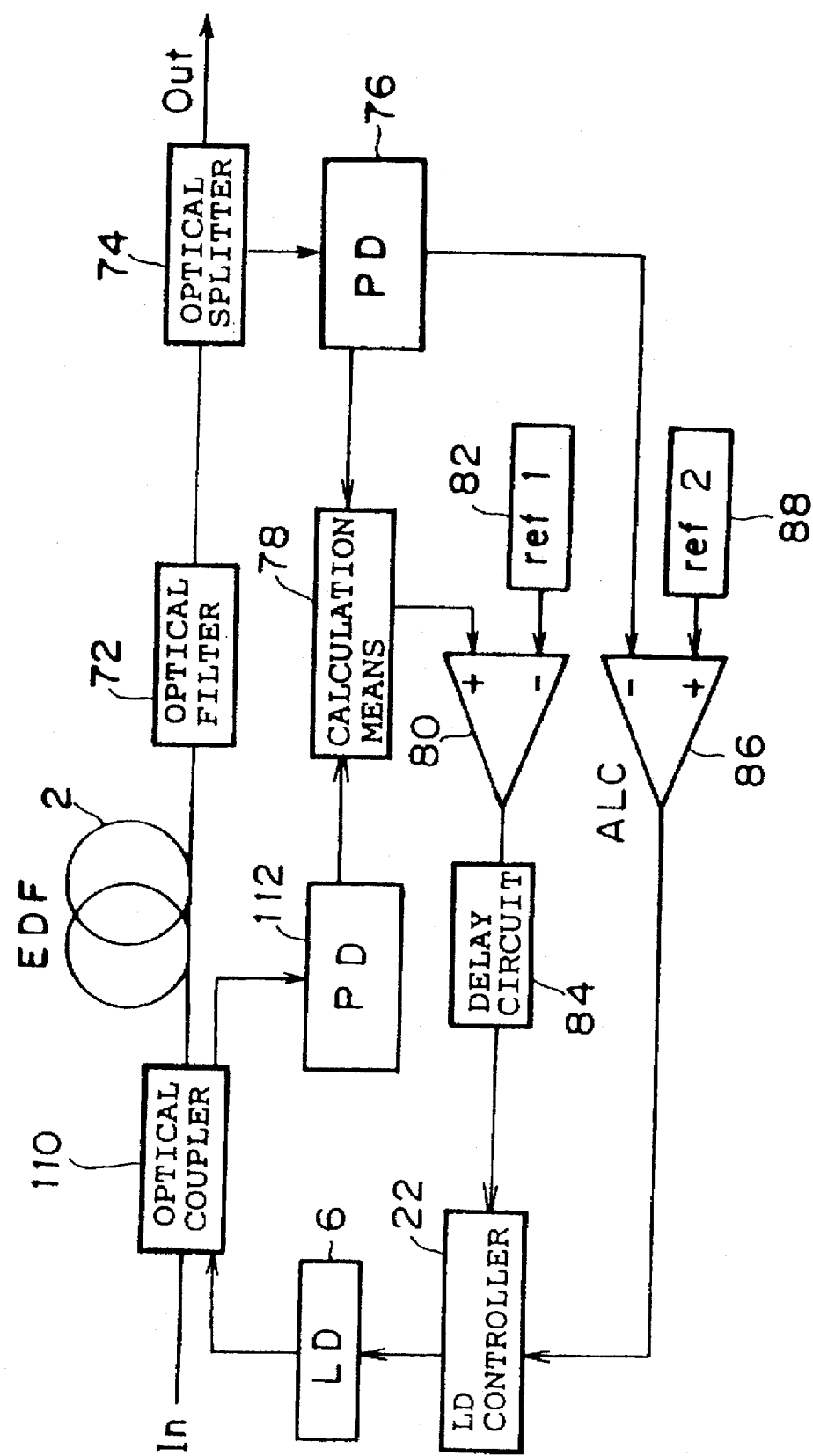
FIG. 17 is a block diagram showing a twelfth embodiment of an EDFA to which the present invention is applied.

FIG. 17 is a block diagram showing a twelfth embodiment of an EDFA to which the present invention is applied. In the present embodiment, in order to input to the calculation means 78 a signal on which the intensity of pumping light is reflected similarly as in the eleventh embodiment of FIG. 16, an optical coupler 110 and a photo-detector 112 are used. Signal light to be amplified and pumping light from the laser diode 6 are inputted to the optical coupler 110, in which they are added to each other, and they are outputted from two output ports of the optical coupler 110. One of the two optical outputs is supplied to the doped fiber 2 while the other output light is converted by photo-electric conversion by the photo-detector 112. Then, output signals of the photo-detector 112 and 76 are supplied to the calculation means 78.

Figure 18:
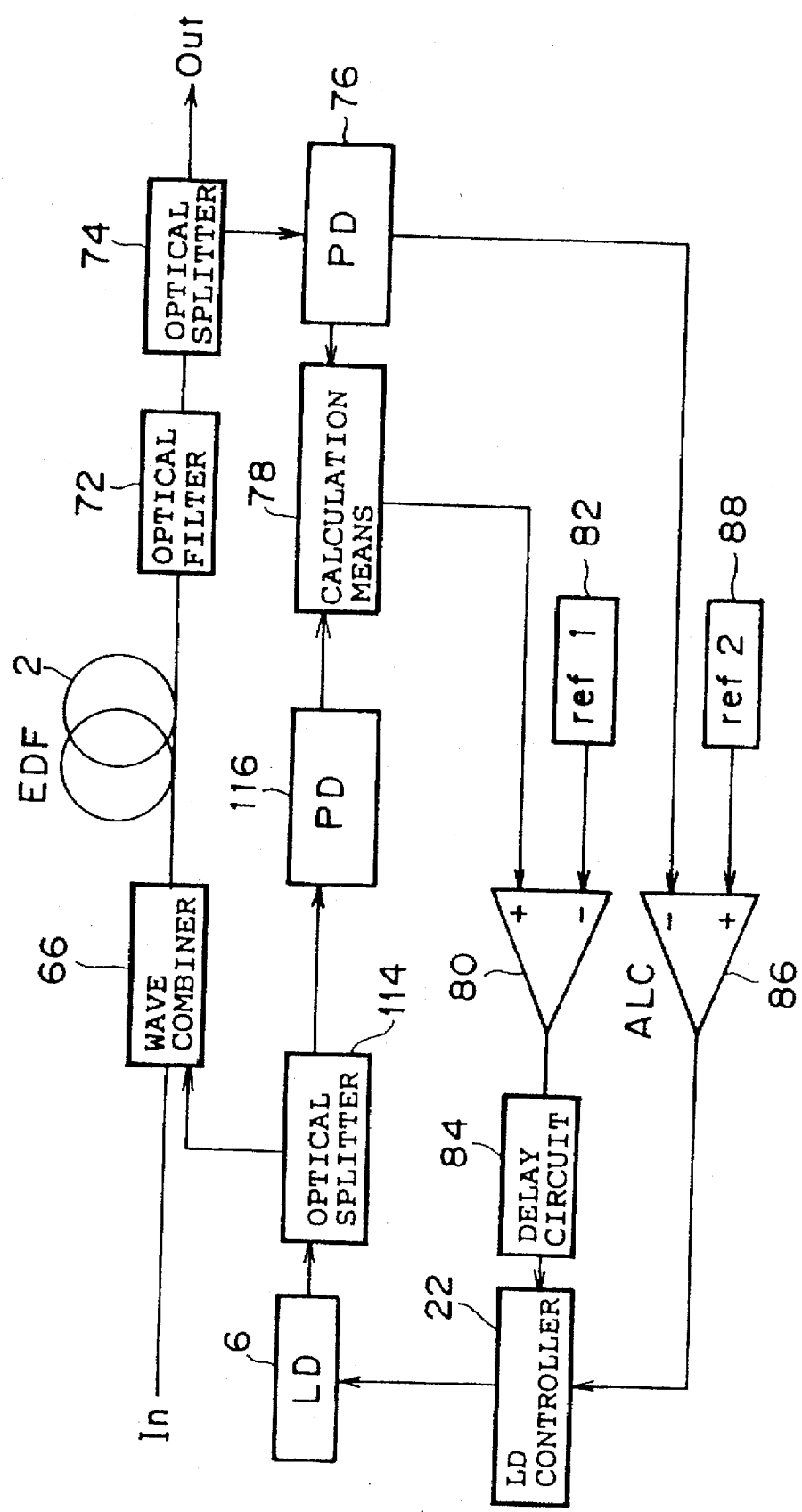
FIG. 18 is a block diagram showing a thirteenth embodiment of an EDFA to which the present invention is applied.

FIG. 18 is a block diagram showing a thirteenth embodiment of an EDFA to which the present invention is applied. In the present embodiment, pumping light from the laser diode 6 is split into two beams of light by an optical splitter 114, and one of the two split beams of light is supplied to the wave combiner 66 while the other split beam of light is converted by photo-electric conversion by a photo-detector 116. An output signal of the photo-detector 116 is supplied to the calculation means 78. Also by the present construction, since a signal on which the intensity of pumping light is reflected can be inputted to the calculation means 78, interception and restoration of inputting of signal light can be detected from an output of the calculation means 78.

Figure 19:
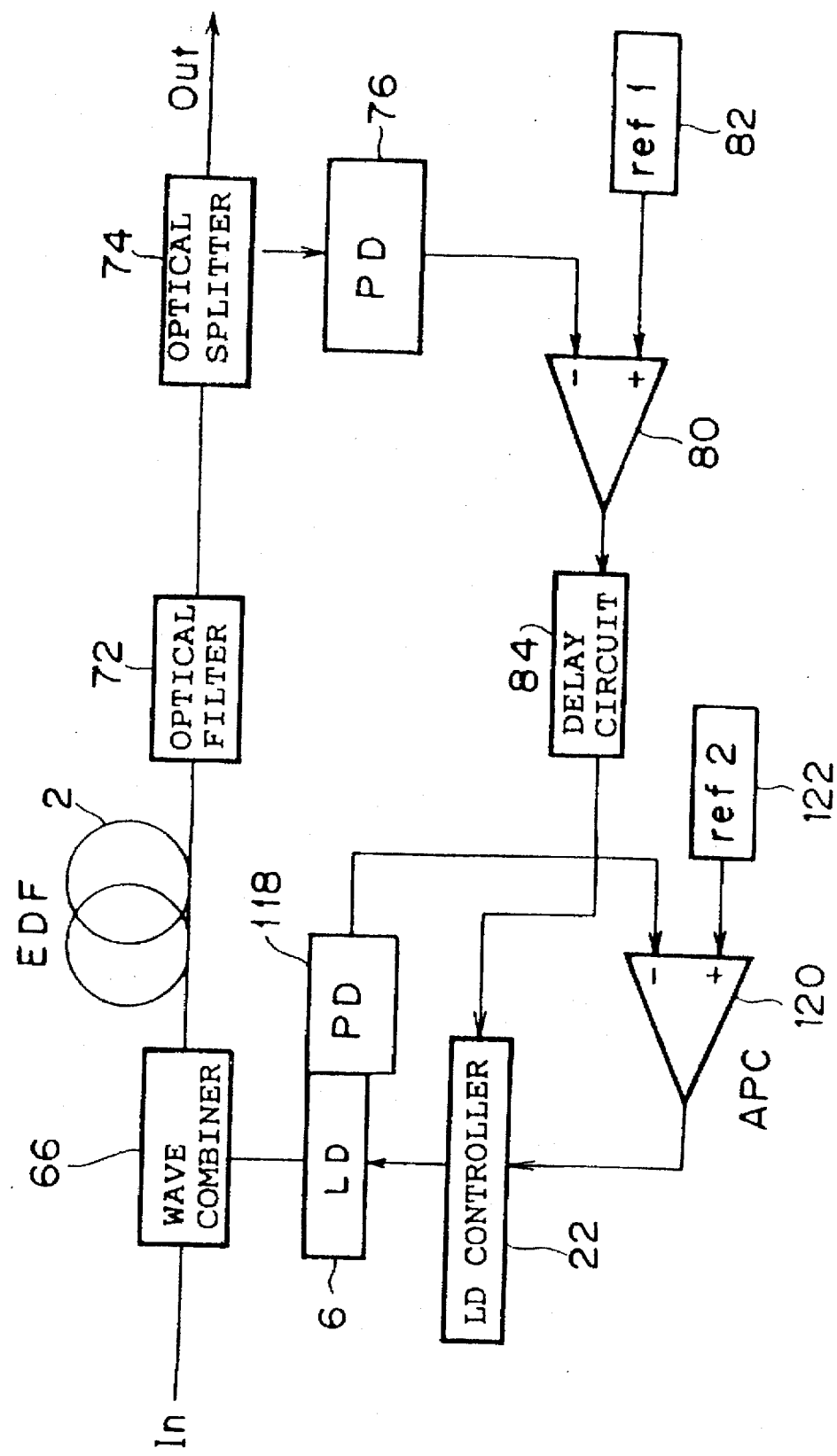
FIG. 19 is a block diagram showing a fourteenth embodiment of an EDFA to which the present invention is applied.

FIG. 19 is a block diagram showing a fourteenth embodiment of an EDFA to which the present invention is applied. The present EDFA is characterized in that APC (automatic power control) is performed for the laser diode 6 which serves as a pumping light source. Backward light of the laser diode 6 is converted by photo-electric conversion by a photo-detector 118, and an output signal of the photo-detector 118 is supplied to one of a pair of input ports of a comparator 120 for APC. A reference voltage from a reference voltage source 122 is supplied to the other input port of the comparator 120. And, by supplying an output signal of the comparator 120 to the LD controller 22, such control as to keep fixed the intensity of pumping light outputted from the laser diode 6 is performed.

If the intensity of pumping light is fixed, then the gain characteristic of the EDFA is determined by this, and the output power of the EDFA varies in accordance with and in a similar manner as the variation of the input power. Therefore, by monitoring amplified signal light, the condition of input signal light, that is, interception and restoration of input signal light, can be detected. In particular, one of split light beams of the optical splitter 74 is converted by photo-electric conversion by the photo-detector 76, and an output signal of the photo-detector 76 is inputted directly to the comparator 80. Consequently, input interception information and restoration information are reflected on the output signal of the comparator 80.

Figure 20:
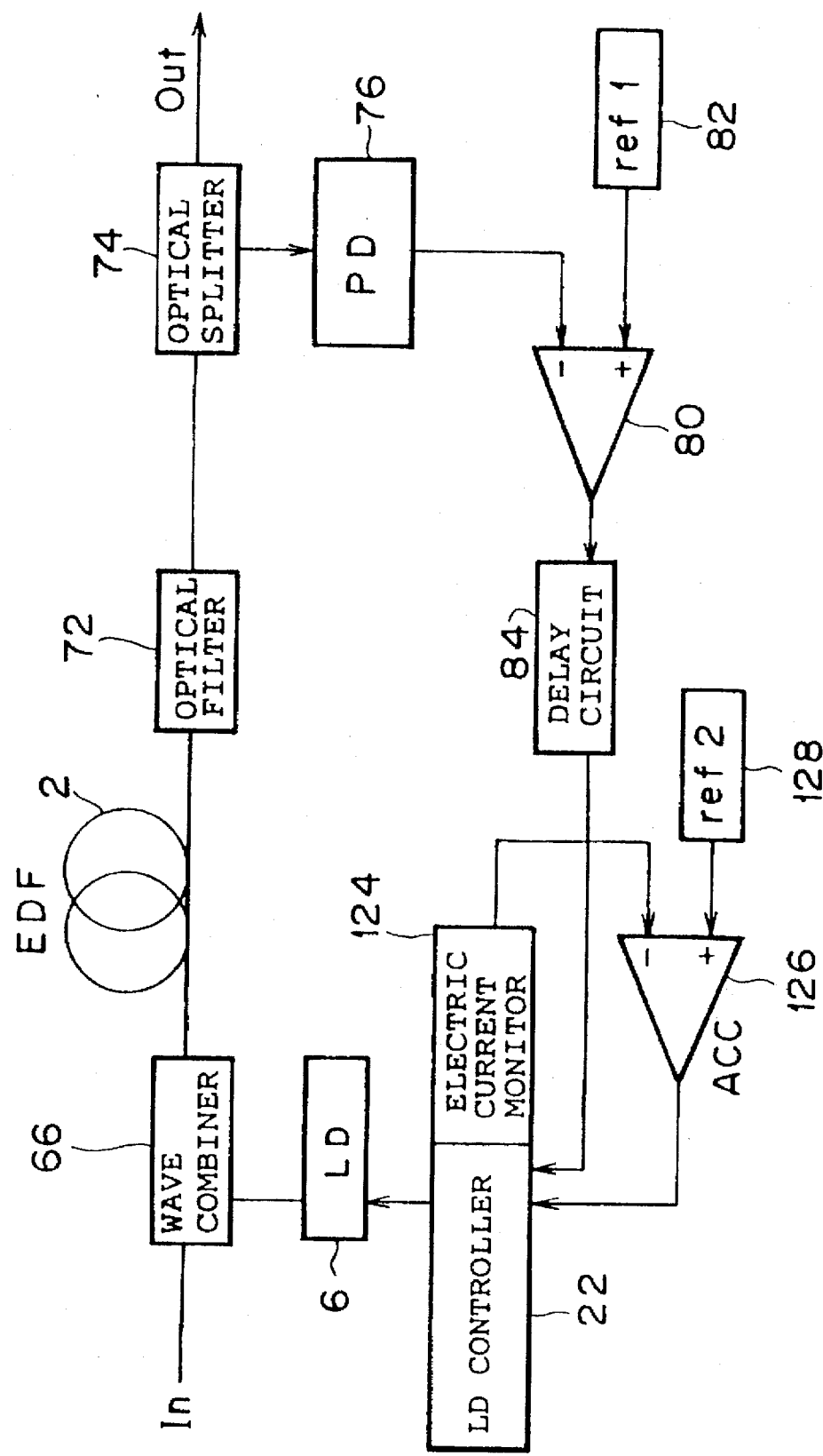
FIG. 20 is a block diagram showing a fifteenth embodiment of an EDFA to which the present invention is applied.

FIG. 20 is a block diagram showing a fifteenth embodiment of an EDFA to which the present invention is applied. The present EDFA is characterized in that ACC (automatic current control) is adopted in place of APC in the fourteenth embodiment of FIG. 19. Reference numeral 124 denotes an electric current monitor provided additionally to the LD controller 22, and the electric current monitor 124 monitors a driving electric current of the laser diode 6 serving as a pumping light source. An output signal of the electric current monitor 124 is supplied to one of a pair of input ports of a comparator 126, and a reference voltage from a reference voltage source 128 is supplied to the other input port. And, by supplying an output signal of the comparator 126 to the LD controller 22, the driving electric current (bias electric current) of the laser diode 6 is kept fixed. When ACC is proceeding with the laser diode 6, since the intensity of pumping light is kept substantially fixed, the output signal of the photo-detector 76 varies in accordance with the input signal power. Accordingly, also in the present embodiment, input interception information and restoration information can be reflected on an output signal of the comparator 80.

Embodiments of the present invention described subsequently relates to prevention of occurrence of an optical surge in an optical amplifier. When an EDFA is applied to an optical communication system, it is demanded to keep the output level fixed from the necessity of system designing. Therefore, ALC is adopted in an EDFA.

Figure 21:
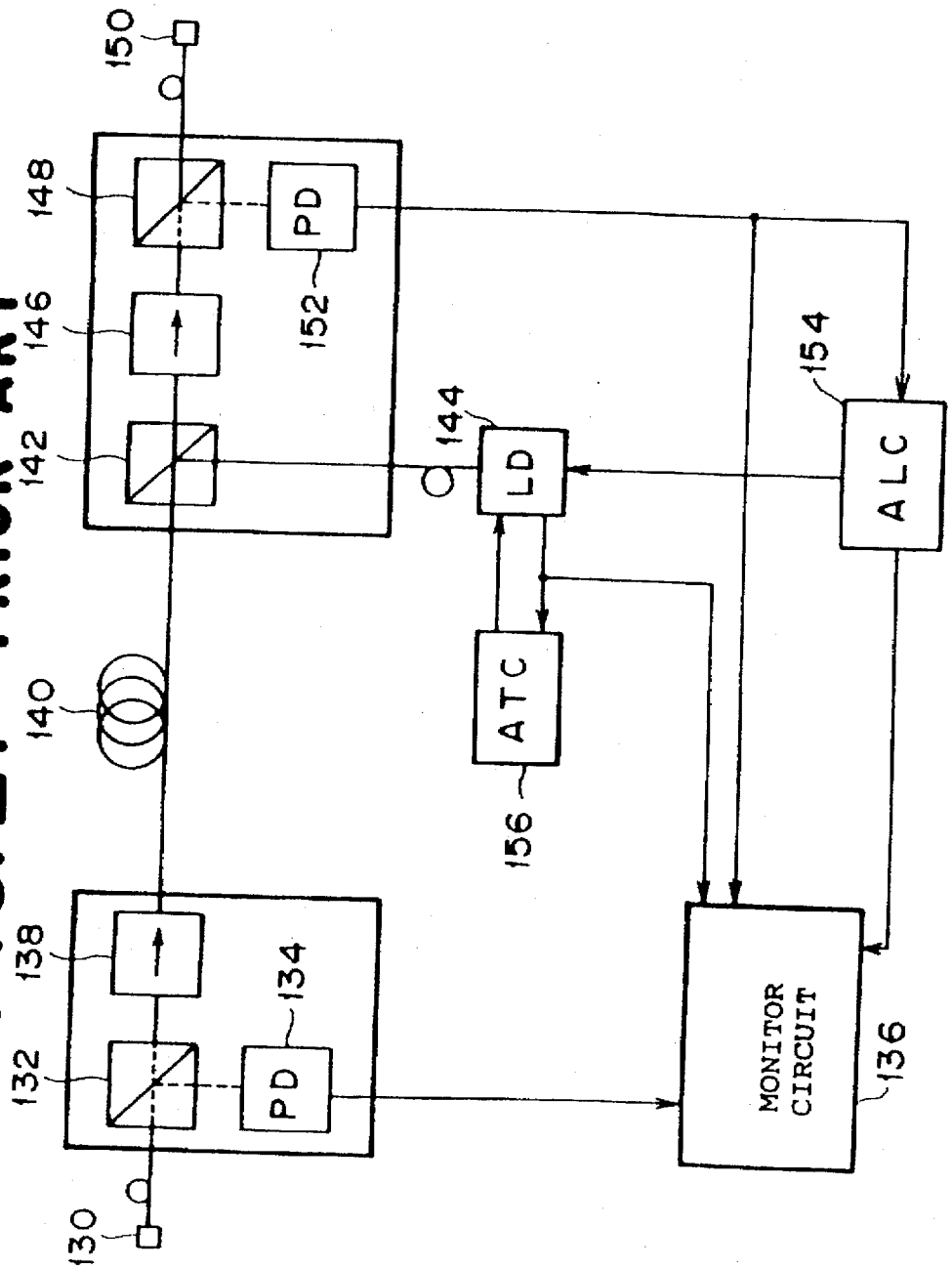
FIG. 21 is a block diagram showing a prior art EDFA.

FIG. 21 is a block diagram showing a prior art of EDFA to which ALC is applied. Signal light supplied by way of an input side optical connector 130 is split into two beams of light by an optical coupler 132, and one of the two split beams of light is converted by photo-electric conversion by a photo-detector 134. The other split beam of light passes through an optical isolator 138 and is supplied to a doped fiber 140. Also pumping light from a laser diode 144 is supplied to the doped fiber 140 by way of an optical coupler 142. Signal light amplified in the doped fiber 140 passes the optical coupler 142, an optical isolator 146 and an optical coupler 148 in this order and is sent out from an output side optical connector 150 into an optical transmission line not shown.

Part of the amplified signal is split by the optical coupler 148 and converted by photo-electric conversion by a photo-detector 152. An output signal of the photo-detector 152 is supplied to an ALC circuit 154. The ALC circuit 154 controls the intensity of pumping light so that the intensity of the amplified signal light may be fixed. The control of the intensity of pumping light is performed, for example, by way of a driving electric current to be supplied to the laser diode 144. An ATC (automatic temperature control) circuit 156 is provided additionally to the laser diode 144 so that the temperature of the laser diode 144 may be kept fixed. Data regarding the temperature of the laser diode 144, presence or absence of input signal light and so forth are supplied to a monitor circuit 136. In the EDFA which adopts ALC in this manner, there is a problem in that, when the power is thrown in (cold start) or when inputting of signal light is restored from an interception condition, an optical surge is likely to be produced.

Figure 22:
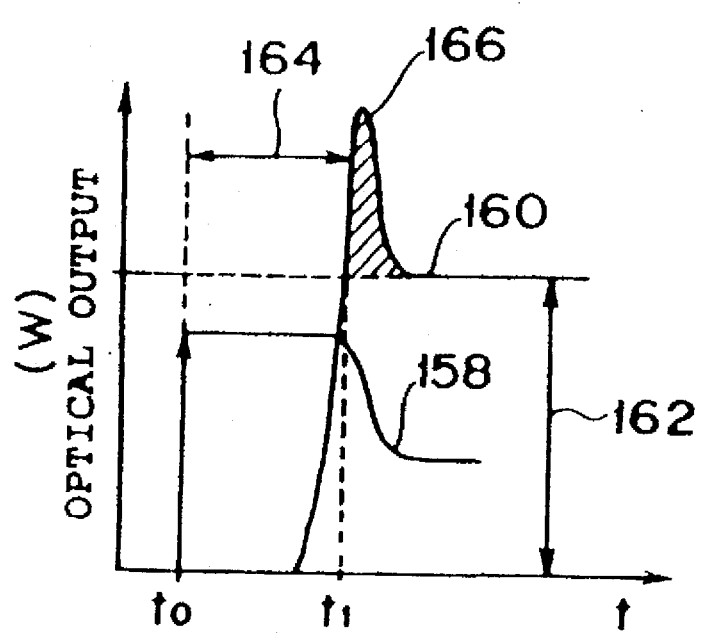
FIG. 22 is a diagram illustrating a transition response of an output level upon starting of the EDFA.

FIG. 22 is a diagram illustrating a transition response of the optical output level upon starting of the EDFA. Reference numeral 158 denotes a variation of the intensity of pumping light with respect to time, and reference numeral 160 denotes a variation of the output level of the EDFA with respect to time. The output level is stabilized to such a set level as denoted by reference numeral 162 by ALC. In the EDFA, such a delay of, for example, several ms as denoted by reference numeral 164 is provided until amplification of signal light is started after pumping light is introduced into a doped fiber, and accordingly, such an optical surge as denoted by reference numeral 166 is produced by a transient response. Conventionally, in order to prevent production of such an optical surge as described above, a countermeasure to retard a response of ALC has been taken. However, there is a subject to be solved in that, when the power is thrown in or when inputting of signal light is restored from an interception condition, the required time to reach an ordinary output level should be shortened.

Accordingly, it is an object of the present embodiment of the invention to provide an optical amplifier which can be started at a high speed without producing an optical surge.

According to the present embodiment of the invention, there is provided an optical amplifier, comprising a doped fiber doped with a rare earth element and having a first end and a second end for guiding signal light from the first end toward the second end thereof, a pumping light source for outputting pumping light, optical coupling means optically connected to the doped fiber and the pumping light source for introducing the pumping light into the doped fiber, means for detecting whether or not the signal light is inputted to the doped fiber, a photo-detector for detecting the intensity of light outputted from the second end of the doped fiber, automatic level control means for supplying a controlling electric current to the pumping light source so that the output level of the photo-detector may be fixed, idling means for supplying an idling electric current lower than the controlling electric current to the pumping light source, and masking means for controlling the automatic level control means and the idling means so that, when it is detected that the signal light is inputted to the doped fiber, the idling electric current is first supplied to the pumping light source and then the controlling electric current is supplied to the pumping light source.

In the following, details of the present embodiment will be described with reference to the drawings.

Figure 23:
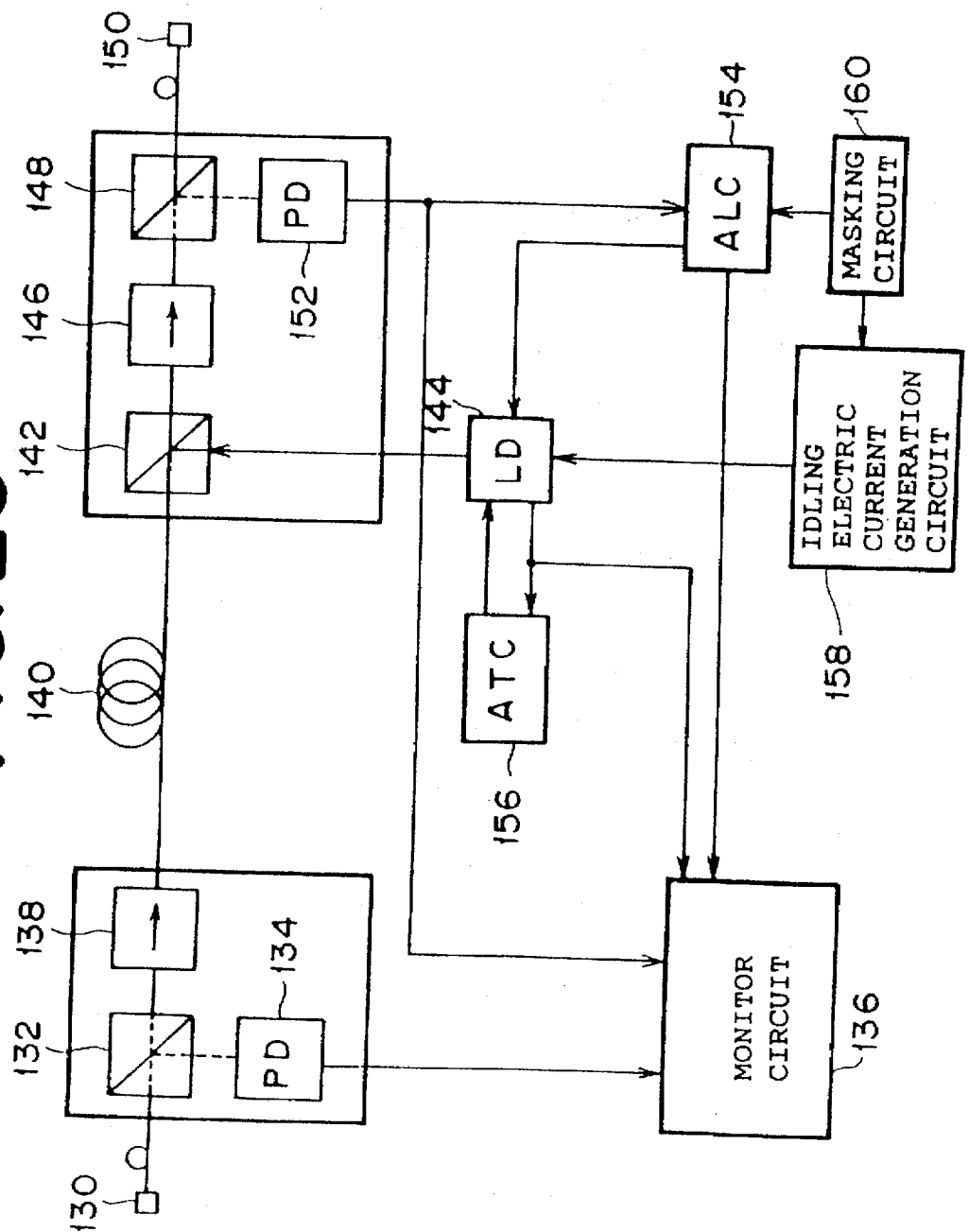
FIG. 23 is a block diagram showing a sixteenth embodiment of an EDFA to which the present invention is applied.

FIG. 23 is a block diagram showing a sixteenth embodiment of an EDFA to which the present invention is applied. The present EDFA is characterized in that, in contrast with the prior art construction of FIG. 21, it additionally includes an idling electric current generation circuit 158 and a masking circuit 160. The idling electric current has a value lower than a control electric current supplied from the ALC circuit 154 to the laser diode 144, and when the power source of the EDFA is thrown in or when inputting of signal light is restored from an interception condition, the laser diode 144 is driven at a comparatively low level by the idling electric current from the idling electric current generation circuit 158.

Figure 24:
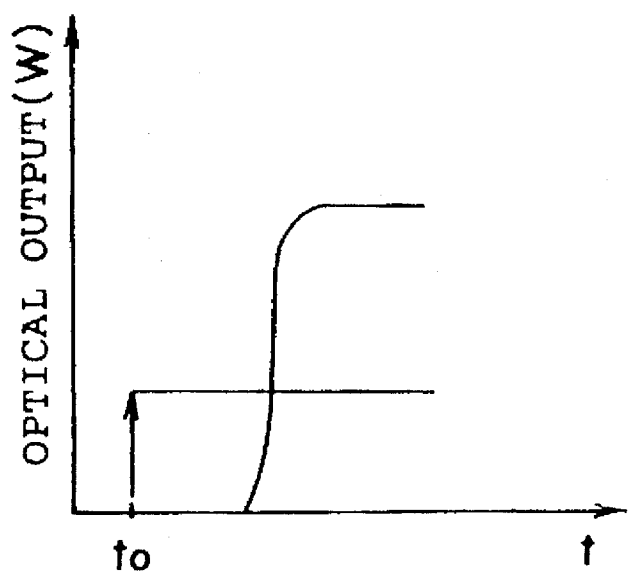
FIG. 24 is a diagram illustrating a transition response of an output level upon starting by an idling electric current.

A transition response of the output level then is shown in FIG. 24. In this instance, since the idling current is comparatively low, the delay of the doped fiber is dominant for a rising edge of an optical output. Accordingly, since there is no necessity of retarding the response of ALC as with the prior art construction of FIG. 21, high speed starting is possible. After starting with the idling electric current is completed, control of the intensity of pumping light is changed over to ALC. As a switching method, a method is listed wherein a control voltage for the idling electric current and another control voltage for ALC are inputted in the form of analog ORing to the control voltage of the driving circuit for the laser diode and one of the voltages is masked in individual operations. To this end, in the present embodiment, the masking circuit 160 is connected to the ALC circuit 154 and the idling electric current generation circuit 158 as shown in FIG. 23.

Figure 25:
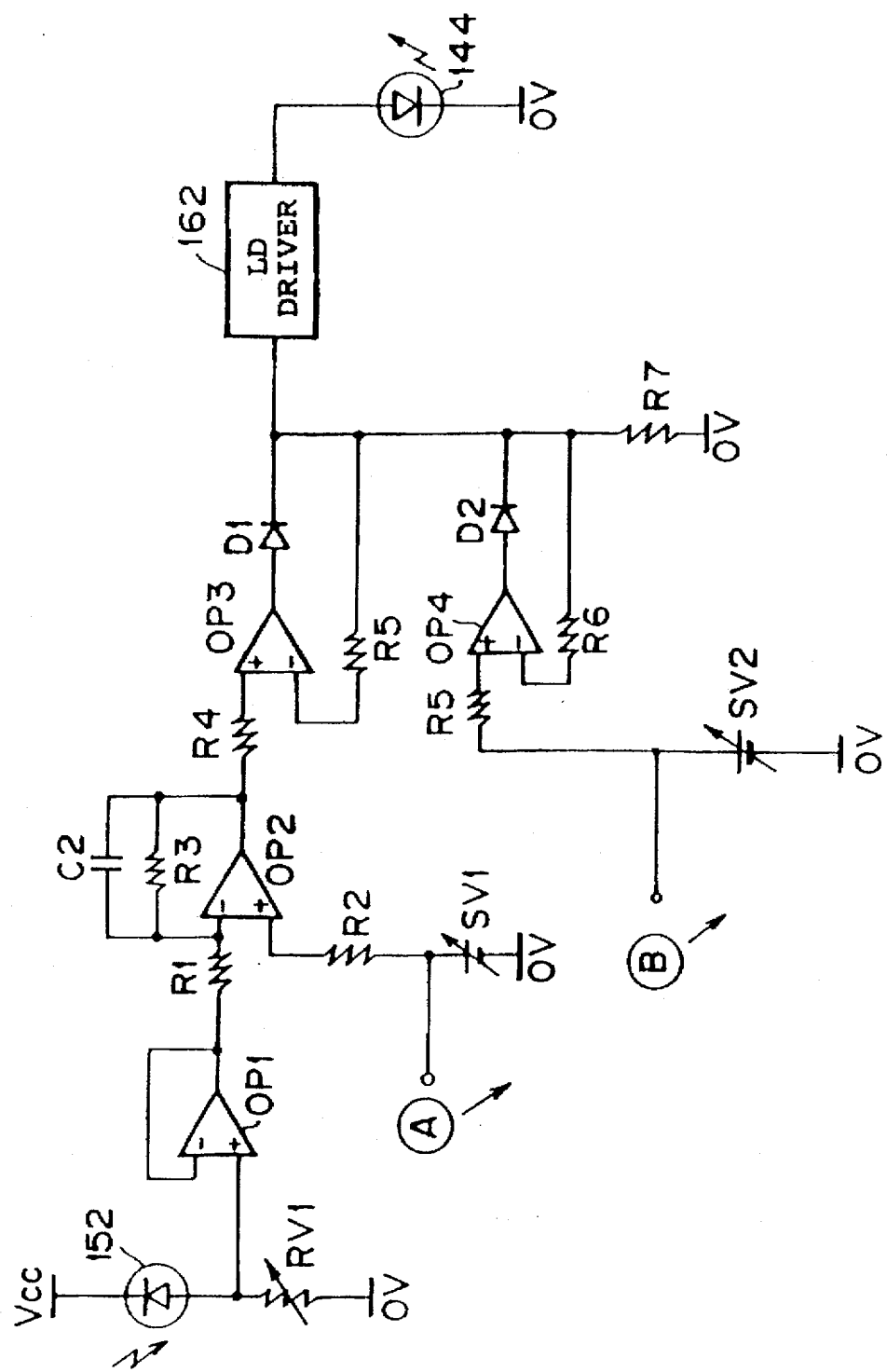
FIG. 25 is a circuit diagram (part 1) showing a concrete example around a masking circuit of FIG. 23.
Figure 26:
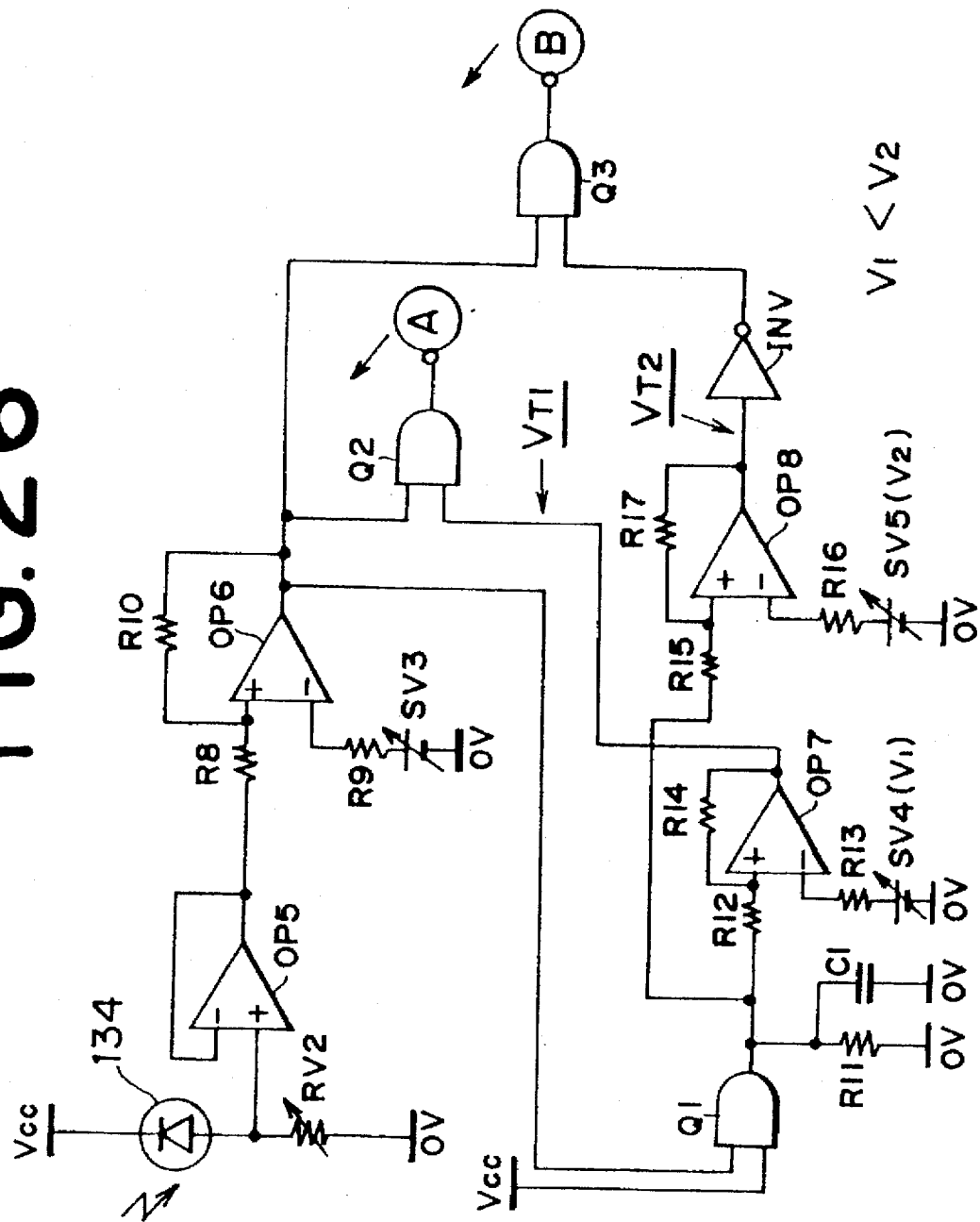
FIG. 26 is a circuit diagram (part 2) showing the concrete example around the masking circuit of FIG. 23.

FIGS. 25 and 26 are circuit diagrams showing a concrete example around the masking circuit 160 of FIG. 23. The cathode of the photo-detector (photo-diode) 152 for detecting the output power of the EDFA is connected to a power source line, and the anode of the photo-detector 152 is grounded by way of a variable resistor RV1. The anode of the photo-detector 152 is connected to the positive side input port of an operational amplifier OP1. The negative side input port of the operational amplifier OP1 is connected to the output port, and the output port is connected to the negative side input port of another operational amplifier OP2 by way of a resistor R1. The positive side input port of the operational amplifier OP2 is connected to a reference voltage source SV1 by way of another resistor R2. The reference voltage source SV1 is provided to determine a level for ALC.

A capacitor C2 and a resistor R3 are connected in parallel between the negative side input port and the output port of the operational amplifier OP2. The output port of the operational amplifier OP2 is connected to the positive side input port of an operational amplifier OP3 by way of a resistor R4. The output port of the operational amplifier OP3 is connected to the anode of a diode D1, and the cathode of the diode D1 is connected to the input port of an LD driver 162. The cathode of the diode D1 is connected also to the negative side input port of the operational amplifier OP3 by way of a resistor R5. The output port of the LD driver 162 is connected to the anode of the laser diode 144 which serves as a pumping light source, and the cathode of the laser diode 144 is grounded. The positive side input port of an operational amplifier OP4 is connected to a reference voltage source SV2 by way of the resistor R5. The reference voltage source SV2 is provided to determine a value of an idling electric current. The output port of the operational amplifier OP4 is connected to the input port of the LD driver 162 by way of a diode D2. The cathode of the diode D2 is connected to the negative side input port of the operational amplifier OP4 by way of a resistor R6. The input port of the LD driver 162 is grounded by way of a resistor R7.

The cathode of the photo-detector (photo-diode) 134 for detecting an optical input power of the EDFA is connected to the power source line, and the anode is grounded by way of a variable resistor RV2. The anode of the photo-detector 134 is connected to the positive side input port of an operational amplifier OP5, and the negative side input port is connected to the output port. The output port of the operational amplifier OP5 is connected to the positive side input port of an operational amplifier OP6 by way of a resistor R8. The negative side output port of the operational amplifier OP5 is connected to a reference voltage source SV3 by way of a resistor R9. The reference voltage source SV3 determines a threshold level to be used to detect that inputting of signal light has been intercepted.

The positive side input port of the operational amplifier OP6 is connected to the output port by way of a resistor R10. The output port of the operational amplifier OP6 is connected to one of pairs of input ports of three AND elements Q1, Q2 and Q3. The other input port of the AND element Q1 is connected to the power source line. The output port of the AND element Q1 is grounded by way of a resistor R11 and a capacitor C1 connected in parallel. The resistor R11 and the capacitor C1 constitute a time constant circuit. The output port of the AND element Q1 is connected to the positive side input port of an operational amplifier OP7 by way of a resistor R12. The negative side input port of the operational amplifier OP7 is connected to a reference voltage source SV4 by way of a resistor R13. The positive side input port of the operational amplifier OP7 is connected to the output port, and the output port is connected to the other input port of the AND element Q2.

The output port of the AND element Q1 is connected to the positive side input port of an operational amplifier OP8 by way of a resistor R15, and the positive side input port is connected to the output port by way of a resistor R17. The negative side input port of the operational amplifier OP8 is connected to a reference voltage source SV5 by way of a resistor R16. Where the voltage value of the reference voltage source SV4 is represented by V1 and the voltage value of the reference voltage source SV5 is represented by V2, they are set to V1<V2. The output port of the operational amplifier OP8 is connected to the input port of an invertor INV, and the output port of the invertor INV is connected to the other input port of the AND element Q3. The output port of the AND element Q2 is connected to a junction between the reference voltage source SV1 and the resistor R2, and the AND element Q3 is connected to a junction between the reference voltage source SV2 and the resistor R5.

Figure 27:
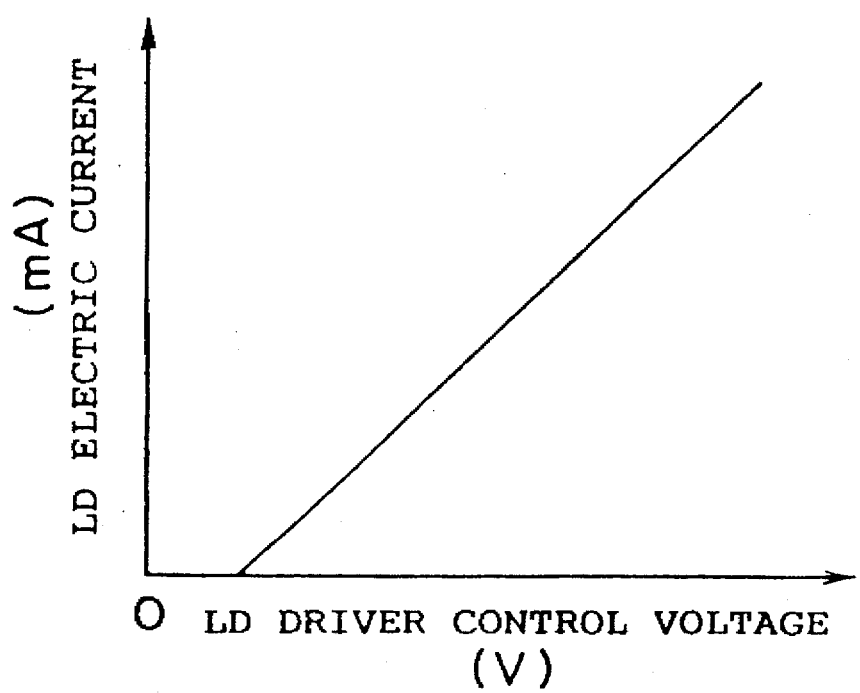
FIG. 27 is a diagram showing an example of a relationship between an LD electric current and an LD driver controller voltage.

FIG. 27 shows an example of the relationship between the LD electric current and the LD driver control voltage. The LD electric current is an electric current which flows through the laser diode 144 serving as a pumping light source, and the LD driver control voltage is a voltage signal to be supplied to the input port of the LD driver 162. The relationship between the variation of the LD electric current and the variation of the LD driver control voltage is, for example, linear as seen in FIG. 27.

FIG. 28 is a time chart illustrating changing over from idling to ALC in the embodiment of FIGS. 25 and 26. In the present embodiment, supply of an idling electric current is automatically stopped after lapse of a predetermined time after it is detected that signal light is inputted to the doped fiber based on a time constant provided by the resistor R11 and the capacitor C1. Details are such as follows.

Now, it is assumed that the power source for the EDFA is thrown in at time $T_0$ while an optical input is present, and also assumed that an optical input which has been intercepted once while the power source is available is restored at time $T_1$. Whether or not there is an optical input at time $T_0$ is detected by comparison of the input level to the positive side input port of the operational amplifier OP6 (refer to FIG. 26) with the reference voltage source SV3, and when there is an optical input, the input level of one of the inputs to the AND element Q2 exhibits a "high" level. When the output level of the operational amplifier OP6 changes to a "high" level, also the output level of the AND element Q1 changes to a "high" level, and simultaneously, the time constant circuit constituted from the resistor R11 and the capacitor C1 is started as a timer. Until after a preset time of the timer elapses, the output level ($V_{T1}$) of the operational amplifier OP7 is maintained at a "low" level, and also the output level of the AND element Q2 remains at a "low" level. Accordingly, in this instance, the ALC reference voltage to be supplied to the positive side input port of the operational amplifier OP2 becomes equal to zero, and consequently, the ALC control voltage to be supplied from the operational amplifier OP3 to the LD driver 162 is masked.

On the other hand, since the output level ($V_{T2}$) of the operational amplifier OP8 remains at a "low" level until after the preset time of the timer elapses, the output level of the invertor INV is at a "high" level and the input levels to the AND element Q3 are both at a "high" level. Accordingly, an idling electric current control voltage supplied from the reference voltage source SV2 is supplied to the LD driver 162 then, and consequently, the optical output of the EDFA rises without being accompanied by an optical surge. Since the value V1 of the reference voltage source SV4 (refer to FIG. 26) is lower than the value $V_2$ of the reference voltage source SV5, the preset time of the timer (first timer) based on the reference voltage source SV4 is shorter than the preset time of the timer (second timer) based on the reference voltage source SV5. Accordingly, the output level ($V_{T1}$) of the operational amplifier OP7 rises first, and thereupon, masking of the ALC control voltage is canceled. Thereafter, the output level ($V_{T2}$) of the operational amplifier OP8 rises, and thereupon, the idling control voltage is masked. Accordingly, after the output level VT2 rises, ALC is performed so that the optical output of the EDFA may be fixed.

In this manner, according to the present embodiment, high speed starting of the EDFA is possible without producing an optical surge. It is to be noted that, since the masking operation upon restoration of an optical input after time $T_1$ is similar to that described above, description thereof is omitted. While, in the foregoing description, the idling electric current control voltage is fixed within the idling period until the output level (VT2) of the operational amplifier OP8 rises, even if the optical input level fluctuates within a certain range, feed forward control may be performed in order to stabilize the optical output level upon idling.

Figure 29:
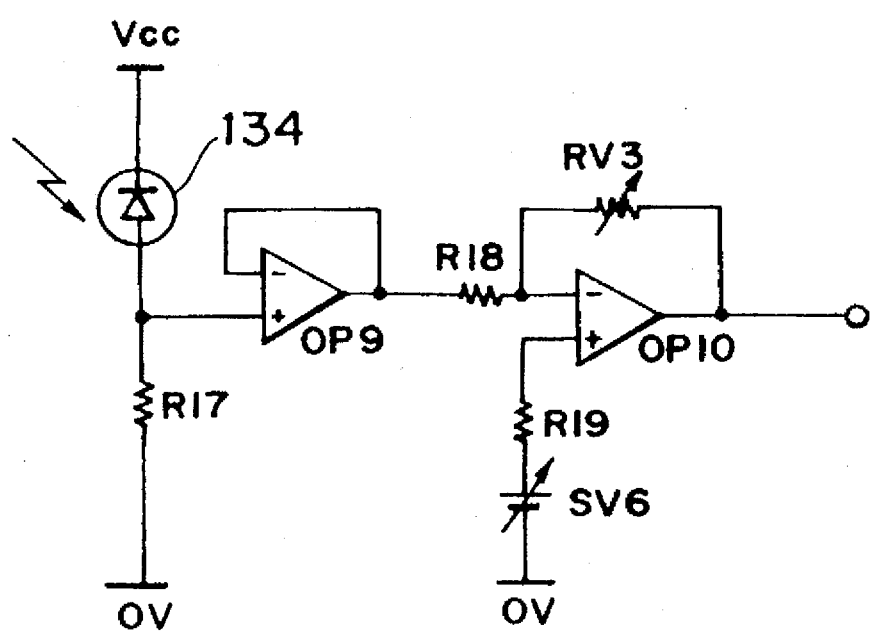
FIG. 29 is a circuit diagram of an output stabilization circuit.

FIG. 29 is a circuit diagram of an output stabilization circuit for this object. The cathode of the photo-detector 134 for detecting the optical input level is connected to the power source line, and the anode is grounded by way of the resistor R17. The anode of the photo-detector 134 is connected to the positive side input port of an operational amplifier OP9. The negative side input port of the operational amplifier OP9 is connected to the output port. The output port of the operational amplifier OP9 is connected to the negative side input port of an operational amplifier OP10 by way of a resistor R18. The negative side input port of the operational amplifier OP10 is connected to the output port by way of a variable resistor RV3. The positive side input port of the operational amplifier OP10 is connected to a reference voltage source SV6 by way of a resistor R19. The output of the output stabilization circuit, that is, the output voltage of the operational amplifier OP10, is set in place of the reference voltage source SV2 of FIG. 25.

Figure 30:
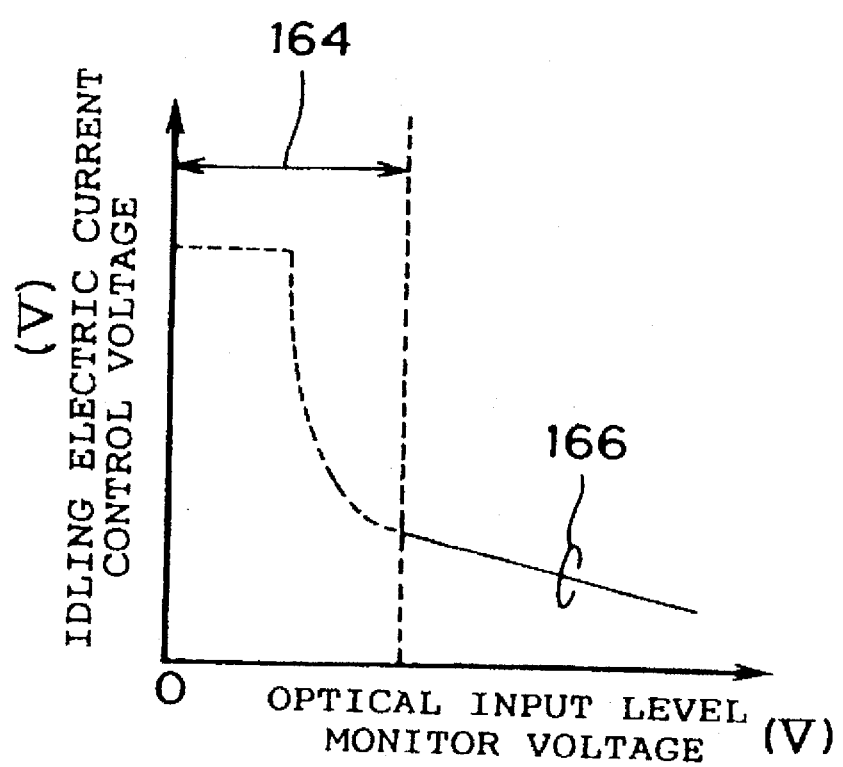
FIG. 30 is a diagram illustrating operation of the output stabilization circuit of FIG. 29.

FIG. 30 is a view illustrating operation of the output stabilization circuit of FIG. 29. The axis of ordinate indicates the idling electric current control voltage supplied from the output stabilization circuit, and the axis of abscissa indicates the monitor voltage of the optical input level. Denoted by reference numeral 164 is a region in which the optical input is intercepted, and if the level of the optical input exceeds the region, the idling electric current control voltage decreases as the optical input level increases as represented by reference numeral 166. Consequently, the optical output of the EDFA upon idling can be stabilized. Further, while, in the foregoing description, the timing of changing over from idling to ALC is set based on the preset time of the timer by the time constant circuit, changing over from idling to ALC may be performed by detecting that the optical output level of the EDFA has exceeded a predetermined value.

Figure 31:
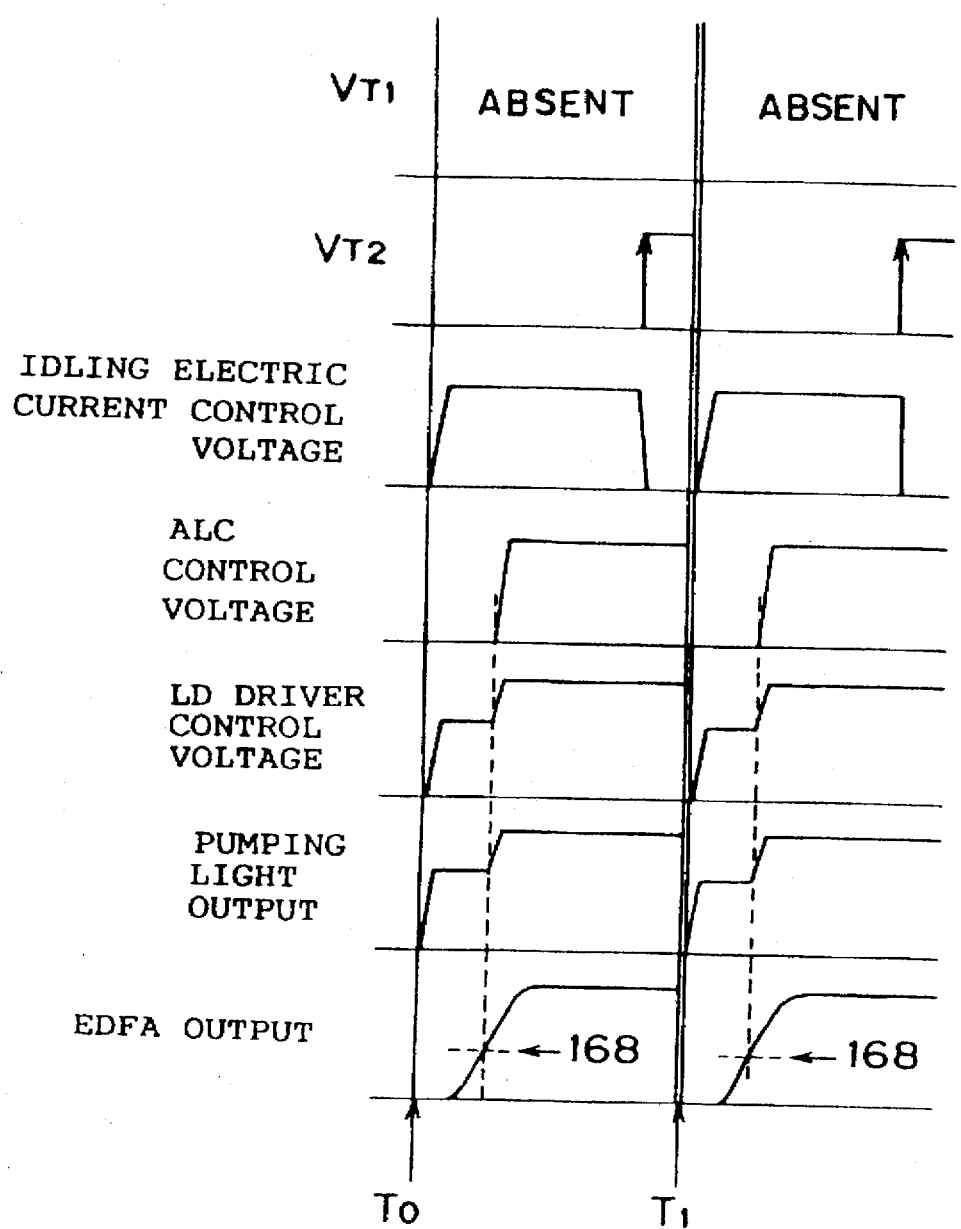
FIG. 31 is a timing chart upon changing over from idling to ALC based on detection of an optical output level.

A timing chart of changing over from idling to ALC based on detection of the optical output level is shown in FIG. 31. In this instance, the voltage signal VT1 for canceling masking of the ALC control voltage is unnecessary. In the present embodiment, until the optical output level of the EDFA exceeds a predetermined value denoted by reference numeral 168, the ALC control voltage remains masked, and when the predetermined value is exceeded, masking of the ALC control voltage is canceled. Whether or not the output level of the EDFA has exceeded the predetermined value can be detected using an output signal of the photo-diode 152.

Figure 32:
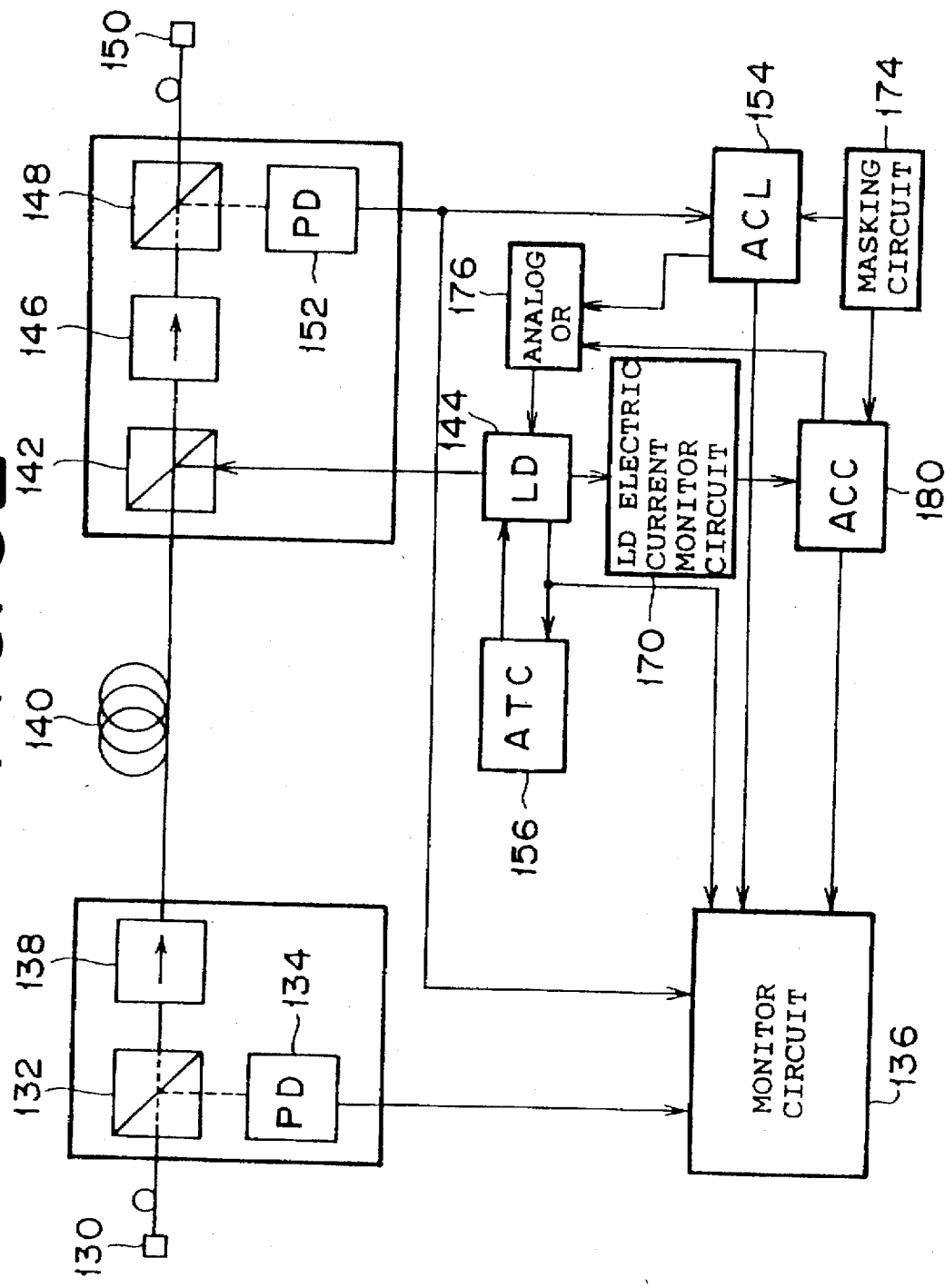
FIG. 32 is a block diagram showing a seventeenth embodiment of an EDFA to which the present invention is applied.

FIG. 32 is a block diagram showing a seventeenth embodiment of an EDFA to which the present invention is applied. The present EDFA includes an ACC (automatic electric current control) loop for the laser diode 144 for outputting pumping light. The driving current (bias current) of the laser diode 144 is detected by an LD electric current monitor circuit 170, and such detection signal is supplied to an ACC circuit 172. The ACC circuit 172 controls so that the driving current of the laser diode 144 may be fixed upon idling. Also the present embodiment is provided with the ALC circuit 154 for keeping fixed the optical output level of the EDFA, and a control signal from that one of the ACC circuit 172 and the ALC circuit 154 which is not masked by a masking circuit 174 is supplied to a driver for the laser diode 144 by way of an analog OR circuit 176.

Figure 33:
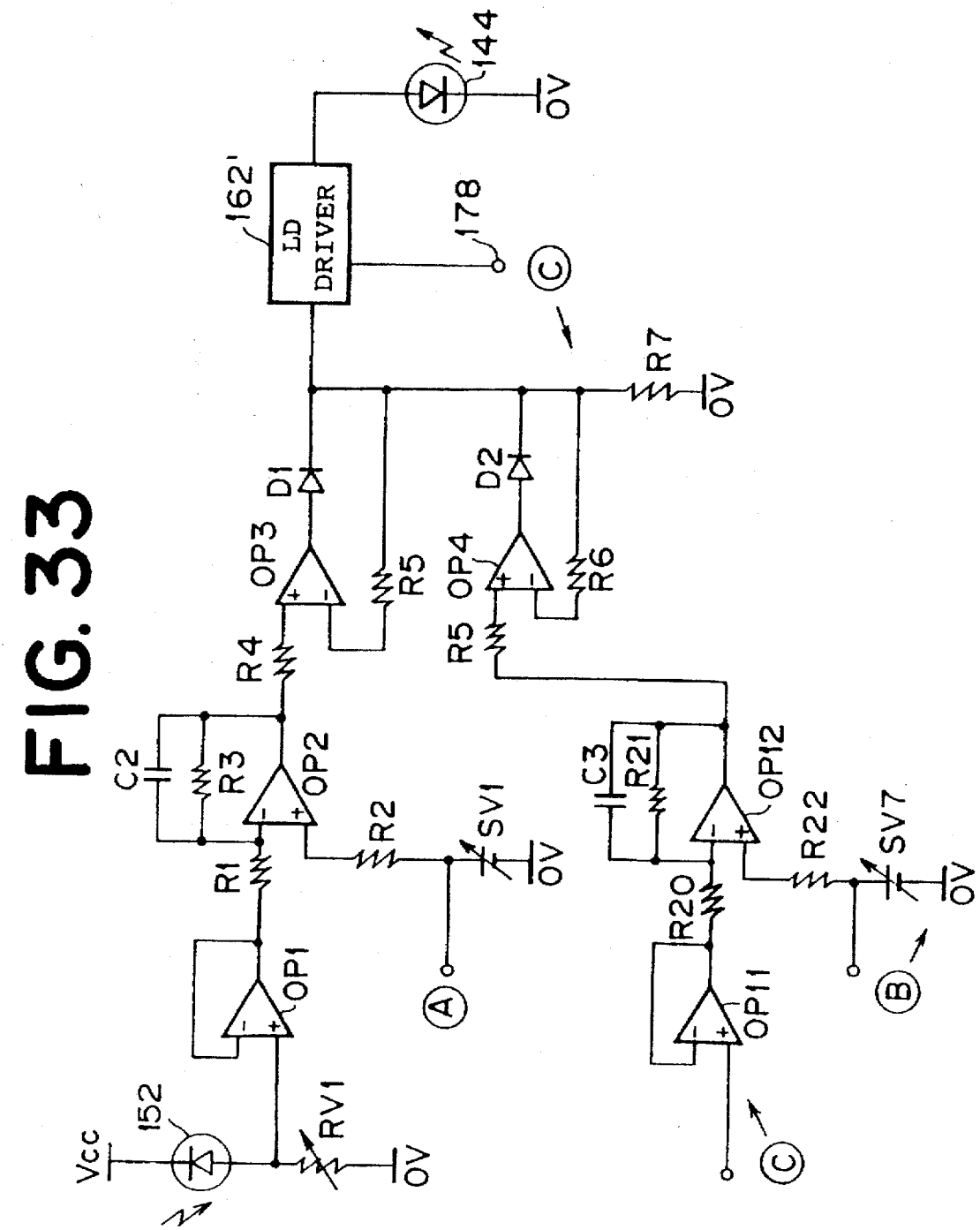
FIG. 33 is a circuit diagram (part 1) showing a concrete example around a masking circuit of FIG. 32.
Figure 34:
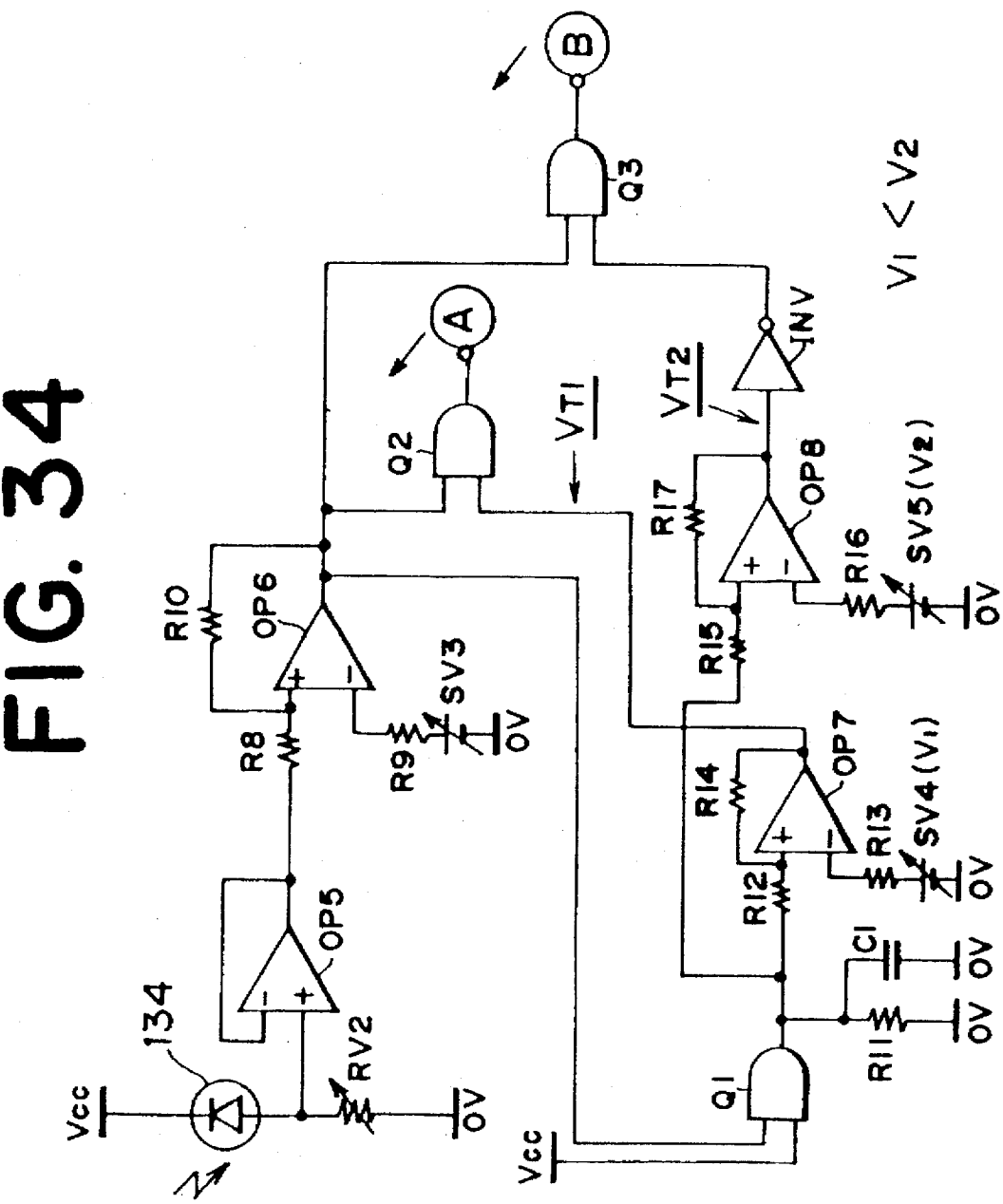
FIG. 34 is a circuit diagram (part 2) showing the concrete example around the masking circuit of FIG. 32.

FIGS. 33 and 34 are circuit diagrams showing a concrete example around the masking circuit of FIG. 32. A LD driver 162' has a terminal 178 for outputting an LD electric current monitor voltage. The LD electric current monitor voltage is supplied to the positive side input port of an operational amplifier OP11, and the negative side input port is connected to the output port. The output port of the operational amplifier OP11 is connected to the negative side input port of an operational amplifier OP12 by way of a resistor R20. A capacitor C3 and a resistor R21 are connected in parallel between the negative side input port and the output port of the operational amplifier OP12. The output port of the operational amplifier OP12 is connected to the positive side input port of the operational amplifier OP4 by way of the resistor R5. The positive side input port of the operational amplifier OP12 is connected to a reference voltage source SV7 by way of a resistor R22.

The reference voltage source SV7 is provided to generate a reference voltage for ACC, and a junction between the reference voltage source SV7 and the resistor R22 is connected to the output port of the AND element Q3 of FIG. 34. Elements other than those described here are substantially same as those of the construction of FIGS. 25 and 26. The present embodiment is different from the embodiment of FIGS. 25 and 26 only in that an idling electric current is obtained by ACC, and since other operations can be recognized readily referring to a time chart of FIG. 28, description of them is omitted herein.

Figure 35:
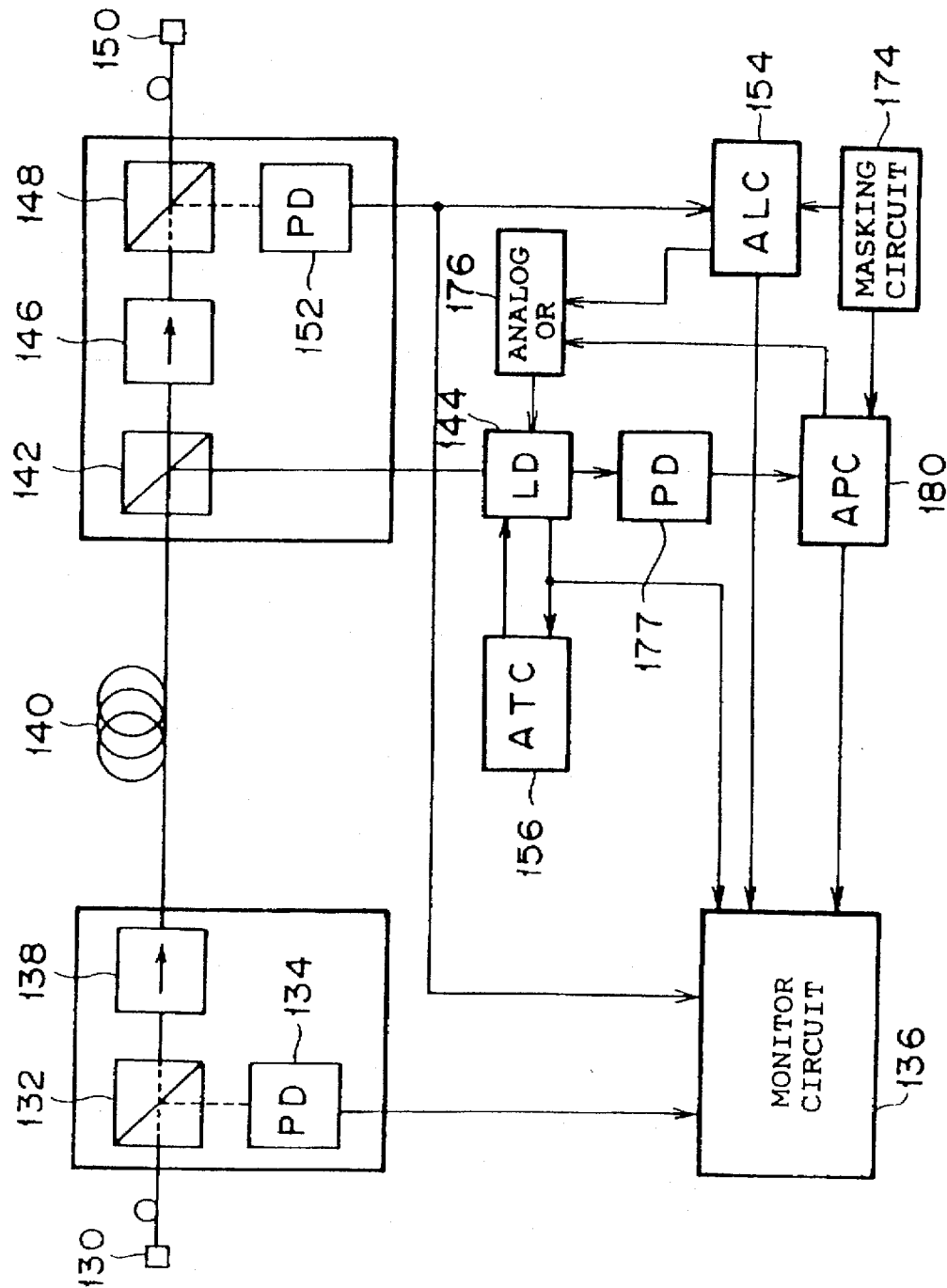
FIG. 35 is a block diagram showing an eighteenth embodiment of an EDFA.

FIG. 35 is a block diagram showing an eighteenth embodiment of an EDFA to which the present invention is applied. In the present embodiment, APC (automatic power control) is performed for a pumping light source, and setting of an idling electric current is performed by a loop of the APC. To this end, a photo-detector (photo-diode) 178 for converting backward light of the laser diode 144 by photo-electric conversion is provided in place of the LD electric current monitor circuit 170 of the seventeenth embodiment of FIG. 32. An output signal of the photo-diode 177 is supplied to an APC circuit 180. Control signals from the APC circuit 180 and the ALC circuit 154 are sent to the laser diode 144 by way of the analog OR circuit 176. The masking circuit 174 selectively masks the APC circuit 180 and the ALC circuit 154 so that, upon cold starting or upon restoration of inputting of an optical signal, an idling electric current is first supplied to the laser diode 144, and then ALC is performed.

Figure 36:
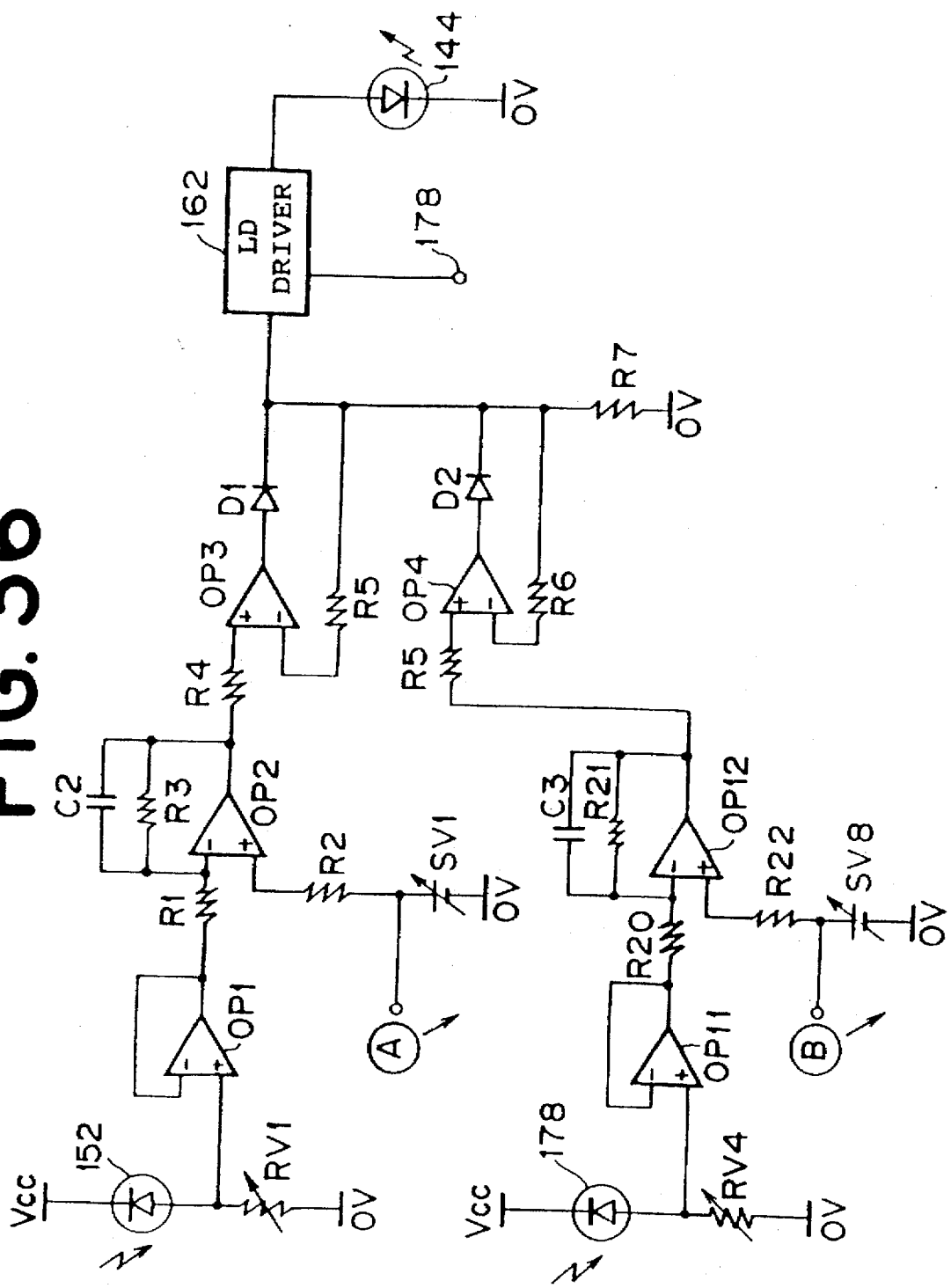
FIG. 36 is a circuit diagram (part 1) showing a concrete example around a masking circuit of FIG. 35.
Figure 37:
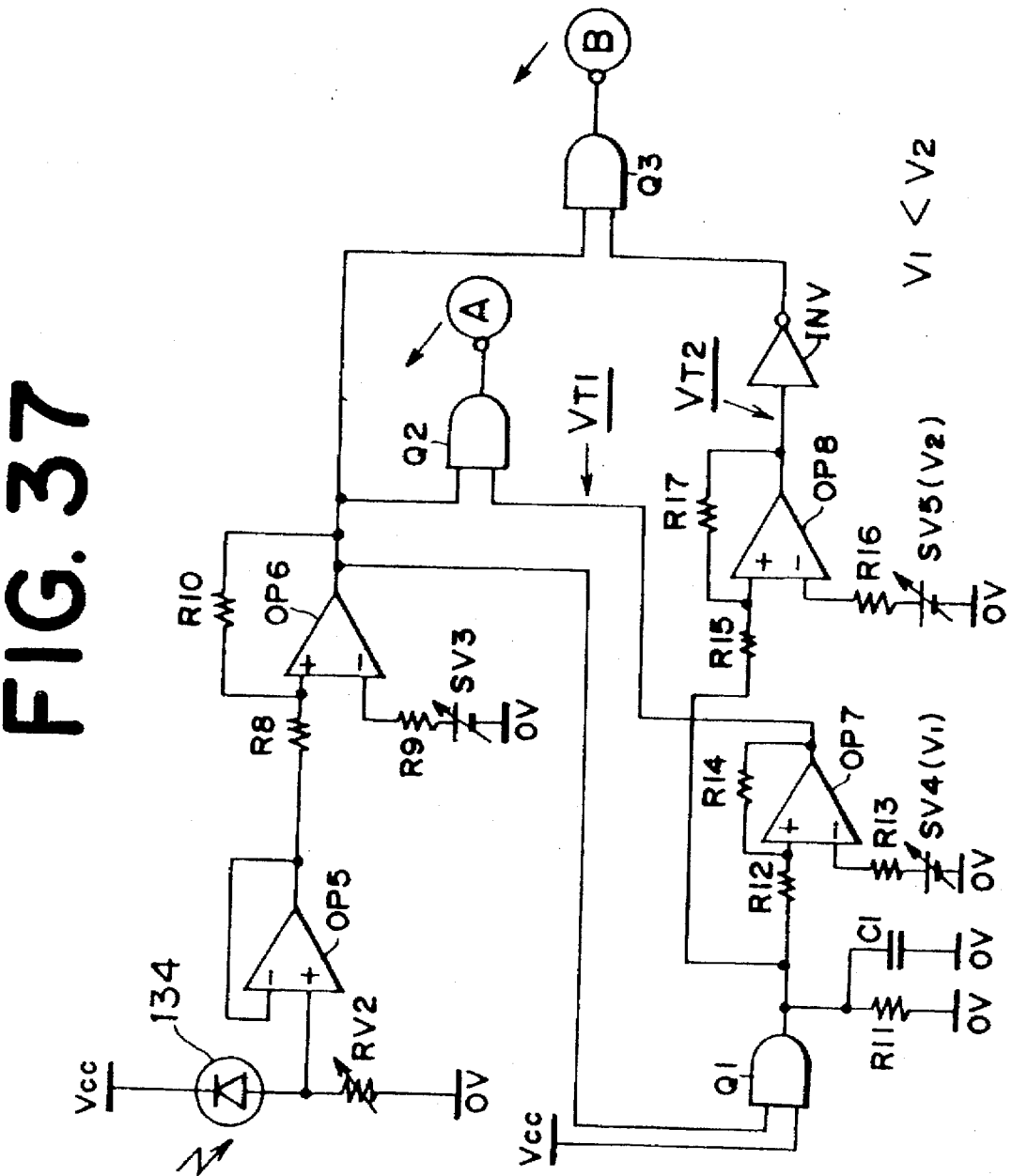
FIG. 37 is a circuit diagram (part 2) showing the concrete example around the masking circuit of FIG. 35.

FIGS. 36 and 37 are circuit diagrams showing a concrete example around the masking circuit of FIG. 35. In the present embodiment, in place of using an LD electric current monitor voltage from the LD driver 162' in the seventeenth embodiment of FIG. 33, an output signal of a photo-diode for receiving backward light of a pumping light source is supplied to the positive side input port of the operational amplifier OP11. In particular, the cathode of the photo-diode 178 is connected to the power source line, and the anode is grounded by way of a variable resistor RV4. And, the potential variation at a junction between the photo-diode 178 and the variable resistor RV4 is supplied to the positive side input port of the operational amplifier OP11.

Even where an idling electric current is obtained by APC in this manner, an optical amplifier which can be started without producing an optical surge similarly to the preceding embodiment can be provided. It is to be noted that, also in the seventeenth embodiment and the eighteenth embodiment, such an output stabilization circuit as shown in FIG. 29 can be adopted in a similar manner to the sixteenth embodiment. Further, in place of changing over from idling to ALC based on setting of a time constant, changing over from idling to ALC based on detection of an optical output level may be performed.

The present embodiment of the invention described subsequently relates generally to an optical transmission apparatus and more particularly to an optical transmission apparatus which outputs, upon restoration to an ordinary mark rate of about ½ after an input signal exhibits a succession of "1" (mark rate 1) or a succession of "0" (mark rate 0), signal light after a delay by a time longer than a gain response time of an optical amplifier.

As repeaters for optical communication systems, repeaters of the type wherein an optical signal is converted once into an electric signal and then the electric signal is converted back into an optical signal after it is shaped by waveform shaping and repeaters of the type wherein a received optical signal is directly amplified and repeated by an optical amplifier have been put into practical use. Repeaters of the former type have been used since an initial stage of development of optical communication systems whereas repeaters of the latter type have been developed in the last several years and are at such a stage where they have begun to be partially put into practical use. The most significant characteristic of optical amplifiers including EDFAs would be the flexibility that they can be continuously used as they are even if the transmission rate of the optical communication system changes. Particularly, in an optical submarine communication system, once a repeater is laid on the bottom of the sea, a vast sum of money is required to draw up the same, and accordingly, such an optical amplifier having flexibility as described above provides an optimum repeater. Naturally, it is a significant advantage that, also on land, the optical amplifier can cope flexibly with a change in use of an optical communication system. In an EDFA, a circuit which detects input light and stops, when no input is detected, a driving electric current of a pumping light source is used.

Figure 38:
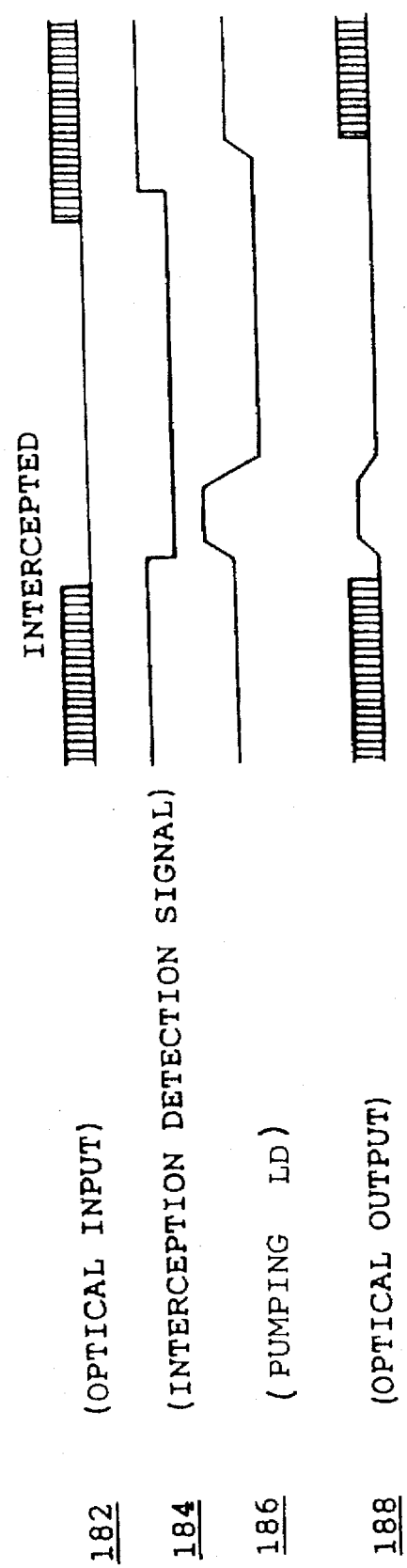
FIG. 38 is a time chart of a behavior of an optical fiber amplifier (when the optical input interception continues for a long period of time)
Figure 39:
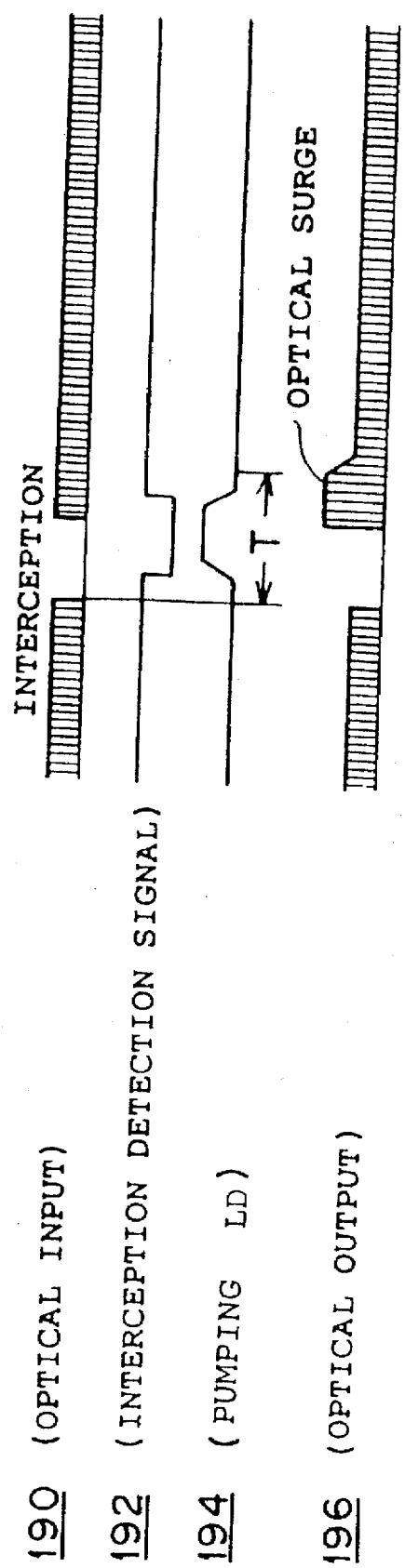
FIG. 39 is a time chart of a behavior of the optical fiber amplifier (when the optical input interception continues for a short period of time)

FIGS. 38 and 39 are views illustrating a behavior of an EDFA upon interception of an optical signal. As indicated by reference numeral 182 in FIG. 38, if an optical signal is intercepted, then an interception detection circuit outputs an interception detection signal having a delay peculiar to the circuit as indicated by reference numeral 184. In response to the interception detection signal, the electric current of the pumping light source increases once and then is intercepted as indicated by reference numeral 186, and upon restoration, the electric current returns to a predetermined value after a delay time peculiar to the pumping light source. Then, the optical output increases once as the electric current of the pumping light source increases as indicated by reference numeral 188.

The example of FIG. 38 relates to a case wherein the optical input interception is comparatively long, and while no problem is caused particularly since the optical signal is restored after the electric current of the pumping light source increases once. However, when the optical input interception is comparatively short as shown in FIG. 39, an optical surge is produced in the optical output since the optical signal is restored while the electric current of the pumping light source remains increased. It is to be noted that charts denoted by reference numerals 190, 192, 194 and 196 in FIG. 39 corresponds to the charts denoted by reference numerals 182, 184, 186 and 188 in FIG. 38, respectively. If an optical surge is produced in a certain optical amplifier, then this phenomenon propagates by way of all optical amplifiers incorporated in the optical repeater system, and in the worst case, such an accident that a light reception circuit of an optical reception apparatus is destroyed occurs. Accordingly, in an optical communication system which employs an optical amplifier, it is essential to take a countermeasure to prevent occurrence of the phenomenon described above.

Figure 40:
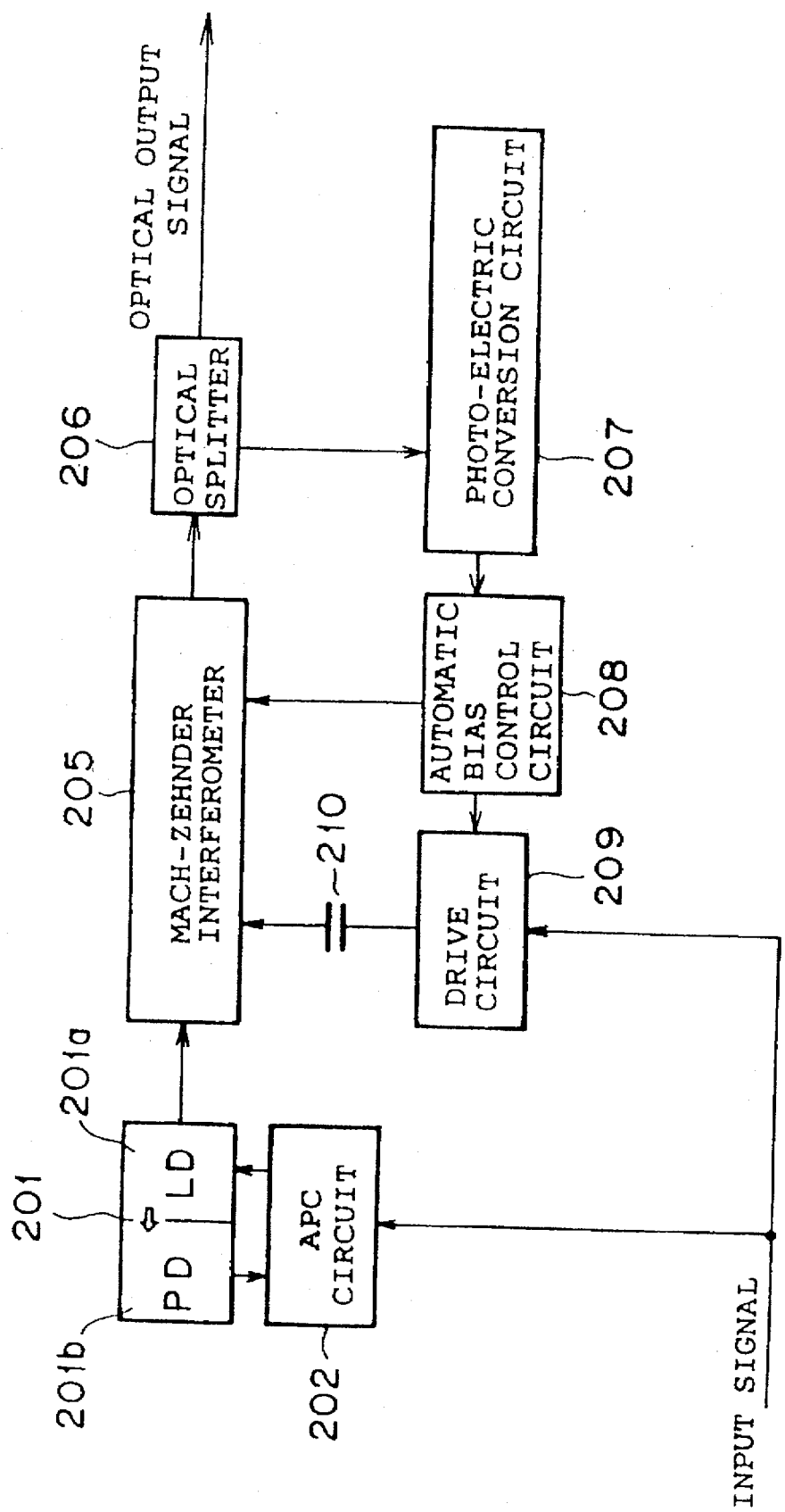
FIG. 40 is a block diagram of a conventional optical transmission apparatus of the external modulation type.

FIG. 40 is a block diagram of a conventional optical transmission apparatus to which external modulation is applied. Reference numeral 201 denotes a laser module including a laser diode 201a and a photo-diode 201b, reference numeral 205 denotes a Mach-Zehnder interferometer, reference numeral 206 denotes an optical splitter, reference numeral 207 denotes a photo-electric conversion circuit, reference numeral 208 denotes an automatic bias control circuit, reference numeral 209 denotes a drive circuit, and reference numeral 210 denotes a capacitor. In the present apparatus, when the mark rate of the input signal is close to 1 or 0, a low frequency signal is supplied to the Mach-Zehnder interferometer 205, and consequently, a low frequency band is blocked by the capacitor 210. Accordingly, no optical signal is outputted from the Mach-Zehnder interferometer 205. However, if an ordinary condition is restored and an input signal whose mark rate is approximately ½ is inputted, then an optical signal is sent out immediately.

Figure 41:
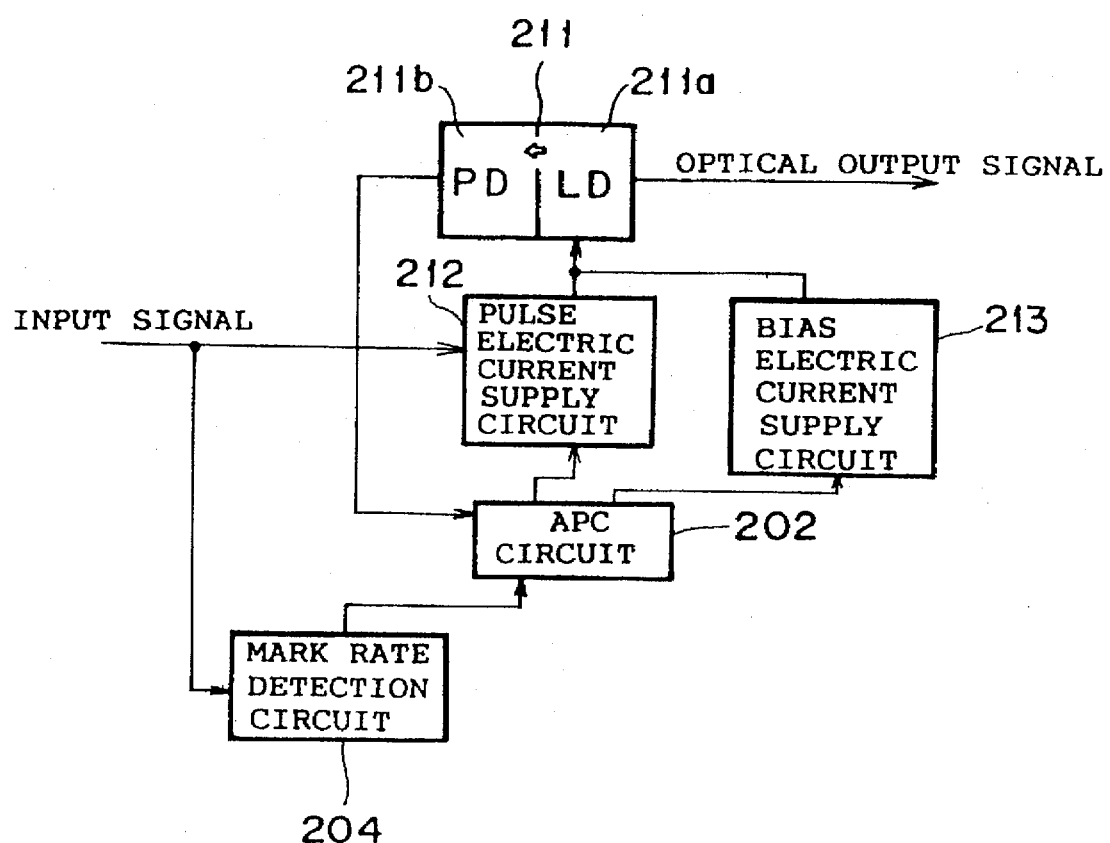
FIG. 41 is a block diagram of a conventional optical transmission apparatus of the direct modulation type.

FIG. 41 is a block diagram showing a conventional optical transmission apparatus to which direct modulation is applied. Reference numeral 211 denotes a laser module including a laser diode 211a and a photo-diode 211b, reference numeral 212 denotes a pulse electric current supply circuit, reference numeral 213 denotes a bias electric current supply circuit, reference numeral 202 denotes an APC circuit, and reference numeral 204 denotes a mark rate detection circuit.

In the present apparatus, when the mark rate of an input signal is close to 0, only a bias electric current is supplied to the laser diode 211a while no pulse electric current is supplied, and accordingly, the optical output is effectively intercepted. However, if an ordinary condition is restored and an input signal whose mark rate is approximately ½ is supplied, then an optical output is supplied immediately. In particular, in the conventional optical transmission apparatus, even where external modulation is applied or where direct modulation is applied, an optical output is sent out immediately when the mark rate returns from 1 or 0 to about ½, and consequently, there is the possibility that an optical surge may be produced in optical amplifiers disposed in an optical transmission line, which is a problem when it is tried to assure the reliability of the system.

Accordingly, it is an object of the present embodiment of the invention to provide an optical transmission apparatus wherein no optical surge is produced in optical amplifiers when the mark rate of an input signal changes to 1 or 0.

Figure 42:
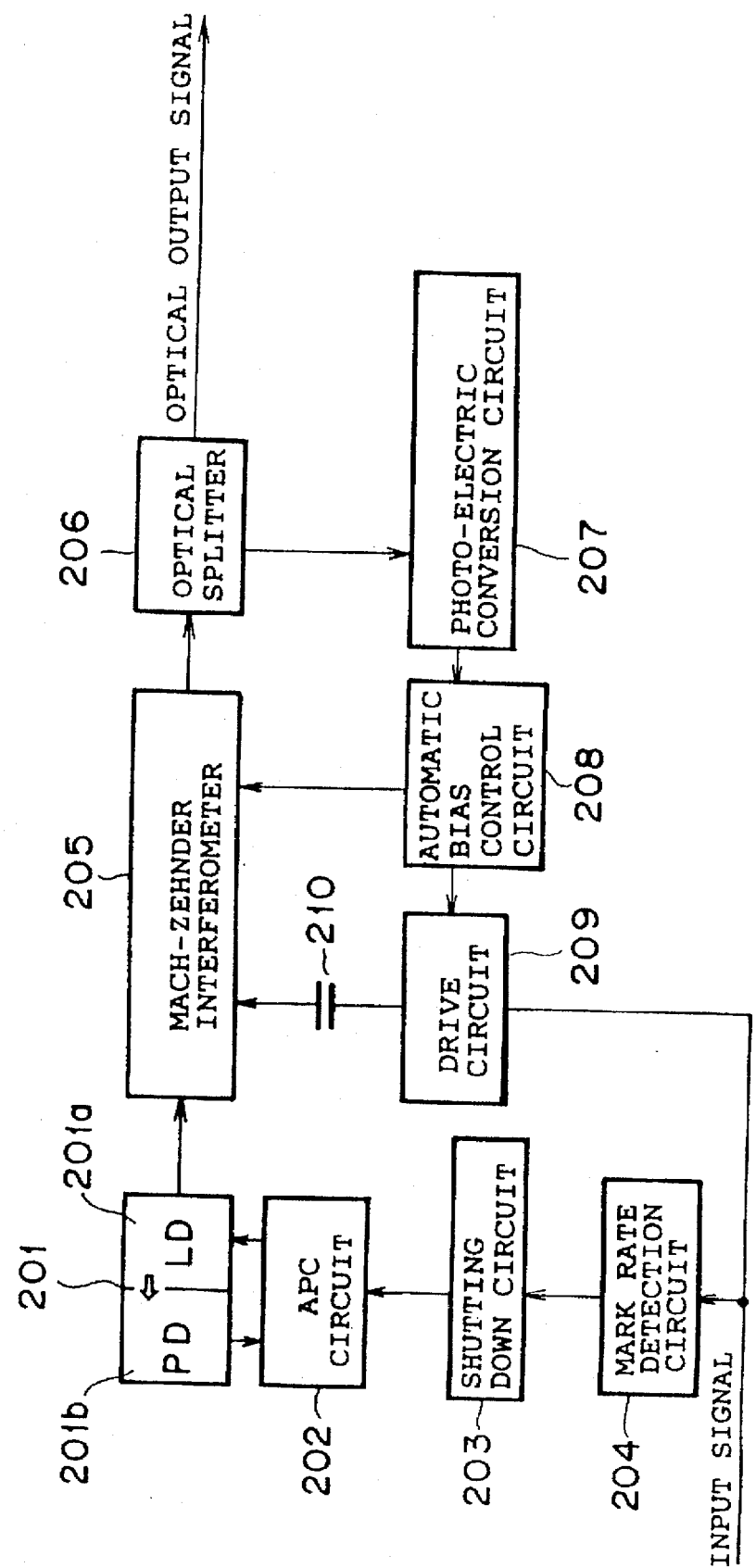
FIG. 42 is a block diagram showing a first embodiment of an optical transmission apparatus to which the present invention is applied.

FIG. 42 is a block diagram showing a first embodiment of an optical transmission apparatus of the present invention, and external modulation is applied to the optical transmission apparatus. Reference numeral 201 denotes a laser module including a laser diode 201a and a photo-diode 201b, reference numeral 202 denotes an APC circuit, reference numeral 203 denotes a shutting down circuit, reference numeral 204 denotes a mark rate detection circuit, reference numeral 205 denotes a Mach-Zehnder interferometer, reference numeral 206 denotes an optical splitter, reference numeral 207 denotes a photo-electric conversion circuit, reference numeral 208 denotes an automatic bias control circuit, reference numeral 209 denotes a drive circuit, and reference numeral 210 denotes a capacitor.

Figure 43:
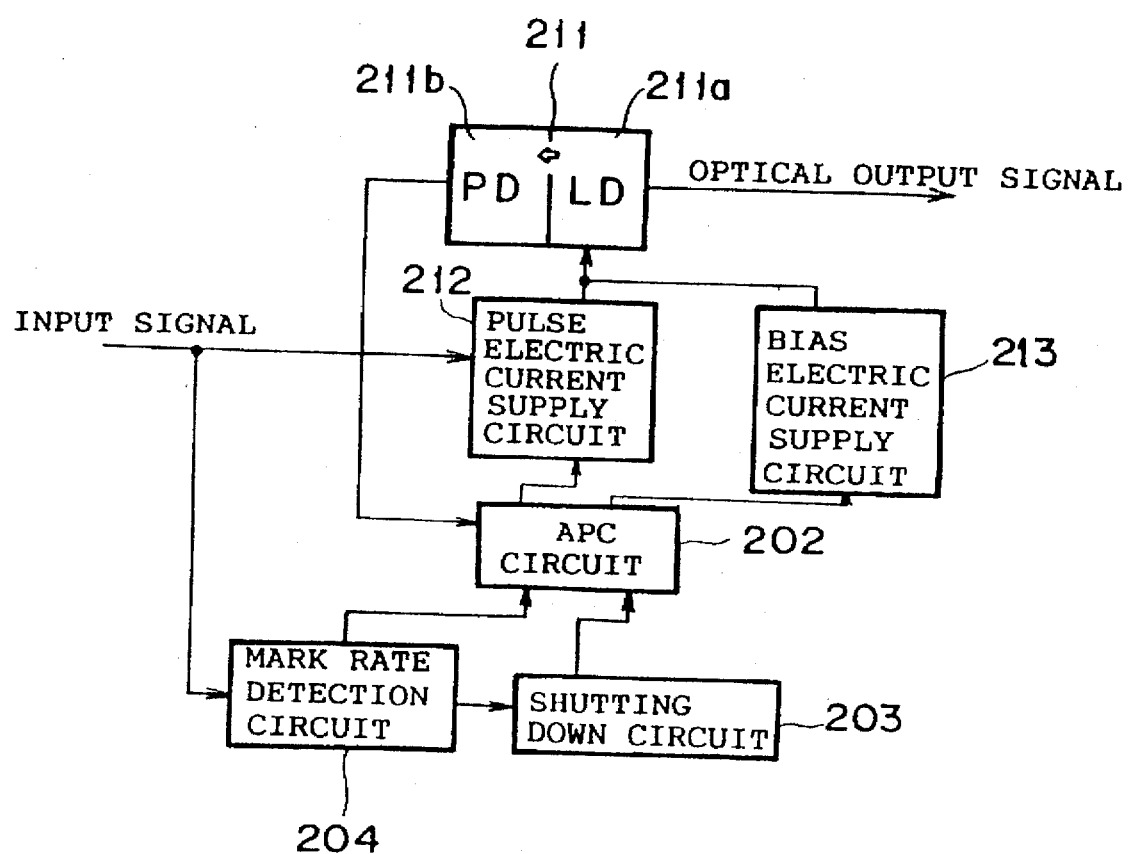
FIG. 43 is a block diagram showing a second embodiment of an optical transmission apparatus to which the present invention is applied.

FIG. 43 is a block diagram showing a second embodiment of an optical transmission apparatus of the present invention. Direct modulation is applied to the optical transmission apparatus. Reference numeral 211 denotes a laser module including a laser diode 211a and a photo-diode 211b, reference numeral 212 denotes a pulse electric current supply circuit, reference numeral 213 denotes a bias electric current supply circuit, reference numeral 202 denotes an APC circuit, reference numeral 203 denotes a shutting down circuit, and reference numeral 204 denotes a mark rate detection circuit.

In particular, the present invention is characterized in that it comprises a shutting down circuit for stopping a laser diode by way of an APC circuit in response to an output of a mark rate detection circuit. Since the principle of the present invention is common to the apparatus of FIGS. 42 and 43, operation is described with reference to FIG. 42. Further, for simplification, description will be given of a case wherein an input is intercepted. If an input signal is intercepted, then the mark rate detection circuit 204 which is an average value detection circuit varies its output level in response to the interception time. In particular, if an interception is detected, then the output level changes from an average value to "0", but if an input signal is restored, then the output level changes from "0" to an average value. This signal is received by the shutting down circuit 203, which detects a falling edge and generates a pulse of a predetermined time in response to the detection signal. If the electric current of the laser diode is stopped by way of the APC circuit 202 in response to the pulse, then the optical output is stopped for the period.

If the duration of the pulse is set to a time $T_S$ longer than a time T shown in FIG. 39, then no optical surge will be produced in the optical amplifier. Since interception of an input signal is described as an example in the foregoing description, the case wherein the mark rate of an input signal is 0 is described. If a similar level variation is provided also when the mark rate detection circuit 204 detects the mark rate 1, the shutting down circuit 203 operates similarly, and accordingly, the optical output can be stopped also for the period of $T_S$.

Figure 44:
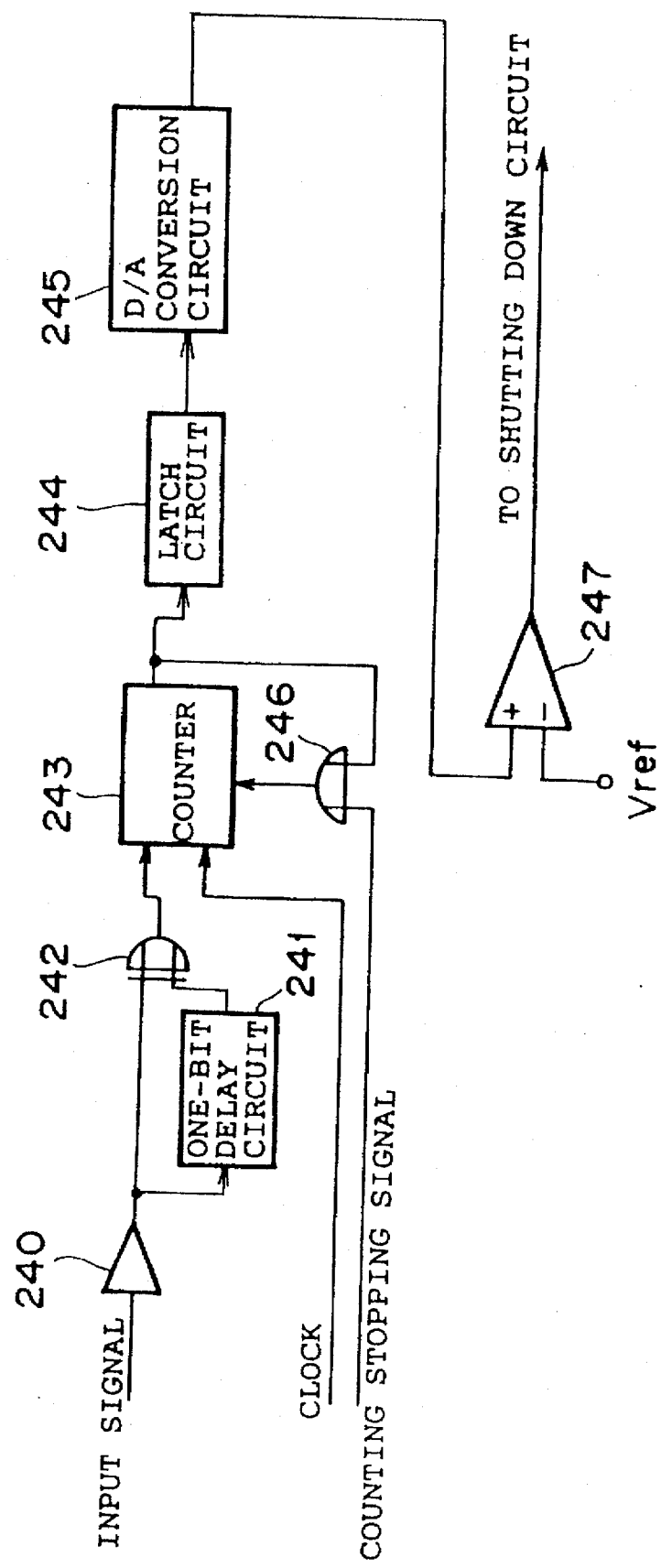
FIG. 44 is a block diagram showing an example of a mark rate detection circuit.

FIG. 44 is a block diagram showing an example of a mark rate detection circuit. Reference numeral 240 denotes a buffer gate, reference numeral 241 denotes a one-bit delay circuit, reference numeral 242 denotes an exclusive OR circuit, reference numeral 243 denotes a counter, reference numeral 244 denotes a latch circuit, reference numeral 245 denotes a digital to analog (D/A) conversion circuit, reference numeral 246 denotes a first OR circuit, and reference numeral 247 denotes a comparator. It is to be noted that FIG. 44 illustrates a mark rate detection circuit of the type which transmits a level variation to the shutting down circuit 203 even if it detects that the mark rate is close to 0 or close to 1.

If the mark rate of the input signal is approximately ½, then the output of the buffer gate 240 and the output of the one-bit delay circuit 241 exhibit different logic levels in the probability of about ½, and accordingly, also the output of the exclusive OR circuit 242 exhibits "1" in the probability of about ½. This is counted by the counter 243, and when a predetermined output bit exhibits "1", the counter output is latched by the latch circuit 244 and supplied to the D/A conversion circuit 245 and besides the count value is reset. An analog output of the D/A conversion circuit 245 is compared with a predetermined reference voltage, and "1" is outputted to the shutting down circuit 203.

On the other hand, when the mark rate of the input signal is 1 or 0, since the output of the buffer gate 240 and the output of the one-bit delay circuit 241 exhibit a same logic level, no counting operation of the counter 243 proceeds. Accordingly, even if the predetermined time elapses, the output of the D/A conversion circuit 245 remains equal to 0 volt. This voltage is compared with a predetermined reference voltage $V_{ref}$, and "0" is outputted to the shutting down circuit 203. Although the mark rate is described to be 1 or 0 for simplified description, since counting proceeds slowly where the mark rate is close to 1 or close to 0, also the output of the D/A conversion circuit 245 remains at a low voltage, and operation of the entire circuit is similar to that described above.

In this instance, however, if it is waited that "1" appears at a predetermined output bit of the counter 243, then after a long interval of time, "1" appears at the predetermined bit so that the circuit operates similarly as that when the mark rate is ½, and accordingly, it is desired to stop counting after lapse of a predetermined time. This signal is a counting stopping signal of FIG. 44. The period of the counting stopping signal should be set, using, for example, an external clock signal, equal to a time required for "1" to appear at the predetermined bit when the mark rate is ½. Further, while the foregoing description proceeds on the assumption that a fixed reference voltage $V_{ref}$ is applied as the reference voltage to the comparator 247, if the reference voltage is varied in accordance with the output voltage of the comparator 247, then a hysteresis is provided to the comparison characteristic so that chattering which often arises upon interception of an input signal can be suppressed.

The mark rate detection circuit shown in FIG. 44 is suitable for an optical transmission apparatus, to which external modulation is applied, which does not require a mark rate detection voltage for APC because the output voltage of the D/A conversion circuit 245 with respect to a variation of the mark rate exhibits a maximum value when the mark rate is ½ and exhibits 0 volt when the mark rate is 1 or 0. On the contrary, in an optical transmission apparatus, to which direct modulation is applied, wherein an output voltage of a mark rate detection circuit is used as a reference voltage for APC, since the characteristic described above is not suitable for APC, a known mark rate detection circuit which detects an average value of an input signal should be used in place of the mark rate detection circuit of FIG. 44.

Figure 45:
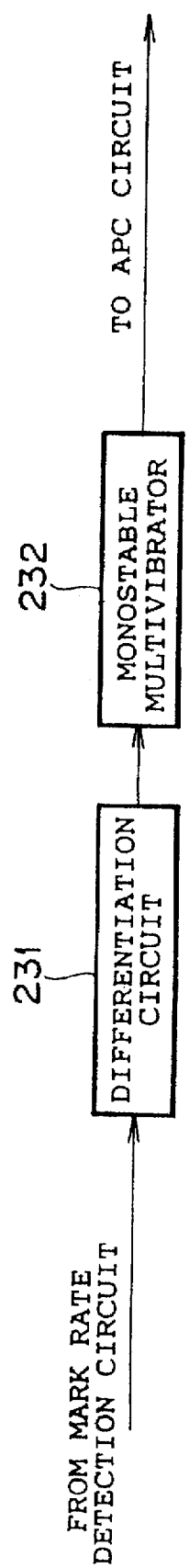
FIG. 45 is a block diagram showing an example of a shutting down circuit.

FIG. 45 is a block diagram showing an example of a shutting down circuit. Reference numeral 231 denotes a differentiation circuit, and reference numeral 232 denotes a monostable multivibrator. A falling edge of the output of a comparator of a mark rate detection circuit from "1" to "0" is differentiated by the differentiation circuit 231 so that a trigger pulse to be supplied to the monostable multivibrator 232 is produced. In response to the trigger pulse, the monostable multivibrator 232 outputs a pulse of a duration $T_S$. This pulse is supplied to the APC circuit 202 so that operation for APC is intercepted for the period of time of $T_S$ to stop the driving electric current of the laser diode.

Figure 46:
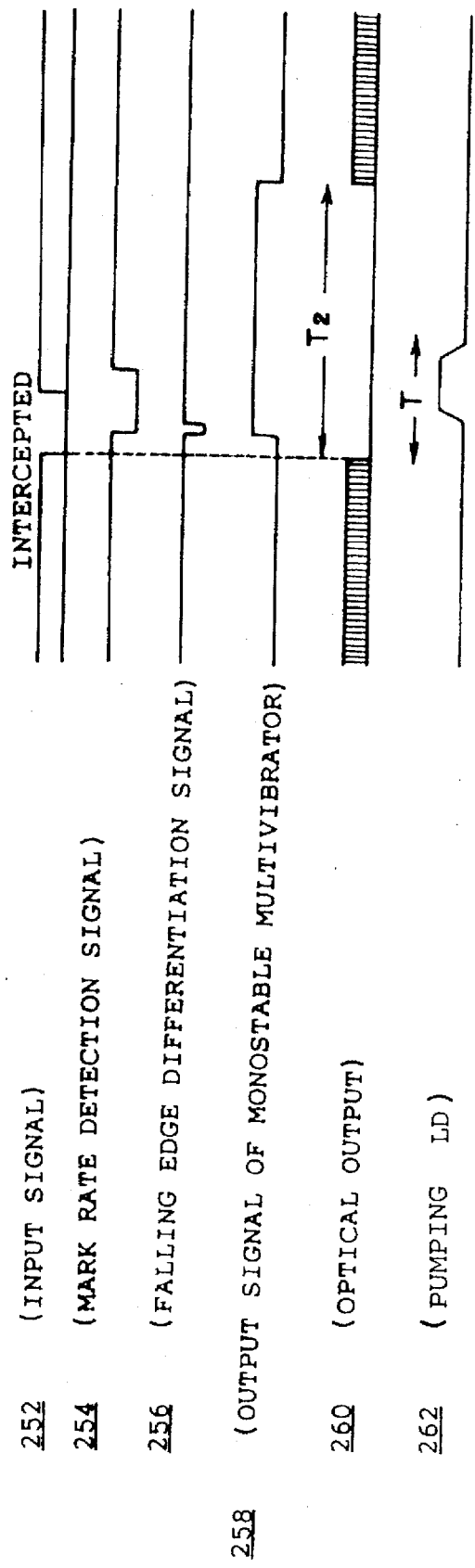
FIG. 46 is a time chart of the examples of FIGS. 42 and 43.

FIG. 46 is a time chart of the embodiment of FIGS. 42 and 43. In the present time chart, a case of interception of an input is assumed, but the time chart similarly applies when the mark rate is 1. If an input signal is intercepted, then the mark rate detection circuit 204 outputs a mark rate detection signal from the comparator 247. The mark rate detection signal is differentiated at a falling edge thereof by the differentiation circuit 231 of the shutting down circuit 203 so that a falling edge differentiation signal is produced. In response to the falling edge differentiation signal, the monostable multivibrator 232 outputs "1" for a predetermined period of time. Consequently, even if the input signal is restored, the optical output is stopped, and accordingly, the optical output is stopped in accordance with interception of the input signal, but is restored when the monostable multivibrator 232 returns to "0". Accordingly, if the time $T_S$ is set longer than the time T in which the electric current of the pumping light source increases once and then decreases after the input signal is intercepted, then no optical surge is produced in any optical amplifier.

As described above, according to the present embodiment of the invention, the effect that an optical transmission apparatus wherein an optical amplifier does not produce an optical surge when the mark rate of an input signal returns to a normal mark rate ½ after the mark rate of the input signal changes to 1 or 0 can be provided is provided. Accordingly, a significant effect is provided in that the reliability of an optical communication system is enhanced. It is to be noted that, in the time chart of FIG. 46, reference numeral 252 denotes an input signal, reference numeral 254 denotes a mark rate detection signal, reference numeral 256 denotes a falling edge differentiation signal, reference numeral 258 denotes an output signal of the monostable multivibrator, and reference numeral 260 denotes an optical output. Further, an electric current of the pumping light source is denoted at reference 262 for reference.

The technical subject presented in FIGS. 38 and 39 can be solved not only in an optical transmission apparatus but also in an optical amplifier of an optical repeater. In particular, according to the present embodiment of the invention, there is provided an optical amplifier, comprising a doped fiber doped with a rare earth element and having a first end and a second end for guiding signal light from the first end toward the second end thereof, a pumping light source for outputting pumping light, optical coupling means optically connected to the doped fiber and the pumping light source for introducing the pumping light into the doped fiber, interception detection means for detecting that inputting of the signal light to the doped fiber is intercepted, a photo-detector for detecting the intensity of light outputted from the second end of the doped fiber, automatic level control means for supplying a controlling electric current to the pumping light source so that the output level of the photo-detector may be fixed, and shutting down means for intercepting the output of the doped fiber for a predetermined period of time in response to an output signal of the interception detection means.

Preferably, the shutting down means includes an optical shutter provided on the upstream side in the signal light propagation direction of the doped fiber. Or, the shutting down means includes an optical shutter provided on the downstream side in the signal light propagation direction of the doped fiber.

Figure 47:
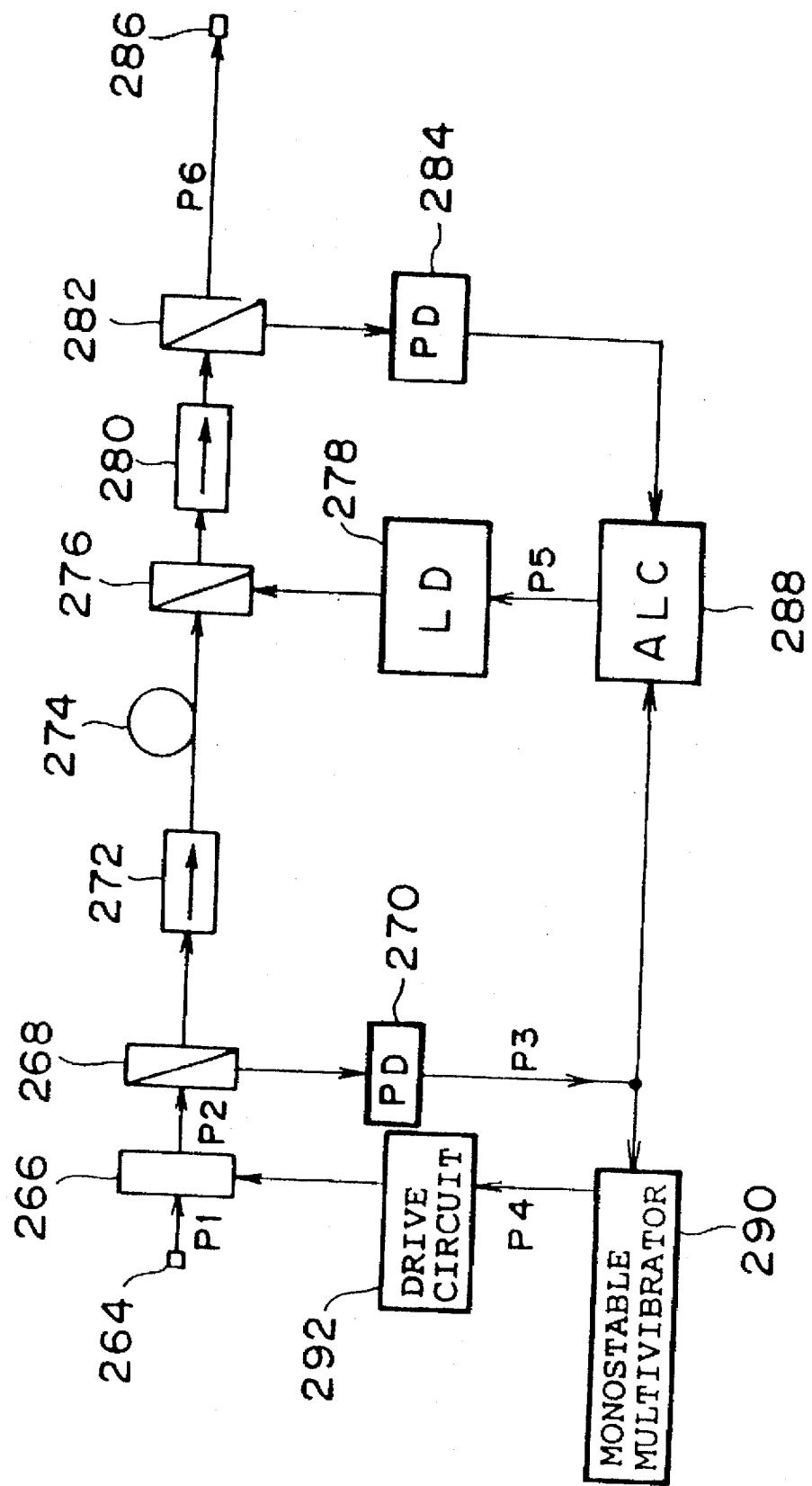
FIG. 47 is a block diagram showing a nineteenth embodiment of an EDFA to which the present invention is applied.

FIG. 47 is a block diagram showing a nineteenth embodiment of an EDFA to which the present invention is applied. Signal light supplied to an input side optical connector 264 is inputted to an optical splitter 268 by way of an optical shutter 266. The optical shutter 266 corresponds to the optical output power controller 106 in the embodiment of FIG. 15, and may be an optical attenuator. One of two split beams of light of the optical splitter 268 is converted by photo-electric conversion by a photo-detector 270, and the other split beam of light is supplied to a doped fiber 274 by way of an optical isolator 272. A wave combiner 276 is provided on the downstream side of the doped fiber 274 in the signal light propagation direction, and pumping light from a laser diode 278 serving as a pumping light source is supplied to the doped fiber 274 by way of the wave combiner 276.

The signal light amplified in the doped fiber 274 passes the wave combiner 276 and an optical isolator 280 in this order and is supplied to an optical splitter 282. One of a pair of split beams of light of the optical splitter 282 is converted by photo-electric conversion by a photo-detector 284, and the other split beam of light is sent out to an optical transmission line not shown by way of an output side optical connector 286. An output signal of the photo-detector 284 is supplied to an ALC circuit 288. The ALC circuit 288 supplies a control electric current to the laser diode 278 so that the output level of the photo-detector 284 may be fixed. An output signal of the photo-detector 270 is supplied to the ALC circuit 288 and a monostable multivibrator 290. The monostable multivibrator 290 is provided to set a present time based on input interception information obtained by the photo-detector 270, and sends a control signal to a drive circuit 292 of the optical shutter 266 so that the optical shutter 266 may be closed for the fixed period of time.

Figure 48:
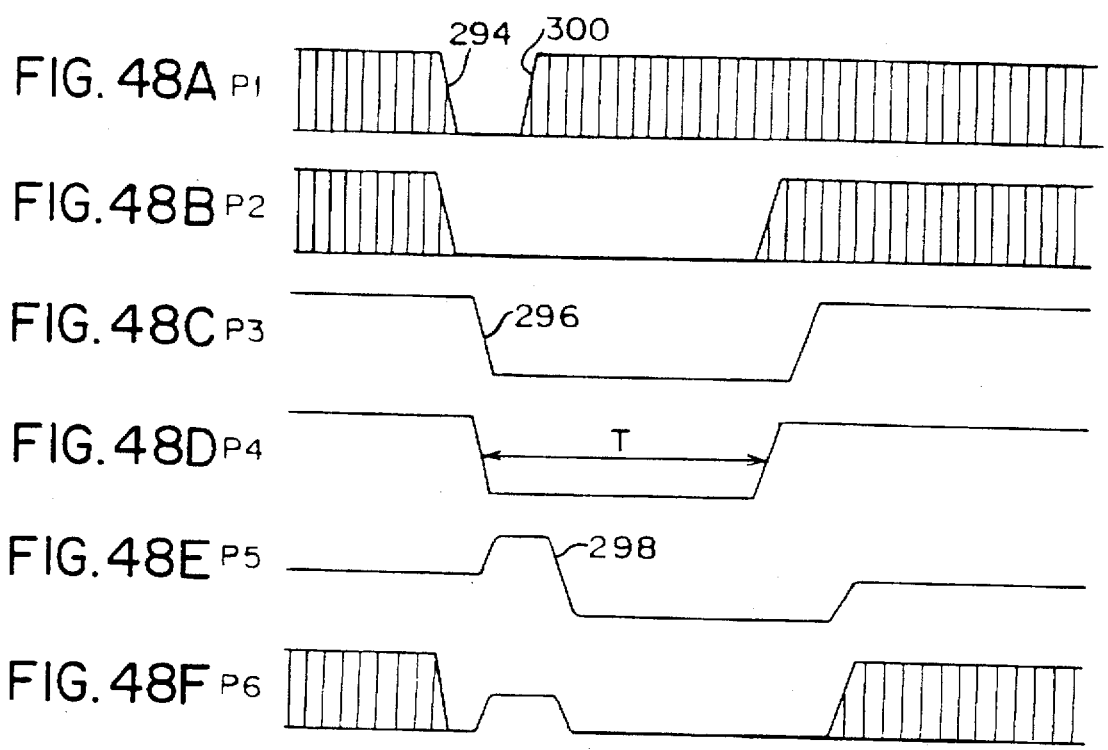
FIG. 48 is a time chart illustrating operation of the EDFA of FIG. 47.

FIG. 48 is a time chart illustrating operation of the EDFA of FIG. 47 and shows waveforms at various points of the EDFA. Reference character P1 denotes an input waveform to the optical shutter 266; P2 an output waveform of the optical shutter 266; P3 an output waveform of the photo-detector 270; P4 an output waveform of the monostable multivibrator 290; P5 an output waveform of the ALC circuit 288; and P6 an output waveform of the EDFA.

If inputting of signal light is intercepted at the timing indicated by reference numeral 294, then the output level of the photo-detector 270 drops after a little delay as indicated by reference numeral 296. Using the level drop as a trigger, the monostable multivibrator 290 supplies a signal to the drive circuit 292 to change the optical shutter 266 from an open state to a closed state, and the closed state is continued for a fixed period of time T. As the optical input drops, the driving current of the laser diode 278 increases as indicated by reference numeral 298 by an operation of the ALC circuit 288. In this instance, since the optical shutter 266 is in a closed state, no optical surge is produced on the optical output of the EDFA. In the example shown, inputting of signal light is restored at a comparatively early stage at a timing indicated by reference numeral 300. However, when the optical shutter 266 is in a closed state, the optical output is lost for a very short period of time. However, when the disadvantage that an optical surge may be produced to destroy a light reception element of a light reception apparatus to cause system down is taken into consideration, the effect of the present embodiment is high in that the system down is prevented.

Figure 49:
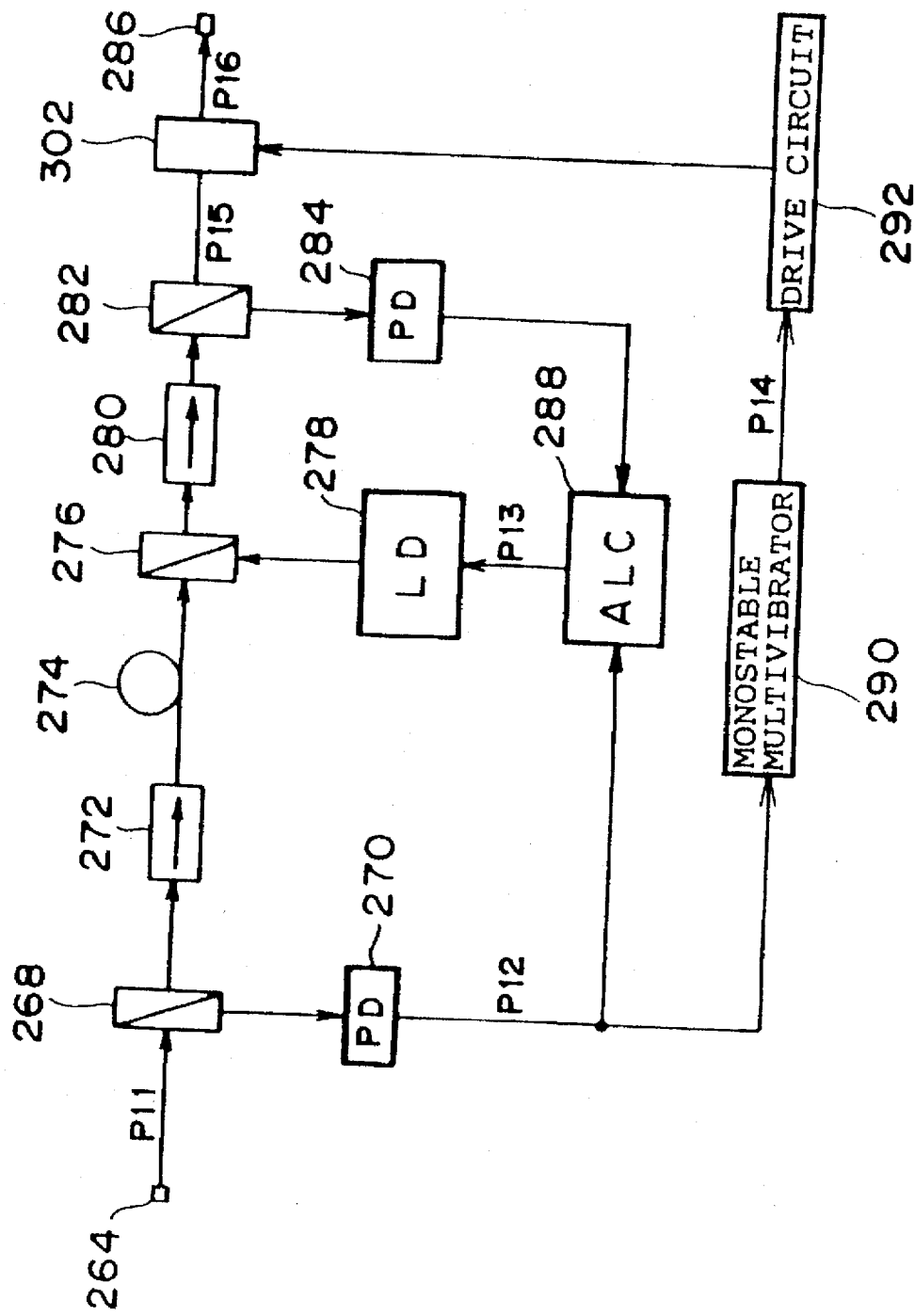
FIG. 49 is a block diagram showing a twentieth embodiment of an EDFA.

FIG. 49 is a block diagram showing a twentieth embodiment of an EDFA to which the present invention is applied. In the present embodiment, an optical shutter is provided on the output side in place of the optical shutter provided on the input side in the nineteenth embodiment of FIG. 47. In particular, an optical shutter 302 is provided between the optical splitter 282 and the output side optical connector 286. The optical shutter 302 may be an optical attenuator. It is similar as in the nineteenth embodiment of FIG. 47 that the optical shutter 302 is driven by the drive circuit 292 and an output signal of the photo-detector 270 is supplied by way of the monostable multivibrator 290.

FIG. 50 is a time chart illustrating operation of the EDFA of FIG. 49. Reference character P11 denotes an input waveform of the optical splitter 268; P12 an output waveform of the photo-detector 270; P13 a driving waveform of the laser diode 278; P14 an output signal level of the monostable multivibrator 290; P15 an input waveform of the optical shutter 302; and P16 an output waveform of the optical shutter 302. In the present embodiment, since the optical shutter 302 is provided on the output side, an optical surge is produced as indicated by reference numeral 304 on the input waveform to the optical shutter 302. However, this is intercepted by the optical shutter 302, and consequently, no optical surge is produced on the output waveform P16 of the optical shutter 302.

Figure 51:
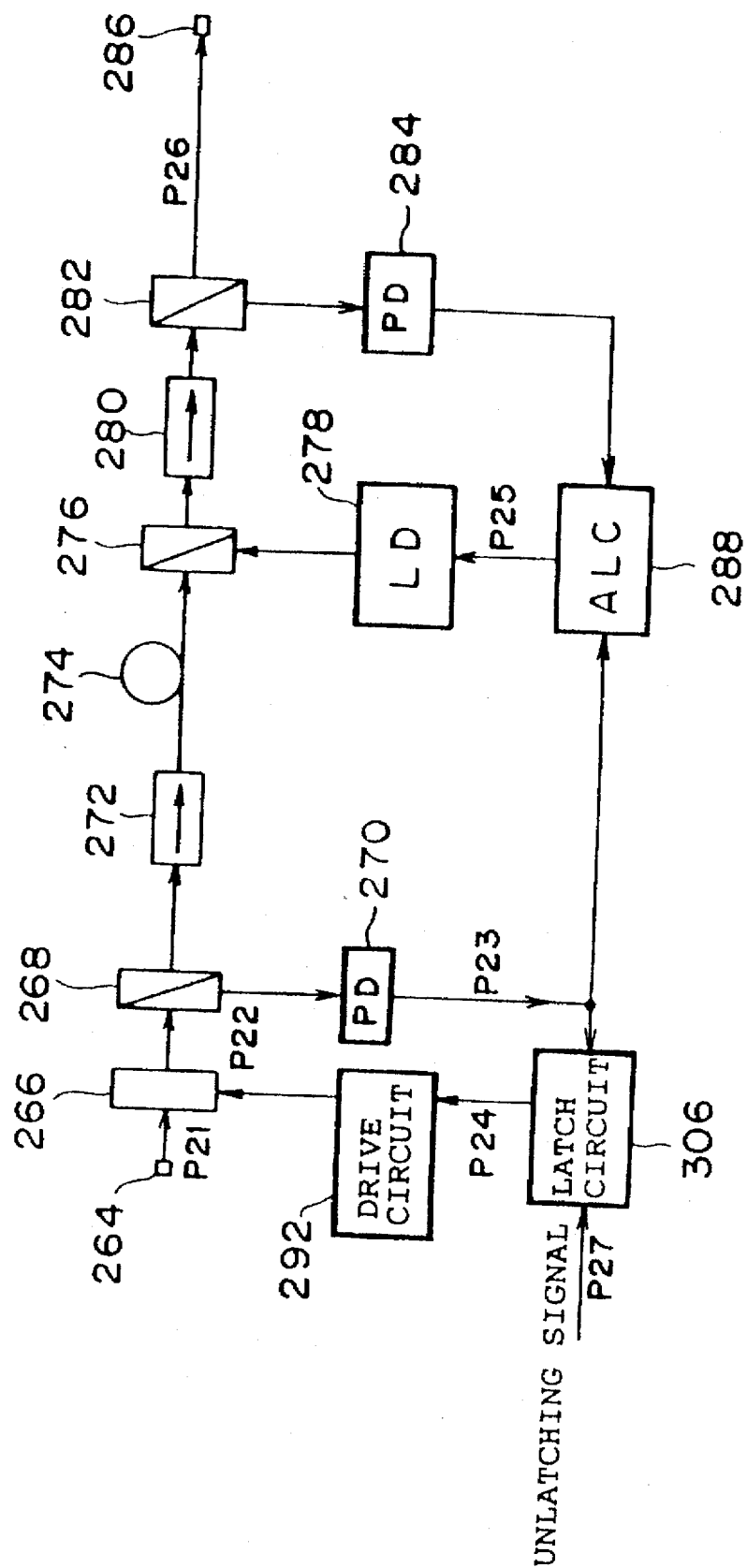
FIG. 51 is a block diagram showing a twenty-first embodiment of an EDFA to which the present invention is applied.

FIG. 51 is a block diagram showing a twenty-first embodiment of an EDFA to which the present invention is applied. The present EDFA includes a latch circuit 306 in place of the monostable multivibrator 290 of the nineteenth embodiment of FIG. 47. The latch circuit 306 sends a control signal to the drive circuit 292, when the output level of the photo-detector 270 drops, so that the optical shutter 266 may be changed over from an open state to a closed state. On the other hand, when an unlatching signal is inputted to the latch circuit 306, the latch circuit 306 sends a control signal to the drive circuit 292 to change over the optical shutter 266 from a closed state to an open state.

FIG. 52 is a time chart illustrating operation of the EDFA of FIG. 51. Reference character P21 denotes an input waveform of the optical shutter 266; P22 an output waveform of the optical shutter 266; P23 an output waveform of the photo-detector 270; P24 an output signal level of the latch circuit 306; P25 an input waveform of the laser diode 278; P26 an output waveform of the EDFA; and P27 a waveform of an unlatching signal supplied to the latch circuit 306. In the present embodiment, in place of the optical shutter closed for a fixed period of time by a monostable multivibrator in the nineteenth embodiment of FIG. 47 or the twentieth embodiment of FIG. 49, the period of time for which an optical shutter is closed is determined using a latch clear pulse 308 of an unlatching signal.

In the present embodiment, the latch circuit 306 may have a function of notifying to an operator or the like that an interception condition of a signal input takes place and the EDFA is in a stopping condition. The operator can restore an ordinary operation if, by inputting a latch clear pulse by operation from the outside, inputting of signal light is restored from an interception condition at the point of time. It is to be noted that, while the optical shutter is provided on the input side of the EDFA in the twenty-first embodiment of FIG. 51 in which a latch circuit is adopted, the optical shutter 266 may be provided on the output side of the EDFA.

Another optical transmission apparatus of the present invention which has been invented in order to solve the technical subject described hereinabove with reference to FIGS. 38 and 39 comprises signal light generating means for generating signal light modulated in accordance with an input signal, input interception detection means for detecting that the input signal is intercepted, and shutting down means for intercepting the output of the signal light generating means for a predetermined period of time in response to an output signal of the input interception detection means. Several embodiments of the same will be described below.

Figure 53:
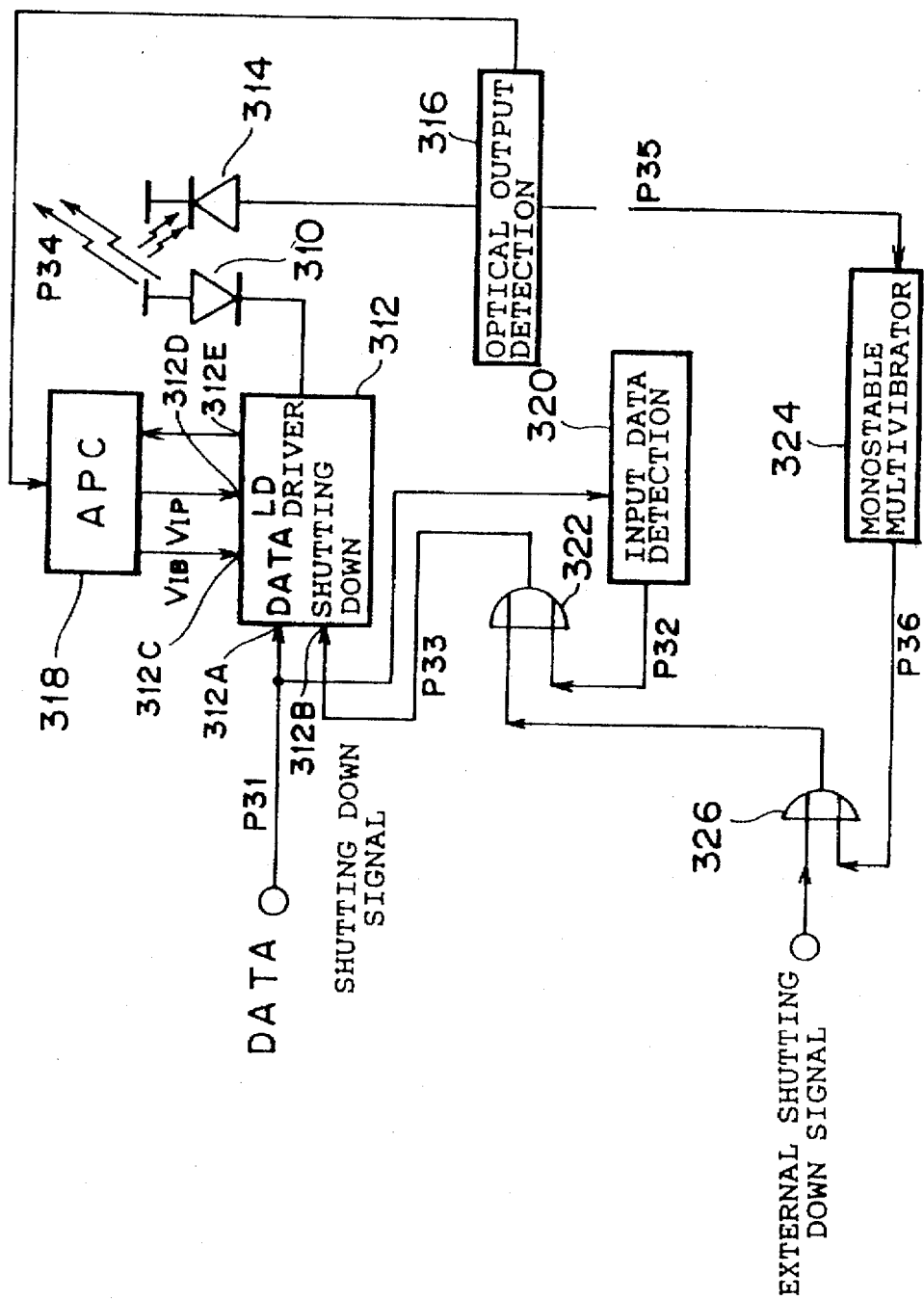
FIG. 53 is a block diagram showing a third embodiment of an optical transmission apparatus to which the present invention is applied.
Figure 54A:
FIG. 54 is a time chart illustrating operation of the optical transmission apparatus of FIG. 53.
Figure 54B:
Figure 54C:
Figure 54D:
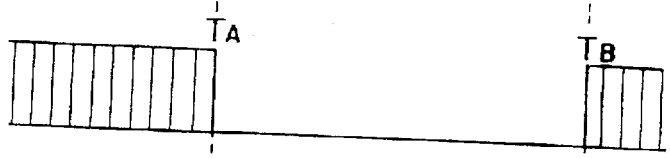
Figure 54E:
Figure 54F:
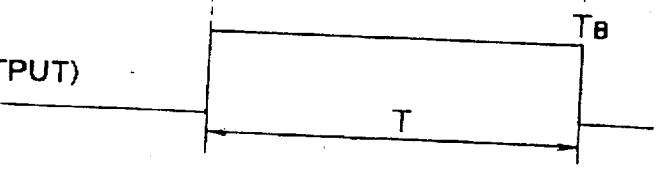

FIG. 53 is a block diagram showing a third embodiment of an optical transmission apparatus to which the present invention is applied. Reference numeral 310 denotes a laser diode serving as a light source. The laser diode 310 is driven by an LD driver 312. The LD driver 312 has an input port 312A for an input signal (data), an input port 312B for a shutting down signal, an input port 312C for a control signal (voltage signal) $V_{IB}$ for a bias electric current to be supplied to the laser diode 310, an input port 312D for a control signal (voltage signal) $V_{IP}$ for a pulse electric current to be supplied to the laser diode 310, and an output port 312E for mark rate data. The input ports 312C and 312D and the output port 312E are connected to an APC circuit 318. Forward light of the laser diode 310 is sent out into an optical transmission line not shown, and backward light of the laser diode 310 is converted by photo-electric conversion by a photo-diode (photo-detector) 314. An output signal of the photo-diode 314 is supplied to an optical output detection circuit 316.

The intensity of output light of the laser diode 310 is reflected on an output signal of the optical output detection circuit 316. Part of the output signal is supplied to the APC circuit 318, and in response to this, the APC circuit 318 sends a control signal to the LD driver 312 so that the output level of the laser diode 310 may be fixed. The other part of the output signal of the optical output detection circuit 316 is supplied to a monostable multivibrator 324. An output signal of the monostable multivibrator 324 is supplied to one of a pair of input ports of an OR circuit 326. A shutting down signal from the outside is supplied to the other input port of the OR circuit 326. Part of an input signal to be supplied to the input port 312A of the LD driver 312 is split and supplied to an input data detection circuit 320. An output signal of the input data detection circuit 320 and an output signal of the OR circuit 326 are supplied to input ports of another OR circuit 322, and an output signal of the OR circuit 322 is supplied to the input port 312B of the LD driver 312.

FIG. 54 is a flow chart illustrating operation of the optical transmission apparatus of FIG. 53. Reference character P31 denotes a waveform of an input signal to be supplied to the input port 312A of the LD driver 312; P32 a waveform of an input data detection signal outputted from the input data detection circuit 320; P33 a waveform of a shutting down signal supplied to the input port 312B of the LD driver 312; P34 an output waveform of the laser diode 310; P35 a waveform of an optical output alarm signal from the optical output detection circuit 316; and P36 an output waveform of the monostable multivibrator 324.

If the input signal is intercepted as indicated by P31, then the input data detection signal exhibits a high level for the period of time as indicated by P32. The timing at which the input signal is intercepted is represented by $T_A$. Since the light reception level of the photo-diode 314 drops when the input signal is intercepted, an optical output alarm signal is developed as indicated by P35 in response to such drop. The monostable multivibrator 324 receives the optical output alarm signal and changes the output signal thereof to a high level for the predetermined period of time T. The timing at which one pulse of the monostable multivibrator 324 ends is represented by $T_B$. While the output signal of the monostable multivibrator 324 remains at a high level, a shutting down signal is inputted to the LD driver 312 as indicated by P33, and consequently, the output of the laser diode 310 is intercepted as indicated by P34. In this manner, also in the present embodiment, production of an optical surge is prevented. It is to be noted that the reason why inputting of a shutting down signal from the outside to the OR circuit 326 is enabled is that it is intended to make it possible to intercept the output of the laser diode 310 by an operator in case of emergency.

Several means are available as means for detecting that an input signal has been intercepted. In the embodiment of FIG. 53, means for directly detecting an interception from an input signal to the LD driver 312 and means for detecting an interception based on the intensity of backward light of the laser diode 310 are both employed. In addition to them, also means which makes use of mark rate data supplied from the LD driver 312 to the APC circuit 318 can be adopted. This will be hereinafter described.

Figure 55:
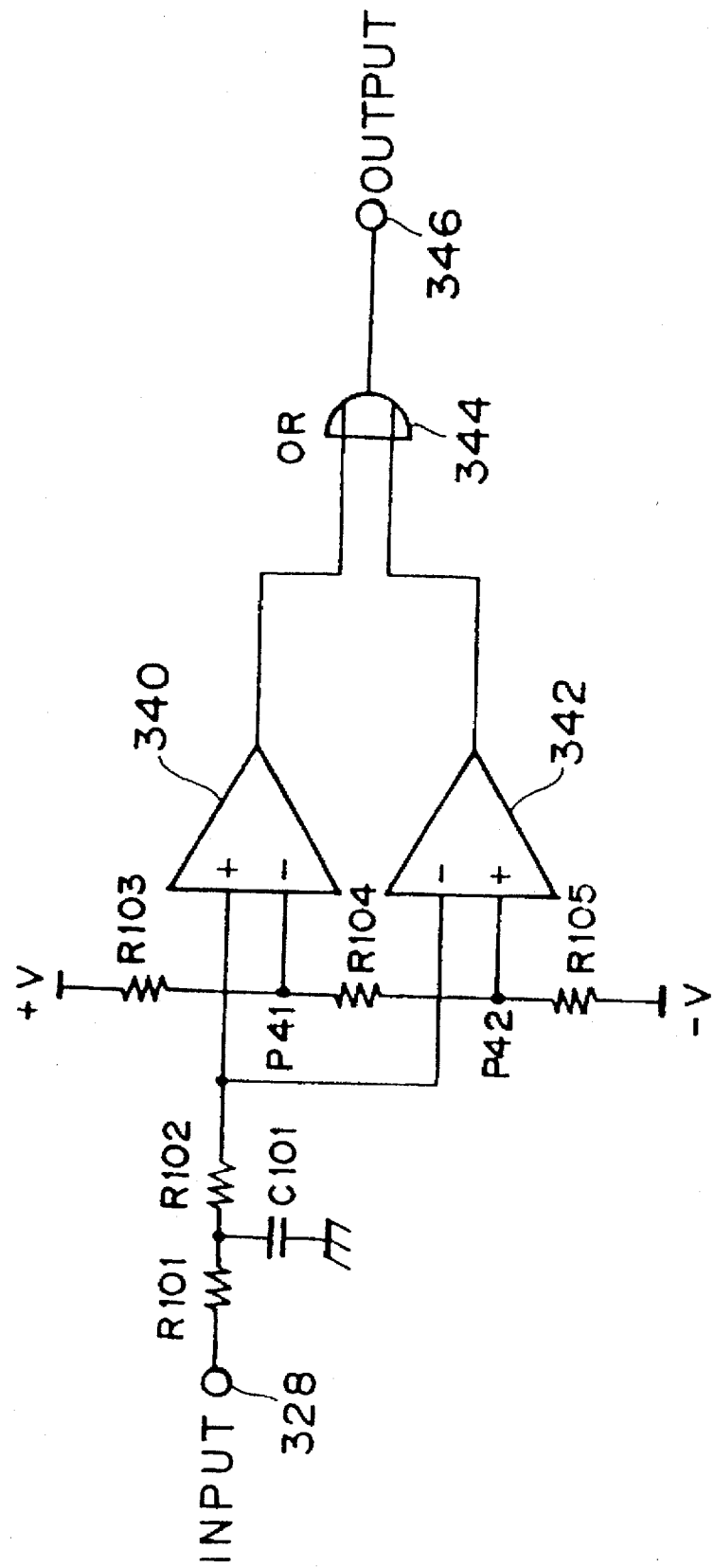
FIG. 55 is a circuit diagram showing a concrete example of an input interception detection circuit.

A concrete example of an input interception detection circuit will be described with reference to FIGS. 55 and 56. The input interception detection circuit is included, for example, in the input data detection circuit 320 or the optical output detection circuit 316 of FIG. 53. A pair of resistors R101 and R102 are connected in series between an input port 328 and the positive side input port of an operational amplifier 340. A junction between the resistors R101 and R102 is grounded by way of a capacitor C101. The positive side input port of the operational amplifier 340 is connected to the negative side input port of an operational amplifier 342. Resistors R103, R104 and R105 are connected in series in this order between a positive power source line +V and a negative power source line −V. The resistors R103 and R104 are connected to the negative side input port of the operational amplifier, and a junction point between the resistors R104 and R105 is connected to the positive side input port of the operational amplifier 342. The output port of the operational amplifier 340 and the output port of the operational amplifier 342 are connected to the two input ports of an OR circuit 344. And, the output port of the OR circuit 344 is connected to an output port 346 of the input intercepion detection circuit.

The present circuit is provided to perform detection of an average value of an input signal, and when an average level of an input signal goes out of a range between the potential at a junction P41 between the resistors R103 and R104 and the potential at a junction P42 between the resistors R104 and R105, a signal indicating that the input signal is intercepted is outputted from the output port 346.

Figure 56:
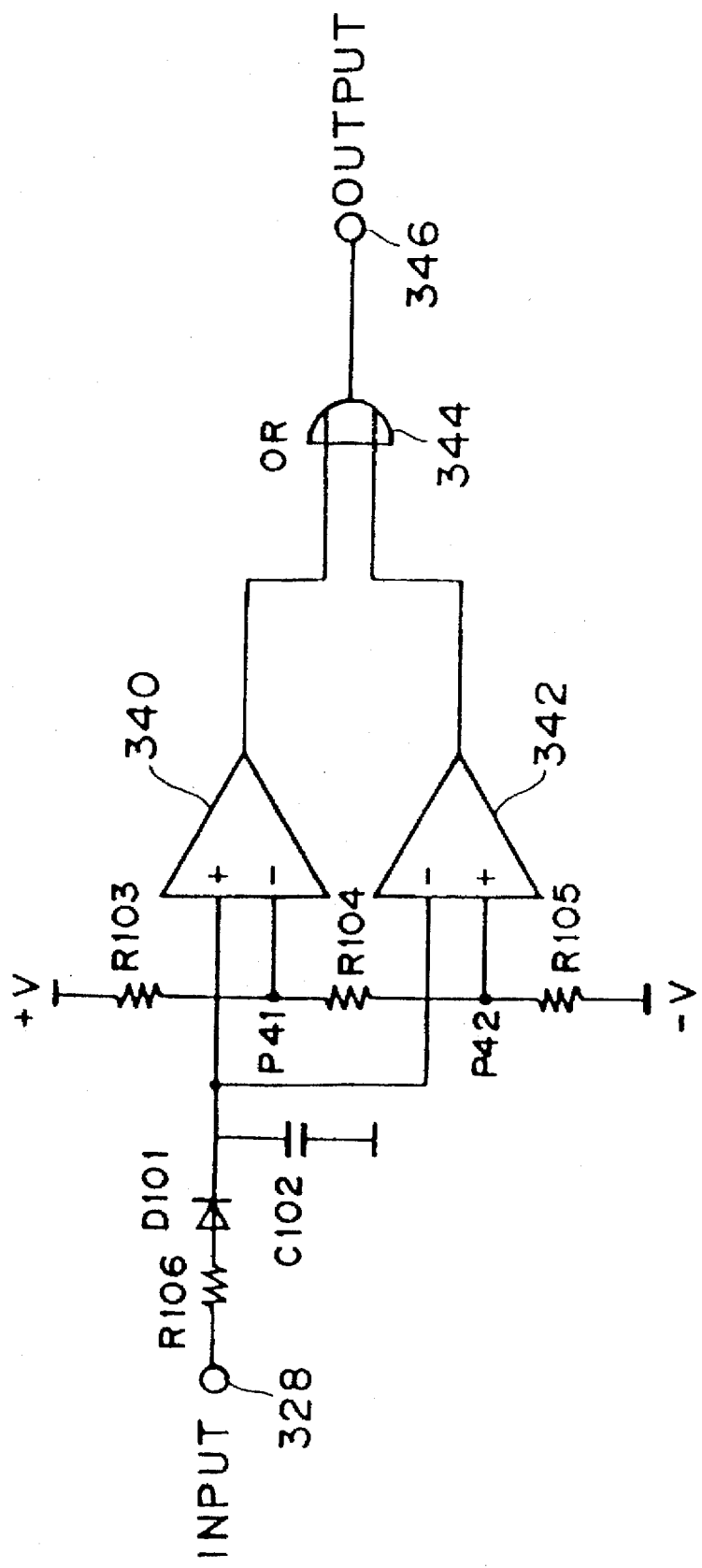
FIG. 56 is a circuit diagram showing another concrete example of an input interception detection circuit.

In the example of the input interception detection circuit shown in FIG. 56, a resistor R106 and a diode D101 are connected in this order between the input port 328 and the positive side input port of the operational amplifier 340. The direction of the diode D101 is set so that the cathode thereof may be connected to the operational amplifier 340. The cathode of the diode D101 is grounded by way of a capacitor C102. Since the other portions are similar to those of the circuit of FIG. 55, description thereof is omitted. The present input interception detection circuit is provided to detect a peak of an input signal. In particular, when a peak value of an input signal goes out of the range between the potential at the point P41 and the potential at the point P42, a signal indicating that the input signal is intercepted is outputted from the output port 346.

Figure 57:
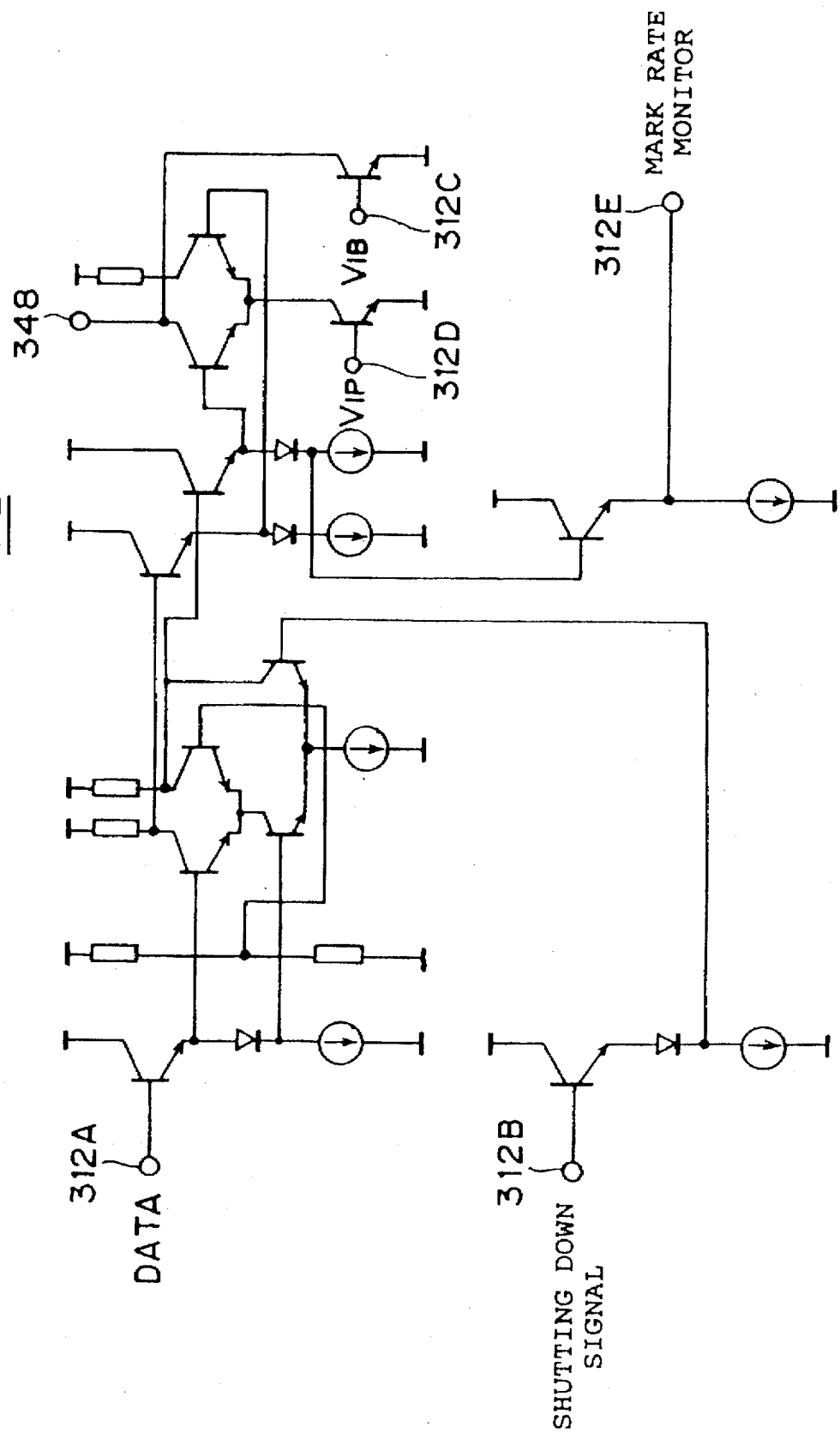
FIG. 57 is a circuit diagram showing a concrete example of an LD driver.

FIG. 57 is a circuit diagram showing a concrete example of the LD driver shown in FIG. 53. The LD driver is constituted from a combination of electric current switches formed from transistors, and since the construction and operation of it can be recognized very readily by those skilled in the art, the input and output ports of the LD driver 312 shown in FIG. 53 are indicated in the circuit diagram in place of describing it. It is to be noted that reference numeral 348 in FIG. 57 denotes an electric current output port to the laser diode 310.

Figure 58:
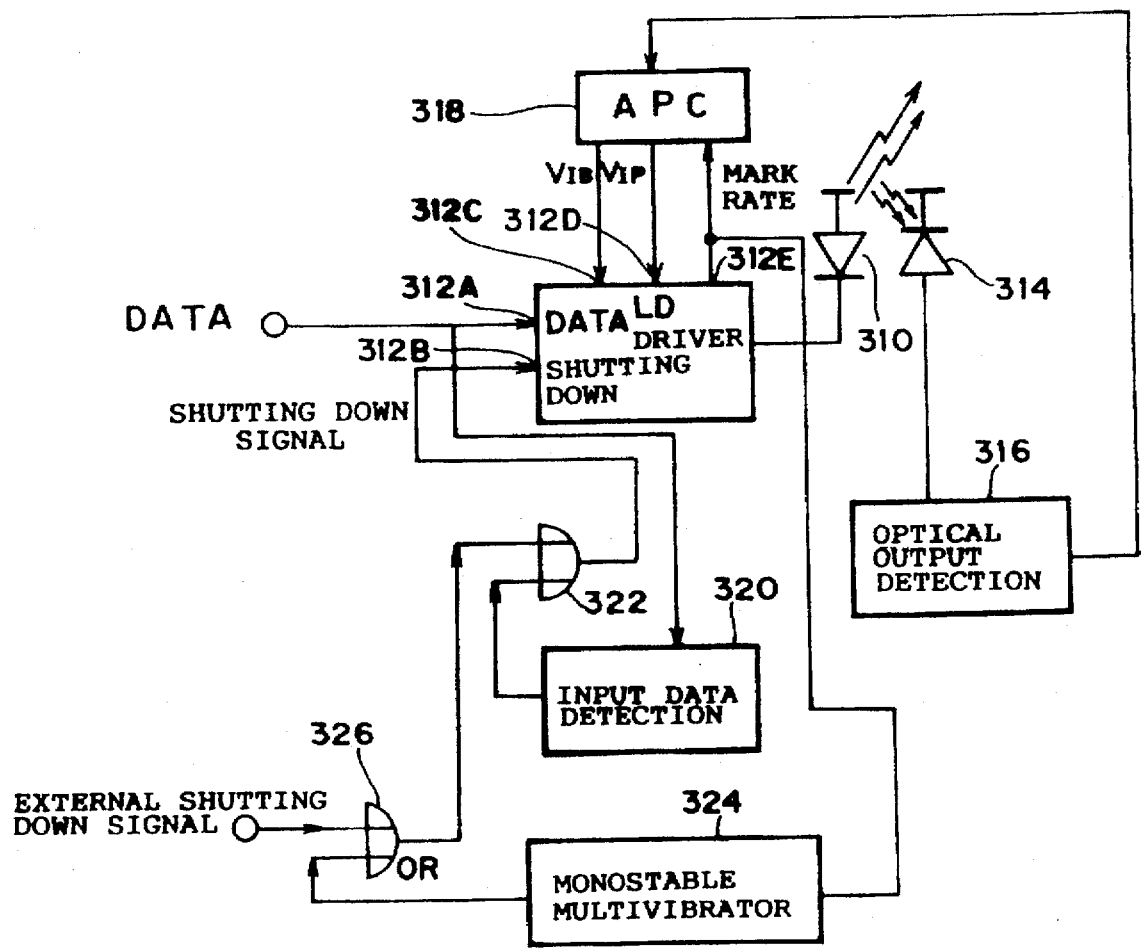
FIG. 58 is a block diagram showing a fourth embodiment of an optical transmission apparatus to which the present invention is applied.

FIG. 58 is a block diagram showing a fourth embodiment of an optical transmission apparatus to which the present invention is applied. The present embodiment is characterized in that, in contrast with the embodiment of FIG. 53, mark rate data from the output port 312E of the LD driver 312 are supplied to the monostable multivibrator 324. If an input signal is intercepted, then the mark rate becomes equal to 0, and consequently, by monitoring the variation of the mark rate data, the timing $T_A$ (refer to FIG. 54) at which the input signal is intercepted can be obtained, and in response to this, the monostable multivibrator 324 can be started.

Figure 59:
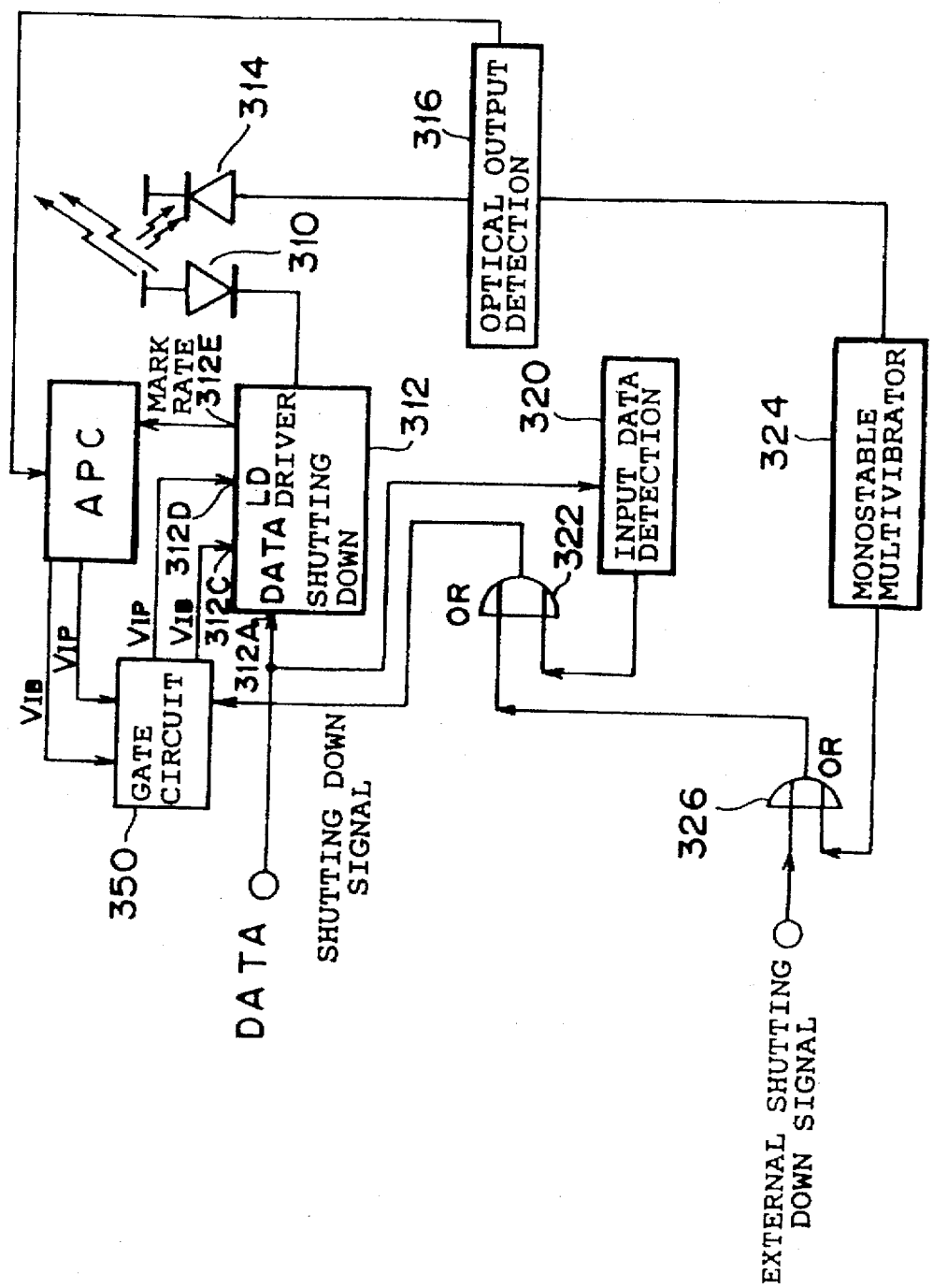
FIG. 59 is a block diagram showing a fifth embodiment of an optical transmission apparatus to which the present invention is applied.

FIG. 59 is a block diagram showing a fifth embodiment of an optical transmission apparatus to which the present invention is applied. In the present embodiment, in place of a shutting down signal inputted from the OR circuit 322 to the LD driver 312 in the third embodiment of FIG. 53, a gate circuit 350 is employed. In particular, in the present embodiment, the shutting down input port of the LD driver 312 is not used. The gate circuit 350 functions to intercept control signals $V_{IB}$ and $V_{IP}$ for an LD electric current to be supplied from the APC circuit 318 to the LD driver 312 in response to a shutting down signal. Consequently, similar effects to those of the third embodiment of FIG. 53 are obtained.

FIG. 60 is a block diagram showing a sixth embodiment of an optical transmission apparatus to which the present invention is applied. In particular, a peculiar optical modulator 352 and an OM driver 362 for controlling driving of the optical modulator 352 are used for external operation. For the optical modulator 352, for example, a Mach-Zehnder optical modulator can be used. A laser diode 351 serving as a light source is controlled so that it may output light of a fixed intensity. To this end, a photo-diode (photo-detector) 356 for converting backward light of the laser diode 351 by photoelectric conversion is provided, and an output signal of the photo-diode 356 is supplied to an LD output detection circuit 358. And, an output signal of the LD output detection circuit 358 is supplied to an APC circuit 360. The APC circuit 360 supplies a bias electric current to the laser diode 351 so that the intensity of output light of the laser diode 351 may be fixed.

Forward light of the laser diode 351 is modulated, for example, by intensity modulation by an optical modulator 352, and modulated light from the optical modulator 352 is split into two beams of light by an optical splitter 354. One of the split beams of light is sent out into the optical transmission line not shown, and the other split beam of light is supplied to the photo-detector 314. The OM driver 362 has an input port 362A for an input signal (data), an input port 362B for a shutting down signal, an output port 362C for mark rate data, and an output port 362D for a driving signal of the optical modulator 352.

In this manner, also in the optical transmission apparatus to which external modulation is applied, the optical transmission apparatus which can prevent production of an optical surge can be provided by adopting the construction similar to that of the third embodiment of FIG. 53. It is to be noted that, where external modulation is applied, other concrete examples than the concrete example of the detection means for an input interception described in connection with direct modulation can be adopted. In particular, since generally the driving signal from a driving circuit (OM driver) for an optical amplifier is a voltage signal, input interception can be detected directly using the voltage signal. Further, where external modulation is applied, if an OM driver does not have a shutting down input port, then such a gate circuit as shown in FIG. 59 may be provided between the APC circuit 360 and the laser diode 351 so that shutting down may be performed using the gate circuit.

While several concrete examples of input interception detection means are described above, they may be adopted in combination or adopted solely.

As described above, according to the present invention, there is an effect in that detection of interception and restoration of an optical signal of an optical amplifier is facilitated. Also there is another effect in that production of an optical surge can be prevented. The other effects by the present invention are such as described hereinabove including the description of the embodiments.

While specific embodiments of the present invention have been described in the foregoing description, the present invention is not limited to details of the embodiments. The spirit and scope of the present invention is defined in the appended claims, and all alterations and modifications which belong to the scope of equivalency of the claims shall be included in the scope of the present invention.

What is claimed:

1. An optical amplifier, comprising:
    a doped fiber doped with a rare earth element and having a first and a second end for guiding signal light from said first end toward said second end thereof;
    a pumping light source for outputting pumping light;
    optical coupling means optically connected to said doped fiber and said pumping light source for introducing the pumping light into said doped fiber;
    detection means for receiving light outputted from said second end of said doped fiber, said detection means including optical filter means for separating the received light into a first light output having a first band including the wavelength of said signal light and a second light output having a second band excluding the wavelength of said signal light, said detection means detecting whether or not amplified signal light is included in the received light based on said first light output and said second light output; and
    control means for controlling said pumping light source to lower the intensity of the pumping light when it is detected by said detection means that amplified signal light is not included in the light outputted from said doped fiber.

2. An optical amplifier according to claim 1, wherein said detection means further includes:
    a first photo-detector for converting the first light output by photo-electric conversion;
    a second photo-detector for converting the second light output by photo-electric conversion; and
    calculation means for calculating a level difference between output signals of said first and second photo-detectors.

3. An optical amplifier according to claim 2, wherein said optical filter means includes:
    a first optical splitter for splitting light outputted from said doped fiber into first and second split light;
    a first optical filter for receiving the first split light and passing amplified signal light therethrough; and
    a second optical filter for receiving the second split light and passing spontaneous emission light therethrough;
    output light of said second optical filter being supplied to said second photo-detector;
    said detection means further including a second optical splitter for splitting output light of said first optical filter into third and fourth split light;
    the third split light being sent out into an optical transmission line while the fourth split light is supplied to said first photo-detector.

4. An optical amplifier according to claim 2, wherein said optical filter means includes:
    a spectroscope for spectrally diffracting light outputted from said doped fiber into light of a first wavelength region which includes a wavelength of amplified signal light and light of a second wavelength region which does not include the wavelength of amplified signal light; and
    an optical filter for receiving light of the first wavelength region and passing amplified signal light therethrough;
    output light of said spectroscope being supplied to said second photo-detector;
    said detection means further including an optical splitter for splitting output light of said optical filter into first and second split light;
    the first split light being sent out to an optical transmission line while the second split light is supplied to said first photo-detector.

5. An optical amplifier according to claim 2, wherein said optical filter means includes:
    an optical band-pass filter for separating light outputted from said doped fiber into a first component of a narrow band including a wavelength of amplified signal light and a second component outside the band;
    the second component being supplied to said second photo-detector;
    said detection means further including an optical splitter for splitting the first component into first and second split light;
    the first split light being sent out into an optical transmission line while the second split light is supplied to said first photo-detector.

6. An optical amplifier according to claim 2, wherein said optical filter means includes:
    a first optical splitter for splitting light outputted from said doped fiber into first and second split light;
    an optical band-pass filter for receiving the first split light and passing light of a narrow band including a wavelength of amplified signal light but eliminating light outside the band therethrough; and
    optical band eliminating means for receiving the second split light and eliminating light of a narrow band including the wavelength of amplified signal light but passing light outside the band therethrough;
    output light of said optical band eliminating means being supplied to said second photo-detector;
    said detection means further including a second optical splitter for splitting output light of said band-bass filter into third and fourth split light;
    the third split light being sent out into an optical transmission line while the fourth split light is supplied to said first photo-detector.

7. An optical amplifier according to claim 6, wherein said optical band eliminating means comprises:
    an optical low-pass filter for receiving the second split light and passing light on the longer wavelength side than the wavelength of amplified signal light therethrough;
    an optical high-pass filter for receiving the second split light and passing light on the shorter wavelength side than the wavelength of amplified signal light therethrough; and an optical coupler for coupling output light of said low-pass filter and said high-pass filter and outputting the thus coupled light.

8. An optical amplifier, comprising:
a doped fiber doped with a rare earth element and having a first end and a second end for guiding signal light from said first end toward said second end thereof;
a pumping light source for outputting pumping light;
optical coupling means optically connected to said doped fiber and said pumping light source for introducing the pumping light into said doped fiber;
detection means for receiving light outputted from said second end of said doped fiber, said detection means including optical filter means for separating the received light into a first light output having a first band including the wavelength of said signal light and a second light output having a second band excluding the wavelength of said signal light, said detection means detecting whether or not amplified signal light is included in the received light based on said first Light output and said second light output; and
an optical output power controller for temporarily attenuating or intercepting amplified signal light to be outputted when it is detected by said detection means that amplified signal light is not included in the light outputted from said doped fiber.

9. An optical amplifier according to claim 8, further comprising delay means for rendering said optical output power controller operative after a predetermined interval of time elapses after it is detected that amplified signal light is not included in the light outputted from said doped fiber.

10. An optical amplifier, comprising:
a doped fiber doped with a rare earth element and having a first end and a second end for guiding signal light from said first end toward said second end thereof;
a pumping light source for outputting pumping light;
optical coupling means optically connected to said doped fiber and said pumping light source for introducing the pumping light into said doped fiber;
means for detecting whether or not the signal light is inputted to said doped fiber;
a photo-detector for detecting the intensity of light outputted from said second end of said doped fiber;
automatic level control means for supplying a controlling electric current to said pumping light source so that the output level of said photo-detector may be fixed;
idling means for supplying an idling electric current lower than the controlling electric current to said pumping light source; and
masking means for controlling said automatic level control means and said idling means so that, when it is detected that the signal light is inputted to said doped fiber, the idling electric current is first supplied to said pumping light source and then the controlling electric current is supplied to said pumping light source.

11. An optical amplifier according to claim 10, further comprising means for adjusting the idling electric current in response to the input level of the signal light.

12. An optical amplifier according to claim 10, wherein said masking means stops supply of the idling electric current after a predetermined interval of time elapses after it is detected that the signal light is inputted to said doped fiber.

13. An optical amplifier according to claim 10, wherein said masking means stops supply of the idling electric current when the output level of said photo-detector becomes equal to a predetermined value.

14. An optical amplifier according to claim 10, further comprising means for detecting an electric current supplied to said pumping light source, converting the value of the detected electric current into a monitor voltage and outputting the monitor voltage, and means for generating an automatic electric current control (ACC) reference voltage,
the magnitude of the idling voltage being set so that the monitor voltage may coincide with the ACC reference voltage.

15. An optical amplifier according to claim 10, further comprising means for detecting the intensity of the pumping light, converting the value of the detected intensity into a monitor voltage and outputting the monitor voltage, and means for generating an automatic power control (APC) reference voltage,
the magnitude of the idling voltage being set so that the monitor voltage coincides with the APC voltage.

16. An optical amplifier, comprising:
a doped fiber doped with a rare earth element and having a first end and a second end for guiding signal light from said first end toward said second end thereof;
a pumping light source for outputting pumping light;
optical coupling means optically connected to said doped fiber and said pumping light source for introducing the pumping light into said doped fiber;
interception detection means for detecting that inputting of the signal light to said doped fiber is intercepted;
a photo-detector for detecting the intensity of light outputted from said second end of said doped fiber;
automatic level control means for supplying a controlling electric current to said pumping light source so that the output level of said photo-detector may be fixed; and
shutting down means for intercepting the output of said doped fiber for a predetermined period of time in response to an output signal of said interception detection means.

17. An optical amplifier according to claim 16, wherein said shutting down means includes an optical shutter provided on the upstream side in the signal light propagation direction of said doped fiber.

18. An optical amplifier according to claim 16, wherein said shutting down means includes an optical shutter provided on the downstream side in the signal light propagation direction of said doped fiber.

* * * * *